(12) United States Patent
Hamanaka et al.

(10) Patent No.: US 7,919,020 B2
(45) Date of Patent: Apr. 5, 2011

(54) METHOD OF MANUFACTURING PLASTIC LENS, GASKET FOR MOLDING PLASTIC LENS, CASTING MOLD FOR MOLDING PLASTIC LENS, CASTING JIG FOR PLASTIC LENS STARTING MATERIAL LIQUID, HOLDING MEMBER FOR PLASTIC LENS CASTING MOLD, AND PLASTIC LENS MANUFACTURING APPARATUS

(75) Inventors: Akira Hamanaka, Tokyo (JP); Hideki Kobayashi, Tokyo (JP); Yasuhisa Okamoto, Tokyo (JP); Yukiaki Sunagawa, Tokyo (JP); Nobuhiko Takeda, Tokyo (JP)

(73) Assignee: Hoya Corporation, Tokyo (JP)

( * ) Notice: Subject to any disclaimer, the term of this patent is extended or adjusted under 35 U.S.C. 154(b) by 777 days.

(21) Appl. No.: 11/628,888

(22) PCT Filed: Jun. 8, 2005

(86) PCT No.: PCT/JP2005/010495
§ 371 (c)(1),
(2), (4) Date: Oct. 26, 2007

(87) PCT Pub. No.: WO2005/120795
PCT Pub. Date: Dec. 22, 2005

(65) Prior Publication Data
US 2008/0029914 A1 Feb. 7, 2008

(30) Foreign Application Priority Data
Jun. 8, 2004 (JP) .................................. 2004-169847

(51) Int. Cl.
*B29D 11/00* (2006.01)
(52) U.S. Cl. .......................... 264/1.1; 264/1.32; 425/808
(58) Field of Classification Search ................... 264/1.1, 264/1.32; 425/566, 569, 571, 572, 808
See application file for complete search history.

(56) References Cited

U.S. PATENT DOCUMENTS
3,070,846 A 1/1963 Israel Schrier
(Continued)

FOREIGN PATENT DOCUMENTS
JP 62-18225 A 1/1987
(Continued)

OTHER PUBLICATIONS
Japanese Office Action dated Oct. 27, 2009 corresponding to Japanese Patent Application No. 2007-049915.
(Continued)

*Primary Examiner* — Joseph S Del Sole
*Assistant Examiner* — James Sanders
(74) *Attorney, Agent, or Firm* — Sughrue Mion, PLLC

(57) ABSTRACT

A method of manufacturing a plastic lens by mixing plural polymerizable components, and immediately after mixing, casting a mixture into a casting mold and conducting polymerization to obtain a molded article. A method of manufacturing a plastic lens by casting a plastic lens starting material liquid flowing out of a casting jig opening into a casting mold and curing the above starting material liquid to form a molded article. A gasket for molding plastic lens comprised of a cylindrical member comprising openings for fitting by insertion of two molds. A casting mold for molding plastic lens, wherein the above molds are detachably held in the above openings of the above gasket so that molding surfaces of the two molds are positioned opposite at a prescribed interval to form a cavity corresponding to a lens shape within the above cylindrical member. A casting jig for plastic lens starting material liquid equipped with a nozzle for casting a plastic lens starting material liquid into the casting mold. A method of manufacturing a plastic lens comprising casting of a plastic lens starting material liquid into a casting mold held by a holding member and curing the above starting material liquid to form a molded article. A holding member for plastic lens casting mold for holding a casting mold for molding a plastic lens.

22 Claims, 31 Drawing Sheets

U.S. PATENT DOCUMENTS 5,547,618 A    8/1996   Magne

FOREIGN PATENT DOCUMENTS

| | | |
|---|---|---|
| JP | 34215/1989 | 3/1989 |
| JP | 2-295707 A | 4/1990 |
| JP | 9-193256 A | 7/1997 |
| JP | 2001-311804 A | 11/2001 |
| JP | 2002-220497 A | 8/2002 |
| JP | 2003001645 A | 1/2003 |
| JP | 2003145555 A | 5/2003 |
| JP | 2004-67864 A | 3/2004 |
| WO | WO 03/084728 A1 | 10/2003 |

OTHER PUBLICATIONS

Supplementary European Search Report Corresponding to European Patent Application No. 05748931.2, dated Dec. 16, 2010.

Conveying pallet 70

Fig. 15
Cavity side opening of casting hole
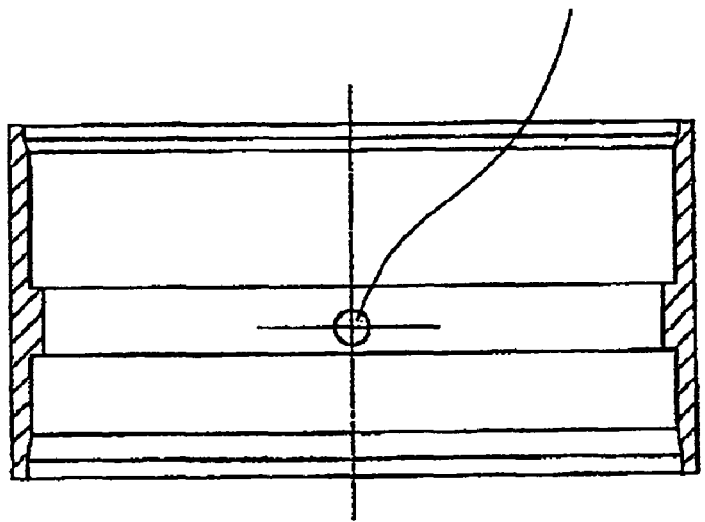
(a)
Cavity side opening of casting hole
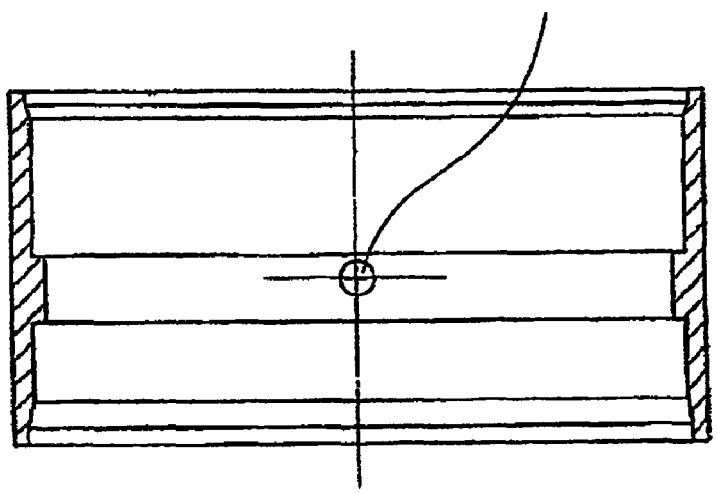
(b)

Holding member 201

First mold side thickness retaining part 2052

Thickness retaining part for casting mold 205

Second mold side thickness retaining part 2051

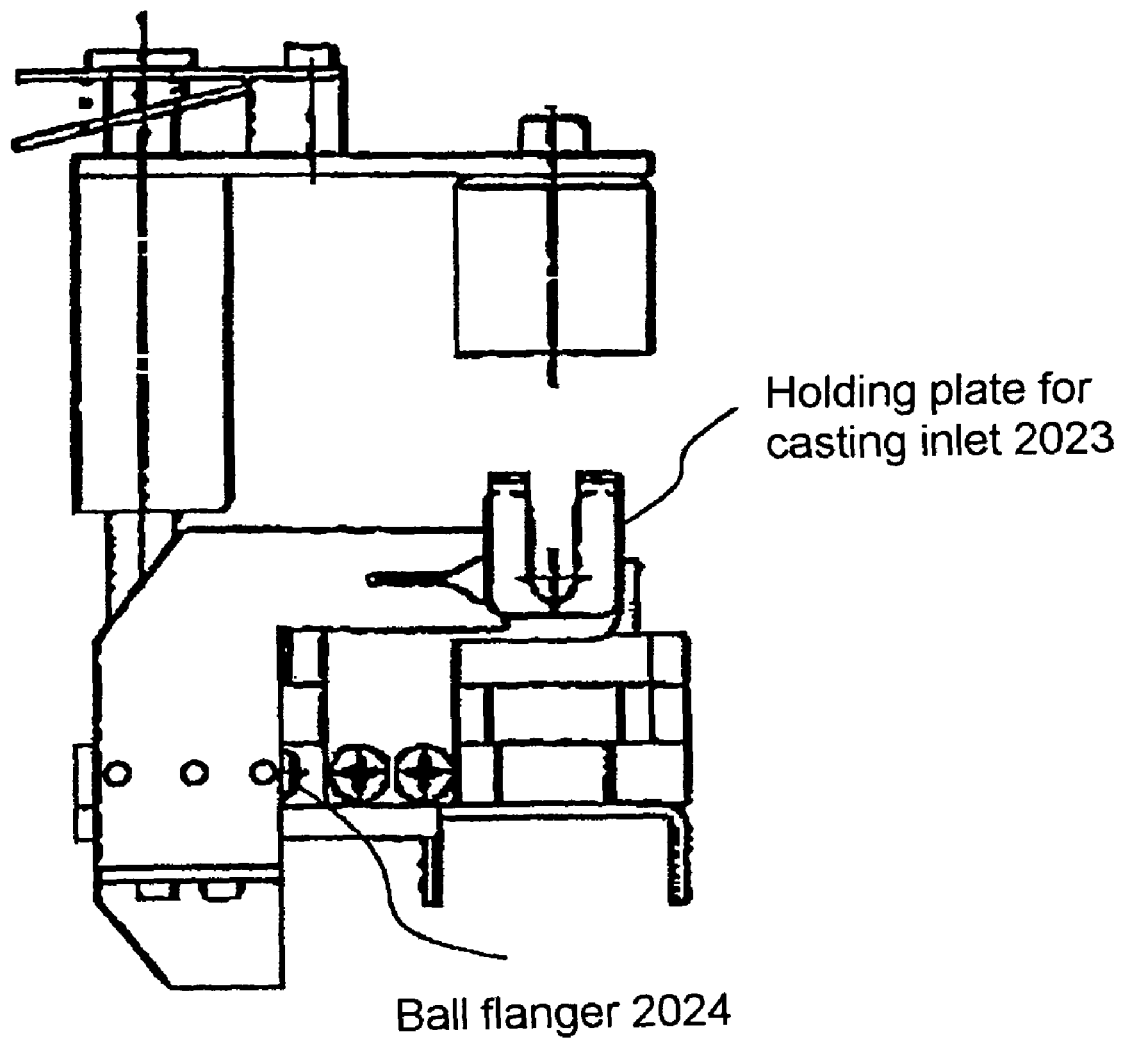

Fig. 23
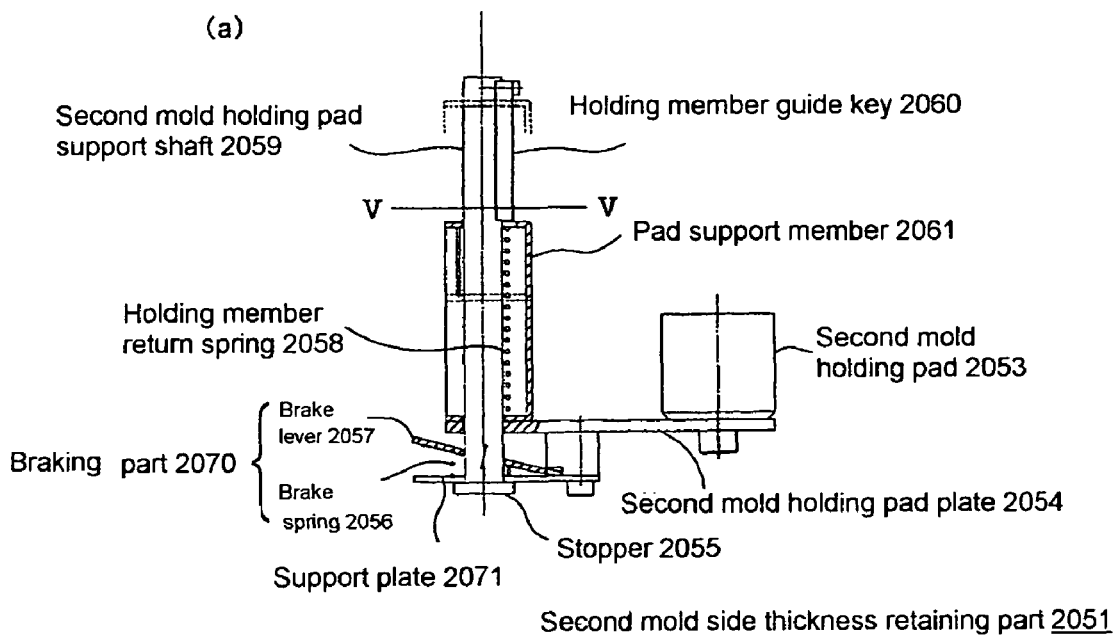
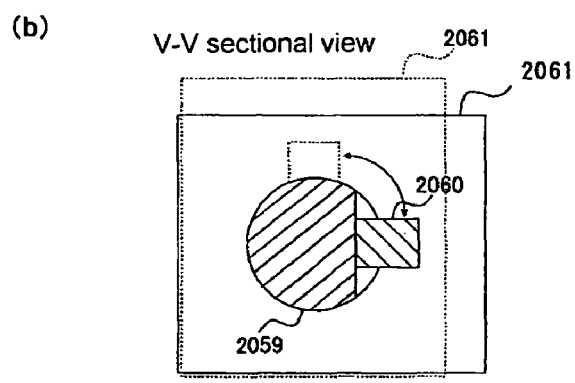

Fig. 26 (1)
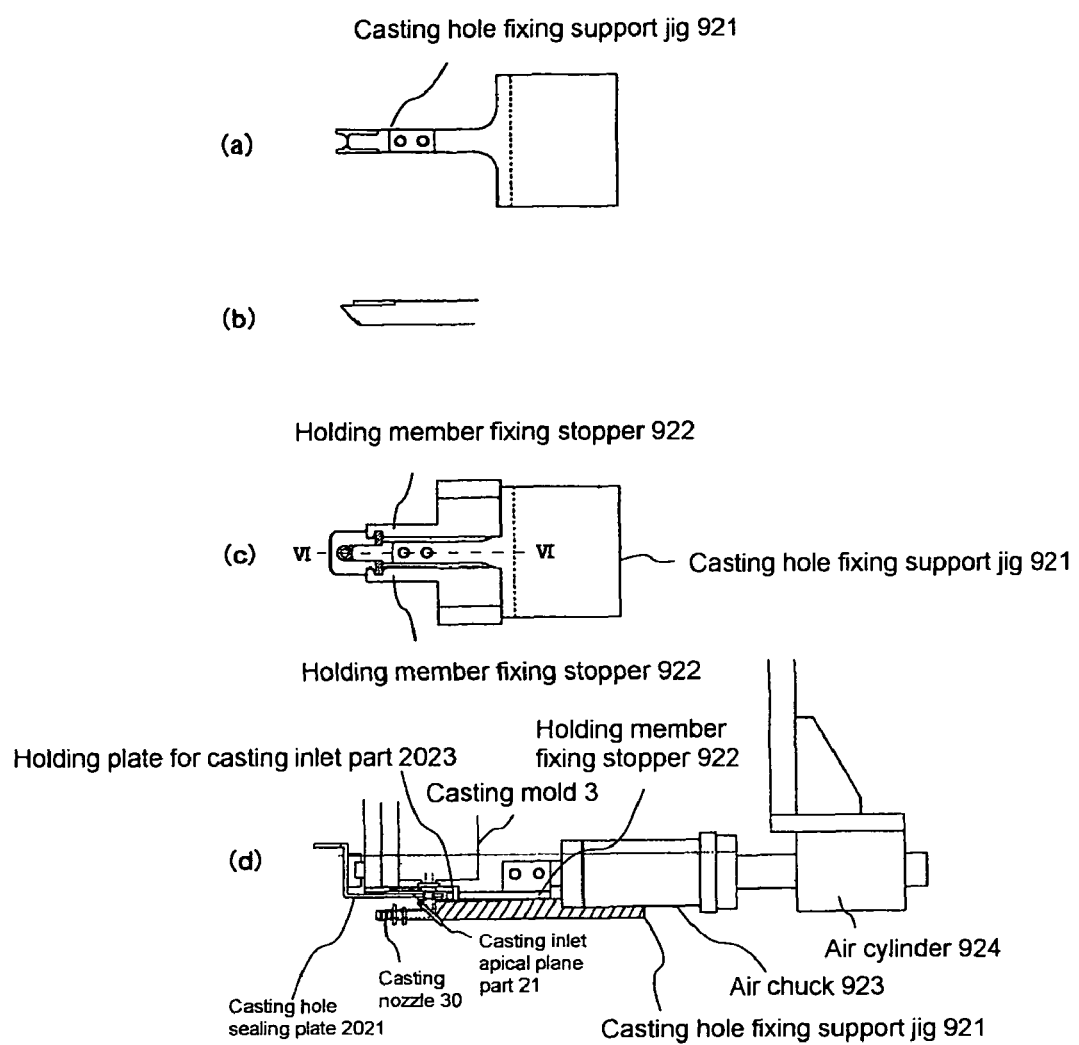

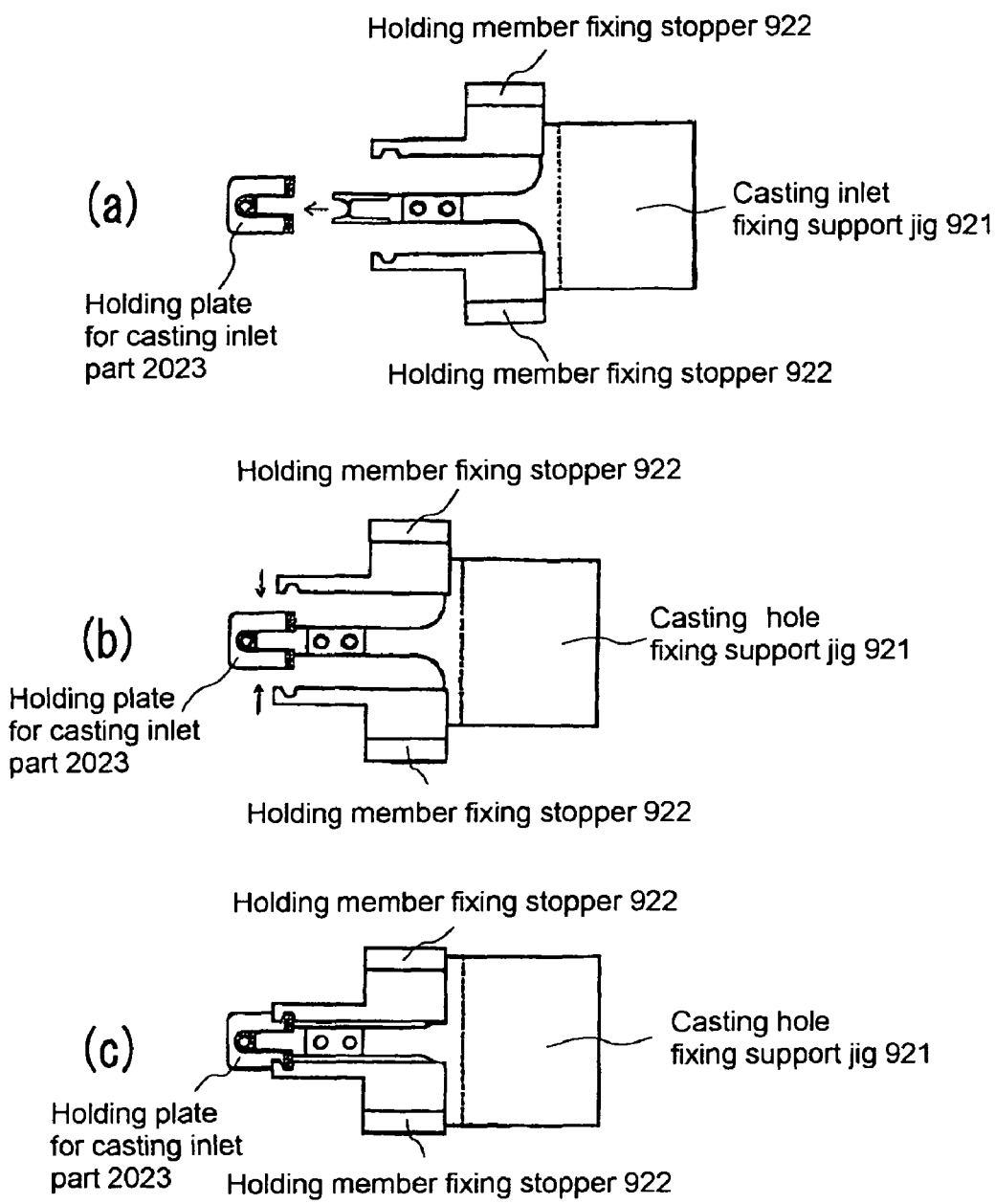
Fig. 26 (2)

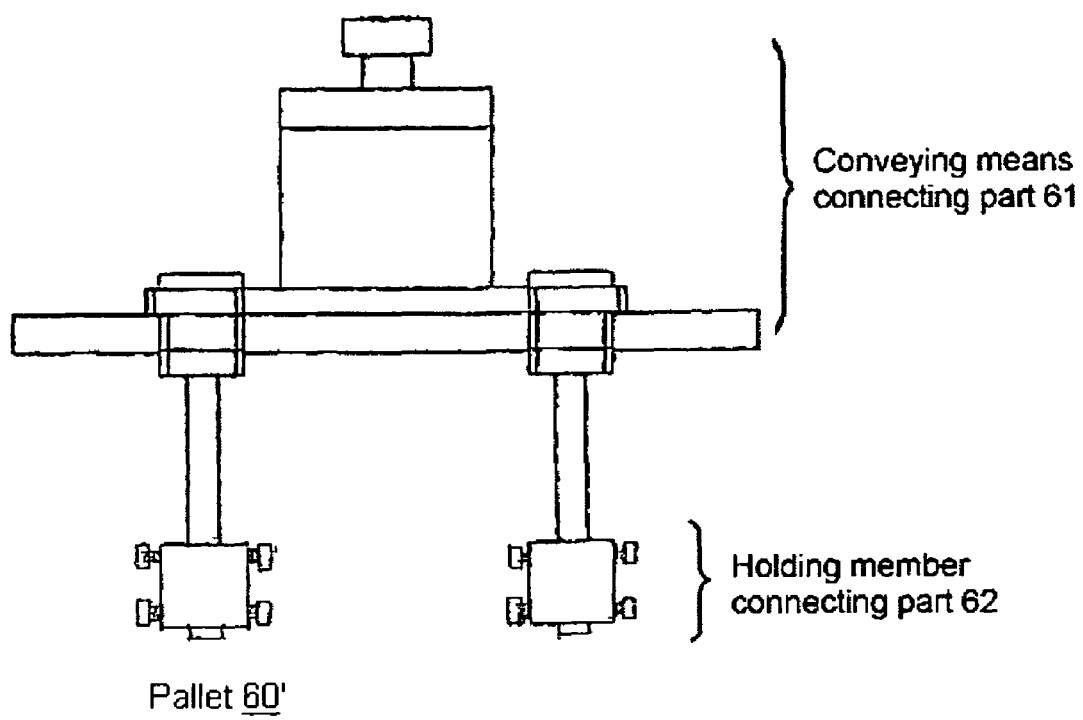

METHOD OF MANUFACTURING PLASTIC LENS, GASKET FOR MOLDING PLASTIC LENS, CASTING MOLD FOR MOLDING PLASTIC LENS, CASTING JIG FOR PLASTIC LENS STARTING MATERIAL LIQUID, HOLDING MEMBER FOR PLASTIC LENS CASTING MOLD, AND PLASTIC LENS MANUFACTURING APPARATUS

TECHNICAL FIELD

The present invention relates to a method of manufacturing a plastic lens suitable for cast-polymerizing a plastic lens starting material liquid having a high viscosity and a high initial polymerization rate. The present invention further relates to a gasket for molding plastic lens, casting mold for molding plastic lens using the aforementioned gasket, casting jig for plastic lens starting material liquid for casting a starting material liquid into the aforementioned casting mold, and a holding member for plastic lens casting mold for holding the aforementioned casting mold.

BACKGROUND TECHNIQUE

Cast polymerization methods are known methods of molding plastic lenses. For example, *Megane* (published May 22, 1986 by Medical Aoi) discloses a manufacturing process for diethylene glycol bisallyl carbonate lenses (CR-39 lenses). This lens manufacturing process describes a casting mold in which a gap is maintained between the upper mold and lower mold of a glass master mold by means of a cylindrical gasket to form a cavity. A lens starting material liquid is cast into this cavity. Following casting, the mold is placed in an electric furnace and heated to conduct polymerization. The fully polymerized lens is then removed from the mold.

Example of methods of casting a starting material liquid into a cavity is a method in which a gasket provided with a casting inlet is employed and a starting material liquid is cast through the inlet. For example, Japanese Utility Model Publication (JIKKO) Heisei No. 6-39951 (referred to as "Reference 1", hereinafter) describes such a gasket. In the casting of the starting material liquid into the casting mold employing this gasket, the starting material liquid is cast under its own weight by a flowing action from the casting inlet part in an arrangement where the gasket is tilted so that the casting inlet of the casting inlet part faces upward. When casting a starting material liquid from above as is the case with this gasket, bubbles are sometimes involved during casting, depending on the casting conditions and materials. When the viscosity of the starting material liquid is low, there are few problems because the bubbles are relatively easily removed. However, when employing a high viscosity starting material liquid or a starting material liquid with a high initial polymerization rate, the removal of bubbles is difficult. A gasket of such configuration cannot be utilized when employing such starting materials.

In molding methods employing the gasket disclosed in Reference 1, the gasket is removed following polymerization from a casting mold that has been filled with starting material. In that process, it is necessary to sever, in the vicinity of the casting hole, the portion that has polymerized within the starting material liquid casting inlet and remove it from the molded article. When employing a gasket such as that described in Reference 1, the portion that has polymerized in the vicinity of the casting hole is usually broken by bending the casting inlet, and the gasket is removed. However, when manufacturing a high-strength molded article, it is difficult to break the portion that has polymerized in the vicinity of the casting hole after the polymerization is finished. Further, if employing a starting material liquid with high viscosity, when the casting hole is widened to facilitate casting, the strength of this portion becomes even greater and breaking becomes even more difficult. Thus, there is a need for a molding method permitting the easy removal of the gasket.

As an example of a method of manufacturing plastic lenses with a casting molding from a highly viscous lens starting material liquid with a rapid initial rate of polymerization, International Patent Publication WO 03/084728 (referred to as "Reference 2", hereinafter) discloses a method of molding plastic lenses by casting polymerization employing an isocyanate terminal prepolymer component (A) in the form of the reaction product of an aliphatic diisocyanate having an intramolecular cyclic structure and a diol having an average molecular weight of 300 to 2,500, and an aromatic diamine component (B) that react rapidly when mixed. The molded article obtained by molding based on the method disclosed in Reference 2 is of great strength, rivaling that of polycarbonate. In the lens manufacturing process described in Reference 2, a plastic lens is manufactured by casting a starting material liquid into a cavity formed with an upper mold, a lower mold, and a gasket having a casting hole and a discharge hole; severing the polymerized portion inside the cavity from that outside the cavity after a prescribed period has elapsed; subsequently introducing the lens into an electric furnace where it is heat polymerized; and removing the lens from the mold once polymerization has concluded.

In the molding of lenses using components (A) and (B) described in Reference 2, these components are desirably rapidly mixed and then immediately cast into the casting mold after mixing. In particular, since component (A) is of high viscosity, it is difficult to remove any bubbles that generate in the cavity. Further, bubbles that are generated tend not to rise upward, but remain within the molded article. Further, since polymerization of components (A) and (B) commences immediately after mixing and polymerization rate is high, the removal of bubbles becomes even more difficult.

In the method described in Reference 2, the starting material liquid is cast using a nozzle equipped with a casting inlet sealed part in an inclined state with the discharge outlet of the gasket on top. As this occurs, the starting material liquid fills the cavity from bottom to top. Casting from the bottom in this manner effectively reduces the quantity of bubbles entrained relative to cast from the top.

DISCLOSURE OF THE INVENTION

In cast molding employing a highly viscous plastic lens starting liquid with a rapid initial polymerization rate as set forth above, it is difficult to remove bubbles that are entrained into the cavity. Thus, when employing such starting materials, there is a need for a manufacturing method in which bubbles do not remain in the cavity.

As disclosed in Reference 2, when casting a starting material liquid using a nozzle having a casting inlet sealed part, the polymerization of starting material liquid adhering around the nozzle eventually results in blocks around the nozzle. As a result, there is a risk of the fit between the nozzle and gasket eventually being affected. Further, since polymerization of components (A) and (B) begins immediately following mixing and progresses rapidly, polymerization of the mixture adhering around the nozzle for casting the mixture also progresses rapidly. When mixture in which polymerization has already advanced flows into the cavity with newly cast mixture, flow traces, striae produced by uneven polymerization, and the like are produced, sometimes creating optical defects in the molded lens.

When casting a starting material liquid from the bottom in the manner as the method described in Reference 2, it is necessary to ensure that the starting material liquid in the casting mold at the completion of casting does not flow out through the casting hole to the exterior. Accordingly, in the method described in Reference 2, following casting of the lens starting material, the angle of incline of the casting mold is reduced or the casting mold is made level to orient the opening of the casting inlet upward and the opening is positioned above the cavity, thereby preventing the starting material liquid that has been cast from flowing out to the exterior.

However, when the orientation of the casting mold is changed in this manner following casting of the starting material liquid, since the angle of the casting mold is changed before bubbles that have been entrained during casting of the starting material liquid reach the discharge hole at the top of the casting mold, bubbles sometimes remain within the cavity. Further, when a shock is applied in the course of changing the angle of the casting mold or the orientation is changed abruptly, the lens starting material flows within the cavity during polymerization, leaving behind traces and sometimes causing optical defects. Further, since the casting nozzle is removed from the casting inlet with the casting mold either horizontal or inclined close to horizontal, starting material liquid flowing out of the casting nozzle and lens starting material liquid overflowing from the discharge outlet sometimes come into contact with and adhere to the casting mold. In such cases, for example, it becomes necessary to remove the adhered starting material when reusing the mold; there is a risk of the adhered starting material liquid negatively affecting the manufacturing process. Since the angle of the casting mold changes during mounting and dismounting of the casting nozzle, the mechanism can be expected to be complex when attempting to automate the casting step.

Accordingly, it is an object of the present invention to provide a method of manufacturing a plastic lens capable of molding a plastic lens with reduced bubbles and optical defects from a plastic lens starting material liquid with a high viscosity and a high initial polymerization rate.

In particular, the object of the present invention is to provide a method of manufacturing a polymerized molded article with reduced bubbles and optical defects by improving a method of casting a plastic lens starting material liquid into a casting mold. Furthermore, it is an object of the present invention to provide a method of manufacturing a plastic lens in which a gasket can be readily removed following molding by improving a molding method.

Furthermore, it is an another object of the present invention to provide a gasket for molding plastic lens, casting mold, casting jig for plastic lens starting material liquid, holding member for casting mold, and plastic lens manufacturing apparatus, suitable for use in the aforementioned method.

The aforementioned objects can be achieved by the following means;

[1] A method of manufacturing a plastic lens by mixing plural polymerizable components, and immediately after mixing, casting a mixture into a casting mold and conducting polymerization to obtain a molded article, characterized in that
said casting mold has an internal cavity and has at diametrically opposed positions a casting hole for casting the mixture into the cavity and a discharge hole for discharging gases in the cavity or the mixture to the exterior of the casting mold, said method comprises, prior to casting the mixture into the casting mold, a step of heating the casting mold and a step of filling the cavity with carbon dioxide, as well as,
comprises a step of casting the mixture from the casting hole in a state where the casting mold filled with carbon dioxide is positioned nearly perpendicular to a horizontal plane as well as the discharge hole is positioned at a top,
a step of sealing the casting hole following completion of casting the mixture into the casting mold, and
a step of leaving the casting mold.

[2] The method of manufacturing according to [1], characterized in that said plural polymerizable components comprise the following components (A) and (B).
Component (A): isocyanate terminal prepolymer in the form of a reaction product of an aliphatic diisocyanate having an intramolecular cyclic structure and a diol having an average molecular weight of 300-2,500.
Component (B): one or more aromatic diamines denoted by general formula (I). (In general formula (I), $R_1$, $R_2$ and $R_3$ are each independently any of a methyl, ethyl or thiomethyl group.)

[Chem. 1]

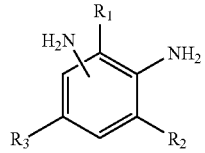

General formula (I)

[3] The method of manufacturing according to [1] or [2], characterized in that
said casting mold has a mold for forming one side of the lens and a mold for forming the other side thereof that are positioned opposite at a prescribed interval, a circular gasket is positioned around said two molds, and a cavity is formed with said molds and gasket, and
said gasket is provided with said casting hole and said discharge hole.

[4] The method of manufacturing according to any of [1] to [3], wherein said step of filling with carbon dioxide is carried out by introducing heated carbon dioxide.

[5] The method of manufacturing according to any of [1] to [4], wherein said casting mold has a discharge outlet part having an indentation communicating with said cavity through said discharge hole and a sensor detects that said mixture reaches a prescribed height within said discharge outlet part, thereby stopping the casting.

[6] The method of manufacturing according to any of [1] to [5], following the step of sealing said casting hole, further comprising a debubbling step in which bubbles generated in said cavity are removed through said discharge hole.

[7] The method of manufacturing according to [6], wherein said debubbling step is carried out by tilting said casting mold to a prescribed angle and maintaining for a prescribed period in a state where said discharge hole is positioned at a top.

[8] The method of manufacturing according to any of [1] to [7], wherein, in a step of leaving the casting mold, said casting mold is left for a prescribed period in a low-temperature atmosphere to polymerize said mixture, the polymerized portions within the casting hole and the discharge hole are severed from the polymerized portion within the cavity, and then the casting mold is left in a high-temperature atmosphere to further proceed polymerization.

[9] The method of manufacturing according to [8], wherein said gasket is comprised of an elastic resin and said severing of the polymerized portions within the casting hole and the discharge hole is carried out by bending parts of said casting hole and said discharge hole.

[10] The method of manufacturing according to any of [1] to [9], wherein the plastic lens is an eyewear lens.

[11] A method of manufacturing a plastic lens by casting a plastic lens starting material liquid flowing out of a casting jig opening into a casting mold and curing said starting material liquid to form a molded article, characterized in that said casting mold has an internal cavity and has at diametrically opposed positions a casting hole for casting said starting material liquid into the cavity and a discharge hole for discharging gases in the cavity or the mixture to the exterior of the casting mold, said casting hole has an opening (referred to as "casting inlet opening", hereinafter) for casting the mixture, said starting material liquid is cast into said casting mold through said casting hole in a state where the casting mold is tilted from or perpendicular to a horizontal plane as well as the discharge hole is positioned at a top, and said method comprises a period, from when said casting inlet opening begins to communicate with said casting jig opening to when the communication ends, in which a portion of the starting material liquid flowing out of the casting jig opening flows into the casting hole, and the remaining portion flows downward without flowing into the casting hole.

[12] The method of manufacturing according to [11], characterized in that said casting mold has a mold for forming one side of the lens and a mold for forming the other side thereof that are positioned opposite at a prescribed interval, a circular gasket is positioned around said two molds, and a cavity is formed with said molds and gasket, and said gasket is provided with said casting hole and said discharge hole.

[13] The method of manufacturing a plastic lens according to [11] or [12], characterized in that said casting of the starting material liquid is carried out in a state where said casting mold is positioned nearly perpendicular to a horizontal plane.

[14] The method of manufacturing a plastic lens according to any of [11] to [13], characterized in that a gap is formed between said casting jig opening and said casting inlet opening during the said period, and through the gap, a portion of the starting material liquid flowing out through the casting jig opening flows downward.

[15] The method of manufacturing a plastic lens according to [14], characterized in that said gap is present at least up until said starting material liquid begins to flow into the cavity.

[16] The method of manufacturing a plastic lens according to [14] or [15], characterized in that casting of said starting material liquid is carried out while gradually narrowing said gap.

[17] The method of manufacturing a plastic lens according to any of [14] to [16], characterized in that, casting of said starting material liquid is carried out in a state where said gap is closed, from a certain time in casting of said starting material liquid to the completion of the casting.

[18] The method of manufacturing a plastic lens according to any of [14] to [17], characterized in that an apical end of said casting jig is made tubular, a plane (referred to as "casting inlet apical plane part", hereinafter) is formed entirely around said casting inlet opening, said gap is closed by contacting an end face of said casting jig apical end with said casting inlet apical plane part.

[19] The method of manufacturing a plastic lens according to [18], characterized in that an outer shape of said casting inlet apical plane part of is larger than that of the end face of said casting jig apical end.

The method of manufacturing a plastic lens according to [18], characterized in that an outer shape of said casting inlet apical plane part is larger than that of the end face of said casting jig apical end.

said casting inlet apical plane part is inclined relative to an axis of the casting hole, the end face of said casting jig apical end is formed so that, when brought into contact with the casting inlet apical plane part, the axial direction of said casting hole intersects the axial direction of said casting jig.

[21] The method of manufacturing a plastic lens according to [20], characterized in that the axial direction of said casting hole intersects almost perpendicularly the axial direction of said casting hole when the end face of said casting jig apical end is brought into contact with the casting inlet apical plane part.

[22] The method of manufacturing a plastic lens according to any of [18] to [21], characterized in that a spacing of said gap is adjusted in a state where said gap is present entirely around said casting jig opening and said casting inlet opening between the end face of said casting jig apical end and casting inlet apical plane part.

[23] The method of manufacturing a plastic lens according to any of [11] to [22], characterized in that the size of said casting inlet opening is almost identical to or smaller than that of said casting jig opening.

[24] The method of manufacturing a plastic lens according to any of [11] to [23], characterized in that said casting hole is sealed following completion of casting the starting material liquid into the casting mold.

[25] The method of manufacturing a plastic lens according to [24], characterized in that said casting jig opening is separated from said casting inlet opening immediately after sealing of said casting hole.

[26] The method of manufacturing a plastic lens according to any of [11] to [25], characterized in that said starting material liquid comprises plural polymerizable components as well as said polymerizable components start polymerization immediately after mixing and cure within 10 minutes.

[27] The method of manufacturing a plastic lens according to any of [11] to [26], characterized in that said starting material liquid comprises the following components (A) and (B).

Component (A): isocyanate terminal prepolymer in the form of a reaction product of an aliphatic diisocyanate having an intramolecular cyclic structure and a diol having an average molecular weight of 300-2,500.

Component (B): one or more aromatic diamines denoted by general formula (I). (In general formula (I), $R_1$, $R_2$ and $R_3$ are each independently any of a methyl, ethyl or thiomethyl group.)

[Chem. 2]

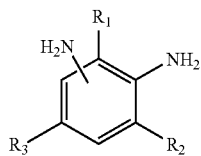

General formula (I)

[28] A gasket for molding plastic lens comprised of a cylindrical member comprising openings for fitting by insertion a first mold and second mold comprising a molding surface for forming an optically functional surface of plastic lenses, characterized in that
said cylindrical member has a casting inlet part and a discharge outlet part on an outer wall surface thereof,
said casting inlet part has a casting tube part having a through-hole (referred to as "casting hole", hereinafter) inside and a casting inlet apical part provided on an end part of said casting tube part, where an inside of said cylindrical member is communicated with an outside thereof through said casting hole,
said discharge outlet part has a discharge hole communicating the inside of said cylindrical member with the outside thereof,
said gasket has said casting hole and discharge hole at diametrically opposed positions,
said casting inlet apical part has an opening of said casting hole and a inclined plane around the opening.
[29] The gasket according to [28], characterized in that said casting tube part is provided with a thin-walled part.
[30] The gasket according to [28] and [29], characterized in that said casting inlet part is provided with a flange for positioning.
[31] A casting mold for molding plastic lens, wherein a first mold and second mold are detachably held in said openings of the gasket according to any of [28] to [30] so that a molding surface of the first mold and a molding surface of the second mold are positioned opposite at a prescribed interval to form a cavity corresponding to a lens shape within said cylindrical member.
[32] A casting jig for plastic lens starting material liquid equipped with a nozzle for casting a plastic lens starting material liquid into the casting mold according to [31], characterized in that
an apical end of said nozzle is made tubular,
an outer shape of an end face of said apical end is smaller than that of said plane provided on the casting inlet apical part.
[33] The casting jig according to [32], characterized in that said nozzle has a flange for positioning.
[34] The casting jig according to [32] or [33], characterized by being comprised of a tube detachably attached to a discharge outlet of a mixing chamber in which mixing of the plastic lens starting material liquid is carried out and a nozzle attached to a tip of said tube.
[35] A method of manufacturing a plastic lens comprising casting of a plastic lens starting material liquid into a casting mold held with a holding member and curing said starting material liquid to form a molded article, characterized in that
said casting mold has an internal cavity and has at diametrically opposed positions a casting inlet part comprising a casting hole for casting the mixture into the cavity and a discharge outlet part comprising a discharge hole for discharging gases in the cavity or the mixture to the exterior of the casting mold,
said holding member has a holding part for casting inlet part for holding the casting inlet part and a casting hole sealing part for sealing said casting hole by nipping said casting inlet part,
holding of casting mold with said holding member is carried out by holding said casting inlet part with said holding part for casting inlet part in a state where the casting mold is positioned almost perpendicular to a horizontal plane as well as the discharge hole is positioned at a top, and
casting of said starting material liquid is carried out by casting said starting material liquid through said casting hole and completed by sealing said casting hole with said casting hole sealing part.
[36] The method of manufacturing a plastic lens according to [35], characterized in that
said casting mold has a mold (referred to as "first mold", hereinafter) for forming one side of the lens and a mold (referred to as "second mold", hereinafter) for forming the other side thereof that are positioned opposite at a prescribed interval, a circular gasket is positioned around said two molds, and a cavity is formed with said molds and gasket, and
said gasket is provided with said casting hole and said discharge hole.
[37] The method of manufacturing a plastic lens according to [36], characterized in that
said holding member has a thickness retaining means holding said casting mold by nipping said first mold and second mold from both outer sides,
said casting mold is held with said holding member also by nipping said first mold and second mold with said thickness retaining means from both outer sides.
[38] The method of manufacturing a plastic lens according to [36] or [37], characterized in that
said holding part for casting inlet part comprises a member having a groove (referred to as "holding part groove", hereinafter), said casting mold is held in a state where said holding part groove is contacted with at least a portion of the casting inlet part.
[39] The method of manufacturing a plastic lens according to any of [36] to [38], characterized in that
said casting hole sealing part comprises a member having a groove (referred to as "sealing part groove", hereinafter), the casting inlet part is nipped with said sealing part groove to seal said casting hole.
[40] The method of manufacturing a plastic lens according to [39], characterized in that said sealing part groove nips said casting inlet part to seal said casting hole in a state where the sealing part groove opens in a different direction from the opening direction of said holding part groove.
[41] The method of manufacturing a plastic lens according to any of [36] to [40], characterized in that
said holding part for casting inlet part contacts with at least two vertical positions of said casting inlet part, as well as
said casting hole sealing part nips said casting inlet part at a portion between the portions contacting with said holding part for casting inlet part to seal said casting hole.
[42] The method of manufacturing a plastic lens according to any of [36] to [41], characterized by moving said casting hole sealing part by applying force from outside of said holding member.
[43] The method of manufacturing a plastic lens according to any of [36] to [42], characterized in that said starting material liquid comprises plural polymerizable components as well as said polymerizable components start polymerization immediately after mixing and cure within 10 minutes.

[44] The method of manufacturing a plastic lens according to any of [36] to [43], characterized in that said starting material liquid comprises the following components (A) and (B).

Component (A): isocyanate terminal prepolymer in the form of a reaction product of an aliphatic diisocyanate having an intramolecular cyclic structure and a diol having an average molecular weight of 300-2,500.

Component (B): one or more aromatic diamines denoted by general formula (I). (In general formula (I), $R_1$, $R_2$ and $R_3$ are each independently any of a methyl, ethyl or thiomethyl group.)

[Chem. 3]

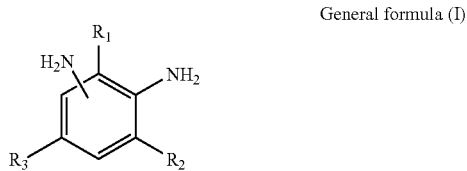

General formula (I)

[45] A holding member for plastic lens casting mold for holding a casting mold for molding a plastic lens, characterized in that said casting mold has a mold (referred to as "first mold", hereinafter) for forming one side of the lens and a mold (referred to as "second mold", hereinafter) for forming the other side thereof that are positioned opposite at a prescribed interval, a circular gasket is positioned around said two molds, and a cavity is formed with said molds and gasket, said gasket has a casting inlet part having a casting hole communicating an inside of said cavity with an outside thereof and a discharge outlet part having a discharge hole communicating the inside of said cavity with the outside thereof, that are positioned opposite in a diameter direction, said holding member has a holding part for casting inlet part for holding the casting inlet part and a casting hole sealing part for sealing said casting hole by nipping said casting inlet part, as well as said holding member is the one for holding said casting mold in a state where the casting mold is positioned almost perpendicular to a horizontal plane as well as the discharge hole is positioned at a top.

[46] The holding member for plastic lens casting mold according to [45], characterized in that said holding member has a thickness retaining means holding said casting mold by nipping said first mold and second mold from both outer sides.

[47] The holding member for plastic lens casting mold according to [45] or [46], characterized in that said holding member has a connection for fitting said holding member with a conveying means.

[48] The holding member for plastic lens casting mold according to any of [45] to [47], characterized in that said holding part for casting inlet part comprises a member having a groove (referred to as "holding part groove", hereinafter), said casting mold is held in a state where said holding part groove is contacted with at least a portion of the casting inlet part.

The holding member for plastic lens casting mold according to any of [45] to [48], characterized in that said casting hole sealing part comprises a member having a groove (referred to as "sealing part groove", hereinafter), the casting inlet part is nipped with said sealing part groove to seal said casting hole.

[50] The holding member for plastic lens casting mold according to [49], characterized in that said sealing part groove nips said casting inlet part to seal said casting hole in a state where the sealing part groove opens in a different direction from the opening direction of said holding part groove.

[51] The holding member for plastic lens casting mold according to any of [45] to [50], characterized by moving said casting hole sealing part by applying force from outside of said holding member.

[52] A plastic lens manufacturing apparatus mixing plural polymerizable components and immediately after mixing, casting a mixture into a casting mold, characterized in that said casting mold has an internal cavity, said plastic lens manufacturing apparatus comprises:

a carbon dioxide injection part that provides said cavity of the casting mold with carbon dioxide, a starting material liquid casting part that casts the starting material liquid into the casting mold provided with carbon dioxide, a debubbling part that removes bubbles in said cavity by tilting said casting mold in which the starting material liquid has been cast, a conveying means that holds said casting mold and conveying the casting mold to each part above.

BEST MODE FOR CARRYING OUT THE INVENTION

The present invention will be described in detail below.

[First Aspect]

The manufacturing method of a plastic lens of the first aspect of the present invention is a method of manufacturing a plastic lens by mixing plural polymerizable components, and immediately after mixing, casting a mixture into a casting mold and conducting polymerization to obtain a molded article. The manufacturing method of the plastic lens of a first aspect of the present invention is suitable for manufacturing a plastic lens from a starting material liquid having a high viscosity and a high initial polymerization rate, for example, a starting material liquid that starts polymerization immediately after mixing and cures within 10 minutes. In the present invention, "polymerizable component" means a component having a polymerizable group, for example, can be a monomer or a prepolymer.

The plural polymerizable components mentioned above preferably comprise the following components (A) and (B), more preferably consist of the following components (A) and (B).

Component (A): isocyanate terminal prepolymer in the form of a reaction product of an aliphatic diisocyanate having an intramolecular cyclic structure and a diol having an average molecular weight of 300-2,500.

Component (B): one or more aromatic diamines denoted by general formula (I). (In general formula (I), $R_1$, $R_2$ and $R_3$ are each independently any of a methyl, ethyl or thiomethyl group.)

[Chem. 4]

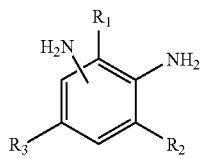

General formula (I)

Components (A) and (B) will be described below.

Isocyanate Terminal Prepolymer Component (A)

Component (A) is an isocyanate terminal prepolymer in the form of a reaction product of an aliphatic diisocyanate having an intramolecular cyclic structure and a diol having an average molecular weight of 300-2,500. Making the diisocyanate, one starting material of the aforementioned isocyanate terminal prepolymer, an aliphatic diisocyanate having an intramolecular cyclic structure facilitates control of the reaction during manufacturing or polymerizing the prepolymer and imparts suitable elasticity to the molded article finally obtained. Further, it imparts high heat resistance and good mechanical characteristics to the molded article obtained.

The aliphatic diisocyanate having an intramolecular cyclic structure is an aliphatic diisocyanate having a cyclic structure in the main chain or in the side chain. The cyclic structure may be alicyclic, aromatic, or heterocyclic. However, the aliphatic diisocyanate having an intramolecular cyclic structure is desirably an alicyclic diisocyanate from the perspective of preventing yellowing and maintaining adequate elasticity and hardness. Molded articles obtained with isocyanate having an aromatic ring tend to yellow more than those obtained with alicyclic diisocyanate; molded articles obtained with aliphatic chain-structured isocyanate tend to be softer and lose their shape more readily.

Examples of alicyclic diisocyanates are: 4,4'-methylenebis (cyclohexyl isocyanate), isophorone diisocyanate, 1,2-bis (isocyanate methyl)cyclohexane, 1,3-bis(isocyanate methyl) cyclohexane, 1,4-bis(isocyanate methyl)cyclohexane, 1,2-diisocyanate cyclohexane, 1,3-diisocyanate cyclohexane, and 1,4-diisocyanate cyclohexane. Examples of diisocyanates having aromatic rings are: m-xylylene diisocyanate, o-xylylene diisocyanate, p-xylylene diisocyanate, and m-tetramethylxylylene diisocyanate. It is particularly preferable that the alicyclic diisocyanate is at least one selected from the group consisting of 4,4'-methylenebis(cyclohexyl isocyanate), isophorone diisocyanate, and 1,3-bis(isocyanate methyl)cyclohexane.

The average molecular weight of the diol that is the other starting material of the isocyanate terminal prepolymer of component (A) is 300-2,500. In the present invention, "average molecular weight" means number average molecular weight.

When the average molecular weight of the diol is less than 300, toughness cannot be imparted to the molded article obtained, and when greater than 2,500, the molded article obtained becomes soft and does not retain its shape. The average molecular weight of the diol is desirably 400-1,000.

Examples of diols having an average molecular weight of 300-2,500 are polyether diols and polyester diols. These diols are preferred because of good compatibility with the other component. In the case of a diol of poor compatibility, it becomes necessary to add another component in the form of a compatibility enhancer to maintain the transparency of the molded article obtained, potentially resulting in loss of transparency.

Examples of such diols are: polyoxyethylene glycol, polyoxypropylene glycol, polyoxytetramethylene glycol, polyester diol comprised of ethylene glycol and adipic acid, polyester diol comprised of propylene glycol and adipic acid, polyester diol comprised of diethylene glycol and adipic acid, polyester diol comprised of 1,4-butane diol and adipic acid, polyester diol comprised of neopentyl glycol and adipic acid, polyester diol comprised of 1,6-hexanediol and adipic acid, polyester diol comprised of 1,10-decanediol and adipic acid, polyester diol comprised of 1,4-butanediol and sebacic acid, polycaprolactone diol comprised of ethylene glycol and ε-caprolactone, polycaprolactone diol comprised of propylene glycol and ε-caprolactone, polycaprolactone diol comprised of diethylene glycol and ε-caprolactone, polycaprolactone diol comprised of 1,4-butane diol and ε-caprolactone, polycaprolactone diol comprised of neopentyl glycol and ε-caprolactone, polycaprolactone diol comprised of 1,6-hexane diol and ε-caprolactone, polycaprolactone diol comprised of 1,10-decane diol and ε-caprolactone, and polycarbonate glycol. Preferred examples are: polyoxypropylene glycol, polyoxytetramethylene glycol, polyester diol comprised of 1,4-butane diol and adipic acid, polyester diol comprised of neopentyl glycol and adipic acid, polyester diol comprised of 1,6-hexane diol and adipic acid, and polyester diol comprised of 1,10-decane diol and adipic acid.

In the present invention, a diol comprising an intramolecular sulfur atom and having a molecular weight of 300-2,500 can be employed as a starting material of isocyanate terminal prepolymer component (A). Incorporation of a sulfur atom in a diol molecule permits an improvement of refractive index while suppressing decrease of abbe number. The existent state of a sulfur atom in a diol molecule is not specifically limited, but it is preferable that a sulfur atom is incorporated in a molecule by at least one bonding pattern among a sulfide bond, disulfide bond, thioester bond, dithioester bond, thiocarbonate bond and dithiocarbonate bond. By incorporating a sulfur atom by the above bonding pattern, component (A) is afforded a good compatibility with other components, and a molded article with no coloring and excellent transparency can be obtained. In contrast, a sulfur atom incorporated in the molecule by a bonding pattern other than above tends to deteriorate a compatibility of component (A) with other components. In that case, it becomes necessary to add another component in the form of a compatibility enhancer to maintain the transparency of the molded article obtained, potentially resulting in remarkable coloring. In view of the above matters, the other starting material of the isocyanate terminal prepolymer of component (A) preferably comprises an intramolecular sulfur atom by at least one bonding pattern among a sulfide bond, disulfide bond, thioester bond, dithioester bond, thiocarbonate bond and dithiocarbonate bond.

The isocyanate group content of isocyanate terminal prepolymer component (A) desirably falls within a range of 10-20 weight percent. When the above-stated isocyanate group content is equal to or greater than 10 weight percent, a molded article with high hardness can be obtained, and when the above-stated range is equal to or less than 20 weight percent, a molded article with high toughness (adequate strength) can be obtained. The above-stated isocyanate group content further preferably falls within a range of 11-15 weight percent.

Aromatic Diamine Component (B)

Component (B) is one or more aromatic diamines denoted by general formula (I) above. In general formula (I), $R_1$, $R_2$, and $R_3$ are each independently any of a methyl, ethyl, or thiomethyl group. Employing substituents $R_1$, $R_2$, and $R_3$ mentioned above can suppress crystallinity and enhance compatibility with the other components. When these substituents are absent or present in low numbers, crystallinity rises, resulting in handling difficulty. When employing the other substituents, compatibility with the other components deteriorates, resulting in apprehensively decreasing the transparency of the material obtained.

The following compounds are more specific examples of the above-stated aromatic diamines: 1,3,5-trimethyl-2,4-diaminobenzene, 1,3,5-trimethyl-2,6-diaminobenzene, 1,3,5-triethyl-2,4-diaminobenzene, 1,3,5-triethyl-2,6-diaminobenzene, 1,3,5-trithiomethyl-2,4-diaminobenzene, 1,3,5-trithiomethyl-2,6-diaminobenzene, 3,5-diethyl-2,4-diaminotoluene, 3,5-diethyl-2,6-diaminotoluene, 3,5-dithiomethyl-2,4-diaminotoluene, 3,5-dithiomethyl-2,6-diaminotoluene, 1-ethyl-3,5-dimethyl-2,4-diaminobenzene, 1-ethyl-3,5-dimethyl-2,6-diaminobenzene, 1-ethyl-3,5-dithiomethyl-2,4-diaminobenzene, 1-ethyl-3,5-dithiomethyl-2,6-diaminobenzene, 1-thiomethyl-3,5-dimethyl-2,4-diaminobenzene, 1-thiomethyl-3,5-dimethyl-2,6-diaminobenzene, 1-thiomethyl-3,5-diethyl-2,4-diaminobenzene, 1-thiomethyl-3,5-diethyl-2,6-diaminobenzene, 3-ethyl-5-thiomethyl-2,4-diaminotoluene, 3-ethyl-5-thiomethyl-2,6-diaminotoluene, and 3-thiomethyl-5-ethyl-2,4-diaminotoluene.

In the above-listed aromatic diamines, $R_1$ is desirably a methyl group and $R_2$ and $R_3$ each desirably represent either an ethyl group or thiomethyl group, in which case the molded article obtained tends not to haze and can be imparted with adequate toughness. More specific examples of the above-stated aromatic diamines are: 3,5-diethyl-2,4-diaminotoluene, 3,5-diethyl-2,6-diaminotoluene, 3,5-dithiomethyl-2,4-diaminotoluene, and 3,5-dithiomethyl-2,6-diaminotoluene.

As for the mixing ratio of components (A) and (B), the molar ratio of the isocyanate group of component (A) with respect to the amino group of component (B) desirably falls within a range of 1.00-1.15 from the perspective of achieving adequate toughness (strength). The above-stated molar ratio further preferably falls within a range of 1.02-1.12.

In the manufacturing method of the first aspect, plural polymerizable components, such as above-described components (A) and (B), are mixed. Following mixing, the mixture is immediately cast into the casting mold and polymerized to obtain a molded article. In the mixing of the plural polymerizable components, a uniform mixture of two liquids can be obtained employing a rapidly rotating shaft or a static mixer. In particular, a reaction injection molding ("RIM" hereinafter) machine is desirably employed to mix components (A) and (B).

The configuration and operation of the RIM machine will be described below based on FIG. 8, taking mixing of components (A) and (B) as an example.

The RIM machine is comprised of material tank 11A storing component (A); material tank 11B storing component (B); mixing and discharging part 15 mixing and discharging components (A) and (B); material flow passage 13A connecting material tank 11A with mixing and discharging part 15; and material flow passage 13B connecting material tank 11B with mixing and discharging part 15. In the middle of material flow passages 13A and 13B, filters 14A and 14B are respectively provided for filtration of foreign matter in these components. A shaft rotating at high speed or a static mixer is provided in mixing and discharging part 15 to mix components (A) and (B) arriving over material flow passages 13A and 13B.

Components (A) and (B) are held at a reduced pressure in their respective material tanks mentioned above, adequately degassed, and maintained at a prescribed temperature. When degassing is inadequate, bubbles sometimes enter the molded article, compromising the properties and external appearance of the finished product and tending to reduce the mechanical strength of the molded article. Once they have been adequately degassed and rendered uniform in temperature, the respective components are forced by pumps 12A and 12B from material tanks 11A and 11B over material flow passages 13A and 13B and through filters 14A and 14B into mixing and discharging part 15. The mixture that has been rapidly and uniformly mixed in mixing and discharging part 15 is discharged through discharge outlet 16.

Heating component (A) to lower the viscosity thereof before mixing components (A) and (B) is desirable from the perspective of avoiding defects due to bubbles. Since component (A) is generally of high viscosity, heating it to less than or equal to 8,000 CPS to impart a certain degree of fluidity before mixing with component (B) is desirable from the perspective of facilitating mixing with component (B). At or below this viscosity, bubbles are readily removed prior to mixing when employing an RIM, described further below. The component (A) is desirably heated to a temperature at which the viscosity is 6,000 CPS or less, preferably 4,000 CPS or less.

The mixture obtained is immediately cast into a casting mold. Here, the term "immediately" means before completion of polymerization of plural polymerizable components. This will vary with the types of polymerizable components employed; however, by way of example, their casting into the casting mold can be begun within about 0.5 to 5 seconds. Suitable reference can be made to the conditions described in column 5 of U.S. Pat. No. 6,127,505, for example, for polymerization reaction conditions and the like. These will also be provided in detail in Examples further below. To the extent that the transparency and strength of the molded article are not lost, additives such as mold release agents, anti-oxidants, ultraviolet stabilizers, color blockers, and the like may be added as needed to the molded article obtained by the manufacturing method of the present invention. Examples of additives are described in columns 6 and 7 of U.S. Pat. No. 6,127,505; however, the present invention is not limited thereto.

Casting Mold

The casting mold employed in the first aspect of the invention will be described below.

In the first aspect of the invention, a casting mold is employed that has an internal cavity and has at diametrically opposed positions a casting hole for casting the mixture into the cavity and a discharge hole for discharging gases in the cavity or the mixture to the exterior of the casting mold. A specific example of such a casting mold will be described based on the drawings. However, the present invention is not limited to the modes indicated below.

The casting mold employed in the first aspect can be the one having a mold for forming one side of the lens and a mold for forming the other side thereof that are positioned opposite at a prescribed interval, a circular gasket is positioned around said two molds, and a cavity is formed with said molds and gasket.

An example of the gasket is a gasket for molding plastic lens comprised of a cylindrical member comprising openings for fitting by insertion a first mold and second mold comprising a molding surface for forming an optically functional surface of plastic lenses, characterized in that said cylindrical member has a casting inlet part and a discharge outlet part on an outer wall surface thereof, said casting inlet part has a casting tube part having a through-hole (casting hole) inside and a casting inlet apical part provided on an end part of said casting tube part, where an inside of said cylindrical member is communicated with an outside thereof through said casting hole, said discharge outlet part has a discharge hole communicating the inside of said cylindrical member with the outside thereof, said gasket has said casting hole and discharge hole at diametrically opposed positions, said casting inlet apical part has an opening of said casting hole and a inclined plane around the opening. The casting mold employed in the present invention can be the one wherein a first mold and second mold are detachably held in said openings of the gasket mentioned above so that a molding surface of the first mold and a molding surface of the second mold are positioned opposite at a prescribed interval to form a cavity corresponding to a lens shape within said cylindrical member. Such a casting mold will be described based on the drawings.

FIG. 1 is a top view of a gasket for molding plastic lenses. FIG. 2 is a sectional view showing a lens mother die installed in the gasket shown in FIG. 1. As shown in FIG. 2, a cavity 4 is formed within gasket 1 by installing a lens mother die 2 comprised of a first mold 2A and a second mold 2B.

Gasket 1 comprises: cylindrical tubular member 5 having openings into which are fitted by insertion first mold 2A and second mold 2B, respectively; holding part 6 provided in protruding fashion in the inner wall surface of tubular member 5 to contact at least the perimeter portion of first mold 2A and thus hold first mold 2A in position; casting inlet part 7 positioned on the outer wall surface of tubular member 5 for casting a starting material liquid into cavity 4; and discharge outlet part 8, also positioned on the outer wall surface of tubular member 5, for discharging gases and excess starting material liquid from the cavity during casting. Gasket 1 can be comprised of an elastic resin, examples of which are: ethylene acetate vinyl copolymer, polyethylene, polyethyl acrylate, and silicone rubber. A further example is a mixed product of polypropylene and ethylene propylene rubber (for example, the product Santoprene, made by Advanced Elastomer Systems Corp.). This material is desirable because of high resistance to heat.

Tubular member 5, holding part 6, casting inlet part 7, and discharge outlet part 8 can be integrally molded by injection molding. First mold 2A and second mold 2B constituting lens mother die 2 are comprised of glass or the like and are round in shape when viewed from the front. The rims of the first and second molds are desirably of a shape capable of remaining in contact with the inner wall surface of tubular member 5 of gasket 1 without a gap.

First mold 2A and second mold 2B have molding surfaces for forming the optically functional surfaces of the plastic lens. For example, first mold 2A can be a convex mold (also referred to as "lower mold", hereinafter) having a molding surface on the convex surface side for forming the rear surface (concave surface) of the plastic lens, and second mold 2B can be a concave mold (also referred to as "upper mold", hereinafter) having a molding surface on the concave surface side for forming the front surface (convex surface) of the plastic lens; however, these are not limitations. The inner diameter of tubular member 5 of gasket 1 can be substantially identical or somewhat smaller than the outer diameter of first mold 2A and second mold 2B. However, as set forth above, the shape is suitably one capable of maintaining contact with the inner wall surface of tubular member 5 without a gap. The molds installed in the gasket can be nipped in place with springs or the like exerting forces directed toward the interior of tubular member 5 from either side as necessary to secure them to the gasket. In the form shown further below in FIG. 19, the molds are secured to the gasket by being nipped from both sides with a spring mechanism equipped with a casting mold holding member.

It suffices for tubular member 5 to have a height capable of ensuring the thickness of the rim portion of the lens to be molded (the thickness of the rim part of cavity 4) and the thickness required to hold the rims of first mold 2A and second mold 2B. When second mold 2B is of a convex shape facing the opening of tubular member 5, the height of tubular member 5 is desirably set so that the tip of the convex surface of second mold 2B does not protrude to the outside from the outer wall surface of the tubular member.

A holding part may be provided to hold at least first mold 2A in position, with no holding part provided to hold second mold 2B in position. In that case, second mold 2B is pushed into the gasket to a prescribed position and held by the elasticity of the gasket. Further, protrusions for holding first mold 2A and protrusions for holding second mold 2B can be separately provided as holding parts. Still further, the holding parts may hold first mold in position by contacting the rim of first mold 2A and hold second mold 2B in position by contacting the rim portion of second mold 2B. The beltlike holding part shown in FIG. 1 is an example of such a holding part.

In the mode shown in FIGS. 1 and 2, holding part 6 of gasket 1 is a beltlike protruding belt formed circumferentially around the inner wall surface of tubular member 5. The upper and lower surfaces of holding part 6 come into contact with the rim of the molding surface of first mold 2A and the rim of the molding surface of second mold 2B; the height of these contact portions can be suitably established in conformity with the shape of the rims of the molding surfaces of the molds. In FIG. 2, first mold 2A having a spherical molding surface and second mold 2B are installed in the gasket shown in FIG. 1. The position (height) of the upper surface and the position (height) of the lower surface respectively can be made identical in the circumferential direction of beltlike holding part 6. At other times, the position (height) of the upper surface and the position (height) of the lower surface differ in the circumferential direction of beltlike holding part 6. When the holding part of the gasket is beltlike, beltlike protrusions for holding first mold 2A and second mold 2B may be integrally formed or may be formed separately.

The structure of holding part 6 is not limited to the above-described form; any protrusion having a portion capable of contacting the rim of the molding surface of the mold will suffice. For example, as shown in FIG. 11, the plural protruding pins may be provided. The placement and number of protruding pins may be varied as desired. It is also possible for the upper and low contact portions to be separate protrusions. Still further, for example, as shown in FIG. 12, holding part 6 may have a notch structure in the vicinity of the opening on the cavity side of the casting hole. As shown in FIG. 13, a shape in which the thickness of holding member 6 is varied in a tapered shape in the direction of the discharge hole and casting hole is also possible.

Casting inlet part 7 of gasket 1 comprises casting inlet apical part 25, casting tube part 24 connecting casting inlet apical part 25 to the gasket wall surface, and casting hole (through-hole) 20 communicating the inside of the tubular member with the outside thereof, through casting inlet apical part 25 and the inside of casting tube part 24 (see FIG. 2). Casting inlet apical part 25 has a casting inlet apical plane part 21 that is the contact surface with the nozzle apical plane part 31 of the casting nozzle 30, described further below, in roughly the center of which is provided casting inlet opening 22, the opening of casting hole 20.

The shape of the cross section perpendicular to the axial direction of the starting material liquid flow route (casting hole 20) running from casting inlet opening 22 to cavity 4 is not specifically limited. For example, it may be round, elliptical, triangular, rectangular, or otherwise polygonal. However, the starting material liquid tends to reside in angular portions when present, so round and elliptical shapes are preferred. As shown in FIG. 14, the portion connecting casting hole 20 and cavity 4 may be in the form of a tapered opening. In FIG. 14, the inner diameter of casting hole 20 is constant from casting inlet opening 22 to cavity 4. This is not a limitation; the shape may gradually increase or decrease in size, for example. A shape in which the inner diameter reaches a minimum in the center portion of casting tube part 24, gradually increasing both toward casting inlet opening 22 and cavity 4, is also possible. Given that bubble entrainment and starting material liquid correction tend not to occur when the flow rate is constant, the cross-sectional shape of casting hole 20 is desirably free of internal irregularities and constant throughout casting hole 20. Further, the cross-sectional area in the vicinity of the opening on the cavity side may gradually increase so that the starting material liquid smoothly enters the cavity. It is also desirable for the internal diameter of casting hole 20 to gradually decrease from casting inlet opening 22 toward cavity 4 because such a configuration may also be employed when the peripheral surface of the lens being molded is narrow in width.

The size of casting inlet opening 22 is desirably either roughly identical to, or smaller than, the size of the casting jig opening, described further below. The term, "size of the opening" refers to the area of the portions of the casting jig and casting inlet opening toward the exterior. In the present invention, the shape of the casting inlet opening is not specifically limited; it may be round, elliptical, triangular, or otherwise polygonal. However, round and elliptical shapes without angular portions are desirable because starting material liquid tends not to reside. Since starting material liquid tends to flow smoothly from casting nozzle 30, described further below, to casting hole 20 and tends not to reside, the two openings are desirably of roughly the same shape or the shape of casting inlet opening 22 is made slightly smaller than that of nozzle apical opening 32 so that the difference in level is small when nozzle apical opening 32 is connected to casting inlet opening 22.

A plane (referred to as "casting inlet apical plane part") is desirably formed entirely around said casting inlet opening 22. In the mode shown in FIG. 2, the sectional shape of casting hole 20 is round, the shape is constant over the entire flow path, and casting inlet apical plane part 21 is inclined relative to the axis of casting hole 20, so casting inlet opening 22 has been formed elliptically. Further, nozzle hole 33 of casting nozzle 30, described further below, is, for example, round in cross-sectional shape and slightly larger in internal diameter than casting hole 20.

When the casting inlet apical plane part is made horizontal, the casting jig must be gradually brought in close from directly below the casting mold to cast a starting material liquid from below the casting mold. When causing a starting material liquid to flow out of the casting jig opening, overflowing starting material liquid ends up severely polluting the area around the casting inlet opening. When the casting inlet apical plane part is horizontal, it is necessary to bend the casting hole to cast a starting material liquid from below the casting mold, running the risk of entraining bubbles. Thus, in the present invention, the apical part of the casting inlet (the casting inlet apical plane part) desirably comprises an inclined flat plane. The nozzle apical plane part 31 of casting nozzle 30 shown in FIG. 7, described further below, comprises a flat plane inclined relative to the axis of nozzle hole 33. Thus, the apical opening 32 of the nozzle of casting nozzle 30 has been made elliptical. The degrees of incline of casting inlet apical plane part 21 and nozzle apical plane part 31 can be roughly identical relative to the axial direction of the individual holes, and casting inlet opening 22 can be slightly smaller than apical opening 32 of the nozzle and similarly elliptical in shape.

In the mode shown in FIG. 2, casting inlet apical plane part 21 has a flat plane that is roughly square in external shape, with casting inlet opening 22 positioned roughly in the center. The shape of casting inlet apical plane part 21 is not limited thereto. Any shape permitting casting inlet apical plane part 21 and nozzle apical plane part 31 to be brought into contact completely around casting inlet opening 22 or nozzle apical opening 32 to connect casting hole 20 and nozzle hole 33 will suffice. Examples are circular, elliptical, rectangular, triangular, and other polygonal shapes.

Casting tube part 24, with a casting hole 20 in its interior, connects at one end to the sidewall of the gasket, and at the other end to casting inlet apical part 25. FIG. 15 is a sectional view along section line I-I (on the casting hole side) of the gasket shown in FIG. 1. As shown in FIG. 15(*a*), for example, the opening on the cavity 4 side of casting hole 20 may be positioned in the center of beltlike holding part 6, or, as shown in FIG. 15(*b*), may be positioned off-center toward one of the molds.

A thin-walled part 23 of reduced thickness is provided on the lateral surface of casting tube part 24 to facilitate pinching of casting tube part 24 from the outside and sealing of casting hole 20; the shape of this part can be readily varied. Further, in the present invention, since the resin that has polymerized within the casting hole during the manufacturing process, described further below, is severed and broken off, the shape can also be one permitting the bending of casting tube part 24.

A positioning structure can also be provided in casting inlet part 7. This positioning structure can be used for vertical and horizontal positioning of the molds, particularly for vertical and horizontal positioning of the casting inlet part and securing of the gasket to the holding member. In the mode shown in FIG. 2, a vertical-positioning part 26 in the form of a flange protruding perpendicularly to the axial direction of casting tube part 24 of casting inlet part 7 is formed thereon. Below this flange is formed a horizontal-positioning part 27 caving farther inward than vertical-positioning part 26. Casting inlet part holding plate 2023 having a two-forked portion fitting into vertical-positioning part 26 and horizontal-positioning part 27 is provided in holding member 201 (see FIG. 19). Horizontal-positioning part 27 inserts between the two forked portion of casting inlet part holding plate 2023 and is horizontally positioned, and the lower surface of vertical-positioning part 26 contacts the upper surface of this two-forked portion, is held, and is thereby vertically positioned. Thin-walled part 23 is formed to cave farther inward than horizontal-positioning part 27 in the center of horizontal-positioning part 27. However, the shapes of vertical-positioning part 26 and horizontal-positioning part 27 are not limited to what has been described herein. For example, it suffices to form a positioning part comprised of an indentation and a protrusion on casting tube part 24 and to form a positioning support part having protruding strips or grooves meshing with the indentation and protrusion on the holding member to perform vertical and horizontal positioning. Still further, it is possible to provide horizontal-positioning parts above and below the vertical-positioning parts. Vertical positioning and horizontal-positioning parts with structures such as those shown in FIG. 2 are desirable because they permit the formation of a thin wall in the casting tube part containing the horizontal-positioning part and thinned vertical-positioning part in the axial direction of the casting tube part, thereby facilitating bending of the lens starting material that has cured in the casting hole together with the casting tube part.

Discharge outlet part 8 is comprised of discharge hole (through-hole) 40 communicating cavity 4 with the exterior, liquid reservoir part 42 having an indentation communicating through discharge hole 40 with the cavity, and constricted part 43 communicating liquid reservoir part 42 with the wall surface of the gasket. Discharge outlet opening 41 is provided in the top portion of liquid reservoir part 42. Discharge hole 40 is positioned diametrically opposite casting hole 20. Positioning discharge hole 40 diametrically opposite casting hole 20 is advantageous in that air can escape until the end when a starting material liquid is cast with casting inlet part 7 positioned below.

The sectional shape perpendicular to an axial direction of discharge hole 40 can be rectangular, but this is not by way of limitation. Since constricted part 43 is narrower than liquid reservoir part 42, bending of this portion permits the ready severing and breaking off of resin that has polymerized within discharge hole 40. The shape of constricted part 43 is not specifically limited. However, when the sectional shape of constricted part 43 is excessively large, it becomes difficult to sever the resin following polymerization. Thus, the shape of constricted part 43 is desirably determined in this light.

In the manufacturing method of the first aspect, with the casting mold roughly perpendicular to the horizontal plane and the discharge hole at the top, a starting material liquid is cast from the bottom (through the casting inlet). Thus, in gasket 1, discharge hole 40 is desirably positioned close to the convex mold side (a position close to first mold 2A in FIG. 2). In the description given below, the convex mold will be referred to as the lower mold.

Bubbles mixing into cavity 4 during casting move upward, pass through discharge hole 40, and exit through cavity 4. However, since the surface of the liquid rises in a nearly horizontal state within cavity 4, bubbles often remain in the inner wall portion of the gasket around the opening on the cavity side of discharge hole 40, particularly in the angular portion formed with the inner wall portion and the rim of the molding surface of the mold. When manufacturing a high-power concave lens or when molding a lens with a sharply curved lower mold, an acute angle is formed between the gasket inner wall and the molding surface of the lower mold. Thus, bubbles collecting in the angular portion on the lower mold side tend to be harder to remove than those on the upper mold side. Thus, to facilitate the removal of hard to remove bubbles on the lower mold side, it is desirable to form the discharge hole close to the lower mold. Further, when bubbles form at the top in the cavity, small bubbles that form, particularly bubbles forming in a highly viscous starting material liquid, tend not to move. As a result, the removal of bubbles is difficult. By contrast, displacing the position of the discharge hole toward one of the casting molds causes large bubbles to tend to form on one side and bubbles to tend not to form (or small bubbles to form) on the other side. Thus, the large bubbles can be tilted to allow easy movement, thereby readily removing the bubbles. Particularly when molding semifinished lens blanks (lens blanks one surface of which alone has been optically finished), the surface molded with the lower mold is normally ground and polished to a finished surface. Thus, positioning the discharge hole close to the lower mold causes large bubbles to tend to form on the upper mold side and causes bubbles to tend not to form (or small bubbles to form) on the lower mold side. The large bubbles forming on the upper mold side tend to move readily in the mixture of high viscosity, and can thus be readily removed. Further, the surface molded with the lower mold is removed during grinding and polishing, so any remaining small bubbles do not create a problem. Further, as stated further below, bubbles consist of carbon dioxide, so small bubbles tend to be absorbed into the starting material liquid.

The opening of discharge hole 40 on the cavity side is desirably provided in the all thickness direction in the top of the peripheral surface because this causes bubbles to tend not to remain. However, the molding for such a gasket requires multiple jigs conforming to the size of the various discharge holes. Further, considering that replacement of the jigs compromises manufacturing capacity, the above-described method is preferred in that bubbles can be handled inexpensively.

Casting Jig

A casting jig suitable for use in the present invention will be described below.

In the present invention, a casting jig equipped with a nozzle for casting a plastic lens starting material into the aforementioned casting mold for molding a plastic lens can be employed. The nozzle material is not specifically limited; examples are metal and resin. A specific example of such a nozzle is shown in FIG. 16. FIG. 16($a$) is a lateral view of the nozzle. FIG. 16($b$) is a front view of the nozzle. FIG. 16($c$) is a top view of the nozzle. And FIG. 16($d$) is a sectional view along section line II-II. The nozzle shown in FIG. 16 can be attached for use to a tip of a tube detachably attached to a discharge outlet of a mixing chamber in which mixing of a plastic lens starting material liquid is carried out.

As shown in FIG. 16, casting nozzle 30 has tubular part 34 at one end and tube connecting part 36 at the other end, with casting jig fixing part 35 in the middle. Nozzle hole 33 in the form of a through-hole for allowing passage of plastic lens starting material liquid is provided in casting nozzle 30.

The sectional shape perpendicular to the axial direction of nozzle hole 33 is not limited to any specific shape. For example, it may be round, elliptical, triangular, rectangular, or otherwise polygonal. However, since a starting material liquid tends to reside in any angular portions that are present, a round or elliptical shape is preferred. The inner diameter of nozzle hole 33 may be constant over the entire nozzle hole, or may increase in size stepwise from one end to the other. In order to achieve a constant flow rate and make it difficult for bubbles to be entrained and a starting material liquid to reside, the sectional shape of nozzle hole 33 is desirably constant throughout nozzle hole 33, with no internal unevenness.

Casting nozzle 30 has at its front end nozzle apical plane part 31 contacting the above-described casting inlet apical plane part 21, in the center of which is provided nozzle apical opening 32 in the form of the opening of above-described nozzle hole 33.

As set forth above, the size of casting inlet opening 22 (see FIG. 2) of the casting mold is desirably either roughly identical to that of the casting jig opening, that is, nozzle apical opening 32, or smaller than that of nozzle apical opening 32. In the present invention, the shape of nozzle apical opening 32 is not specifically limited. Examples are round, elliptical, triangular, rectangular, or otherwise polygonal shapes. However, a round or elliptical shape without angular portions is desirable because it tends to prevent the residence of starting material liquid. Further, as stated above, from the perspective of permitting the starting material liquid to flow smoothly from casting nozzle 30 to casting hole 20 without residence, it is desirable for nozzle apical opening 32 and casting inlet opening 22 to be of roughly the same shape or for casting inlet opening 22 to be slightly smaller than nozzle apical opening 32 so as to minimize any difference in level produced when the two are connected.

The shape of nozzle apical plane part 31 may be any shape permitting casting inlet apical plane part 21 and nozzle apical plane part 31 to connect over the entire perimeter of casting inlet opening 22 and nozzle apical opening 32, linking casting hole 20 and nozzle hole 33. Examples are elliptical, rectangular, triangular or otherwise polygonal shapes. Since there are cases where the mixture adhering to the front end of casting nozzle 30 enters the cavity during casting and causes optical defects, the wall thickness of the front end of casting nozzle 30 is desirably thinned to reduce adhesion of the mixture near the front end of the casting nozzle, particularly to nozzle apical plane part 31, and the area of nozzle apical plane part 31 is desirably made as small as possible. From the above perspectives, the apical part of casting nozzle 30 is desirably tubular. However, when the wall of the apical part of casting nozzle 30 is thinned in this manner and there may be displacement when connecting the apical part of casting nozzle 30 with casting inlet apical part 25, or when nozzle apical surface part 31 catches on casting inlet opening 22 or casting inlet apical plane part 21 protrudes, it is sometimes impossible to form a connection completely around the nozzle opening. Thus, the outer shape of casting inlet apical plane part 21 is desirably made larger than that of nozzle apical plane part 31 to permit a connection between nozzle apical plane part 31 and casting inlet apical plane part 21 completely around nozzle apical opening 32 with nozzle apical opening 32 and casting inlet opening 22 aligned. In the modes shown in FIGS. 1 and 2, since casting tube part 24 bends readily in the direction of pressure when casting nozzle 30 is pressed up against casting inlet apical part 25, it is possible to place a fixture behind casting inlet apical part 25. The outer shape of nozzle apical plane part 31 is also desirably made smaller than that of casting inlet apical plane part 21 so that a starting material liquid tends not to move around and in from the back side of the casting inlet apical part, adhering to the fixture.

In casting nozzle 30, the length of tubular part 34 is desirably greater than or equal to 1 cm. When tubular part 34 is excessively short, there is a risk that a starting material liquid will overflow during casting, move along tubular part 34, and reach casting jig fixing part 35, thus dirtying the casting jig and causing problems in its replacement.

Tube connecting part 36 desirably has an outer diameter slightly larger than the diameter of the hole in the tube employed. Tube connecting part 36 can be inserted through the hole in the front end of the tube. With the tube hole and nozzle hole 33 connected, the elasticity of the tube can be used to connect the tube and casting nozzle 30. The structure of tube connecting part 36 may be any structure permitting connection in a manner such that the starting material liquid does not leak from the connecting part; there are no specific limitations.

The material of the tube connecting with casting nozzle 30 is not specifically limited. However, from the perspectives of being able to secure the tube to the casting nozzle through the elasticity of the tube and being able to freely move the casting nozzle, the use of a flexible, elastic resin is desirable. The use of a highly heat-resistant material is also desirable. Since some starting material liquids will harden within the tube, the tube is desirably replaceable.

Casting Mold Holding Member and Conveying Pallet

An example of a holding member for securing the casting mold that can be employed in the manufacturing method of the first aspect and the pallet upon which it mounted will be described based on the drawings. FIG. 19(*a*) is a front view of holding member 201, FIG. 19(*b*) is a top view of the same, FIG. 19(*c*) is a bottom view of the same, FIG. 19(*d*) is a right lateral view of the same, FIG. 19(*e*) is a left lateral view of the same, and FIG. 19(*f*) is a rear view of the same. FIG. 3 is a drawing showing the pallet upon which the holding member shown in FIG. 19 is provided. The pallet of FIG. 3 will be referred to as a conveying pallet, hereinafter. FIG. 4 shows the conveying pallet shown in FIG. 3, upon which the casting mold is mounted.

Holding member 201 shown in FIG. 19 has the functions of holding the casting mold and securing the upper mold and the lower mold by nipping them inward from two outer sides by means of springs, for example, to control the thickness of the center. The casting mold, as will be described further below, can be held by being nipped from two sides with spring mechanisms (see FIG. 19(*b*)). However, the methods of controlling the center thickness and holding the casting mold are not limited to the above-described structures. For example, a spring mechanism can be employed on just one side.

In the manufacturing method of the first aspect, casting hole 20 is sealed off after casting to prevent the mixture from flowing out through the casting hole. Thus, holding member 201 is provided with a casting hole sealing part (casting hole sealing plate 2021) for sealing casting hole 20 (see FIG. 21). Casting hole sealing plate 2021 has a long, narrow groove. For example, it may be a sliding clamp. Following casting, a force applied from outside holding member 201 may cause casting hole sealing plate 2021 to slide, nipping a portion of casting tube part 24 in the above groove, and thereby sealing the casting hole. When employing the gasket shown in FIG. 2, the thin-walled part 23 provided in casting tube part 24 may be nipped in the above groove so that the casting hole is readily sealed. Further, as set forth above, holding member 201 has casting inlet part holding plate 2023 to position and hold the casting mold.

As shown in FIG. 3, holding members 201 are mounted on conveying pallet 60. Conveying pallet 60 has one or multiple parts securing holding members 201, as well as a part (conveying means connecting part 61) connecting to the conveying means of an automatic casting system, described further below. In conveying pallet 60, once the casting mold has been mounted on the holding member (conveying pallet 70) as shown in FIG. 4, the conveying means of the above-described automatic casting system conveys it to devices conducting various manufacturing steps.

Holding members suited to use in the manufacturing method of the third aspect, described further below, may also be employed in the first aspect.

[Manufacturing Steps]

The manufacturing method of the first aspect comprises, prior to casting the mixture into the casting mold, a step of heating the casting mold and a step of filling the cavity with carbon dioxide, as well as, comprises a step of casting the mixture from the casting hole in a state where the casting mold filled with carbon dioxide is positioned nearly perpendicular to a horizontal plane as well as the discharge hole is positioned at a top, a step of sealing the casting hole following completion of casting the mixture into the casting mold, and a step of leaving the casting mold.

The above manufacturing steps will be described with reference to FIGS. 9 and 10.

FIG. 10 is an overall flowchart of the manufacturing method of the first aspect. FIG. 9 is a drawing descriptive of the flow of the lens starting material casting process in the manufacturing method of the present invention. FIG. 9(a) shows the status prior to the start of casting. FIG. 9(b) shows the intermediate status where the casting nozzle has been brought into contact with the casting inlet apical plane part 21 of the casting mold for casting of a mixture. FIGS. 9(c) and (d) show how the gap between the casting nozzle and casting inlet apical plane part 21 of the casting mold gradually narrows, and casting of the mixture begins. FIG. 9(e) shows how the casting nozzle comes into complete contact with casting inlet apical plane part 21 of the casting mold, and how casting of the mixture is conducted. FIG. 9(f) shows how a sensor detects the rise of the liquid surface, and how the casting hole is sealed with a casting hole sealing part linked to the sensor. FIG. 9(g) shows how debubbling is conducted by tilting the casting mold with the discharge hole positioned at the top. And FIG. 9(h) shows how the casting mold is left after debubbling.

The overall flow of the manufacturing method of the first aspect will be described with reference to FIG. 10.

Initially, first mold 2A and second mold 2B are mounted on gasket 1 to assemble casting mold 3 (S1 in FIG. 10).

In the manufacturing method of the first aspect, casting mold 3 is preheated prior to casting of the mixture (S2 in FIG. 19). When the mixture of components (A) and (B) is cast through casting inlet part 7 of casting mold 3 and the temperature of the casting mold is at least a certain number of degrees lower than the temperature of the mixture, as the mixture moves over the mold surface, a thin air film forms on the mold surface, sometimes causing bubble defects. By contrast, when the casting mold is heated prior to casting of the mixture, wettability increases and the above problems are alleviated. The temperature of the casting mold immediately prior to casting of the mixture is desirably either close to or greater than the temperature during casting of the mixture to improve wettability. Specifically, the casting mold is desirably placed in an electric furnace or infrared furnace and heated to a prescribed temperature, and the mixture is cast into the casting mold after it has been removed from the furnace.

In the manufacturing method of the first aspect, the cavity of the casting mold is filled with carbon dioxide prior to casting the mixture into the casting mold (S3 in FIG. 10). The solubility of components (A) and (B) in carbon dioxide is much higher than in air. Thus, in the case where the interior of the cavity is filled with carbon dioxide, even when the mixture flows in rapidly during mixture casting and bubbles form within the cavity, the bubbles can be eliminated by dissolution of carbon dioxide into the mixture because they are of carbon dioxide.

The cavity 4 of casting mold 3 can be filled with heated carbon dioxide. Filling with heated carbon dioxide is desirable because the heated casting mold does not end up being cooled during carbon dioxide injection. Filling with heated carbon dioxide can be conducted by positioning a heater along the flow route of the carbon dioxide and heating it, or replacing with carbon dioxide the furnace used to heat the casting mold. It is also possible to seal casting inlet part 7 and discharge outlet part 8 following filling with carbon dioxide and heat the casting mold.

After filling the cavity of the casting mold with carbon dioxide, the mixture is cast (S4 in FIG. 10). The mixture is cast from the casting hole with the casting mold nearly perpendicular to the horizontal plane, and with the discharge hole at the top. The casting mold is mounted on holding members such as those shown in FIG. 19, described above, permitting the casting mold to be maintained perpendicular to the horizontal plane and the discharge hole to be kept at the top. In the manufacturing method of the first aspect, since the mixture is cast from below the casting mold, the mixture is cast under the previously injected mixture. Thus, air tends not to be entrained into the casting mold during casting and bubbles tend not to form.

When a mixture of high viscosity such as the mixture employed in the manufacturing method of the first aspect is being cast into the casting mold and the rate of rise of the liquid surface of the mixture varies with the position within cavity 4, there is sometimes a problem in that air near the surface of a liquid with a slow rate of rise remains within cavity 4. By contrast, in the manufacturing method of the first aspect, since casting is conducted with the casting mold roughly perpendicular to the horizontal plane, there is little difference in the rate of rise of the liquid surface with position, and this problem tends not to occur. In particular, when molding myopia-correcting lenses, cavity 4 of the casting mold consists of a narrow gap near the center and a wide gap around the rim. Thus, the mixture tends to flow to the rim rather than into the center. Thus, when the angle of incline is small, the liquid surface of the perimeter portion of the two sides rises more rapidly than the liquid surface near the center and the air near the center is surrounded. When the liquid surface of the perimeter portion reaches to discharge hole 40, there is a problem in that the air near the center remains in cavity 4. By contrast, when the casting mold is positioned roughly perpendicular to the horizontal plane as is done in the manufacturing method of the first aspect, there is little difference in the rate of rise of the liquid surface between the perimeter portion and the center. Thus, this is preferred because the problem of air near the center remaining behind tends not to occur.

At the outset of casting of the mixture, particularly as the liquid surface of the mixture is rising through casting hole 20, air tends to be entrained. Thus, the casting rate is desirably made low to keep down the rate of rise of the liquid surface of the mixture. However, for resins with rapid initial polymerization rates, changing the rate of flow of the lens starting material flowing out through the casting nozzle ends up changing the rate of polymerization of the mixture as it leaves the nozzle, sometimes resulting in optical defects. Further, when an RIM machine is used to mix components (A) and (B), changing the flow rate along the way is sometimes difficult. Accordingly, without changing the flow rate of the mixture flowing out through the casting nozzle, it is desirable to adjust the casting flow rate by adjusting the gap between the nozzle apical part and casting inlet apical part 25. At the outset of casting, nozzle apical plane part 31 and casting inlet apical plane part 21 are desirably gradually brought into contact and casting is conducted without the two being fully in contact (S41 in FIG. 10), with casting finally being conducted with nozzle apical plane part 31 and casting inlet apical plane part 21 in full contact (S42 in FIG. 10). Specifically, casting can be conducted as shown in FIGS. 9(a) to (e). First, as shown in FIG. 9(a), the mixture is made to flow out through casting nozzle 30. In the first aspect, the mixture of components (A) and (B) that is employed polymerizes rapidly. Thus, when the flow is stopped, polymerization proceeds rapidly and the tube and casting nozzle become clogged, with a risk of the already polymerized components in the tube and casting nozzle entering the casting mold. Thus, in the manufacturing method of the first aspect, it is desirable for the mixture to flow continuously out of the casting nozzle during the manufacturing process. When multiple casting molds are employed to continuously manufacture lenses, the tubes used to cast the mixture can be replaced at regular intervals.

As shown in FIG. 9(a), while causing the mixture to flow out of the casting nozzle, casting nozzle 30 is slowly brought in close from below the front of the casting mold. As shown in FIG. 9(b), initially, the casting nozzle is displaced so that the top of the nozzle apical plane part 31 of casting nozzle 30 contacts the top of casting inlet apical plane part 21 of the casting mold. Subsequently, the nozzle apical plane part 31 of the casting nozzle is gradually brought into contact with casting inlet apical plane part 21 from above (FIGS. 9(c) and (d)). Finally, as shown in FIG. 9(e), casting inlet apical plane part 21 and nozzle apical plane part 31 are brought fully into contact and casting can be conducted.

The mixture that is discharged through casting nozzle 30 flows into cavity 4 through casting hole 20. Subsequently, the mixture fills cavity 4, reaching liquid reservoir part 42 through discharge hole 40. When the liquid surface of the mixture reaches a prescribed height within discharge outlet part 8, as shown in FIG. 9(f), a sensor 100 positioned above discharge outlet part 8 is triggered, casting tube part 24 of casting inlet part 7 is nipped in the groove of the casting hole sealing part, casting hole 20 is sealed, and casting stops (S5 of FIG. 10). Casting nozzle 30 is also desirably separated from casting inlet part 7 simultaneously with the sealing of casting hole 20 so that the outflow of the mixture from casting nozzle 30 does not stop.

As set forth above, sensor 100 detects the height of the liquid surface within discharge outlet part 8, thereby stopping the rise of the liquid surface at a prescribed height and stopping casting before the liquid surface reaches discharge outlet opening 41. Thus, the mixture does not overflow from discharge outlet opening 41. Since the casting mold is tilted to conduct debubbling in a subsequent step, it is desirable to adjust the height that is detected with the sensor to prevent overflowing of the mixture after tilting.

Further, since casting hole 20 is sealed, even when casting nozzle 30 is separated from casting inlet part 7, no mixture overflows to the exterior of the casting mold. Further, as set forth above, it is also possible to provide a thin-walled part in a portion of casting tube part 24 and to seal the thin-walled part with the casting hole sealing part. A contact-type or non-contact type liquid surface detecting sensor may be employed in the present invention. A non-contact type sensor is preferred because there is no problem in that a starting material liquid is adhered to the sensor. Examples of non-contact type sensors are ultrasonic sensors, optical sensors, differential pressure sensors, heat sensors, electrostatic capacity sensors, and image sensors.

When bubbles are generated within cavity 4 during casting, the bubbles in cavity 4 are desirably removed through discharge hole 40. Debubbling can be conducted by tilting the casting mold to a prescribed angle so that discharge hole 40 is at the top, and maintaining this angle for a prescribed period (S6 in FIG. 10). This angle and time are suitably established for each item. However, a debubbling step is unnecessary when manufacturing certain types of plastic lenses.

The casting mold can be tilted to just one side, or tilted to both sides. The tilting method can be suitably established based on the position of the cavity side opening of discharge hole 40. For example, when the cavity side opening of discharge hole 40 is positioned close to either the upper mold or the lower mold, it suffices to conduct tilting so that the close side is highest. Specifically, when the opening is positioned close to the upper mold side, tilting is desirably conducted so that the upper mold is on top. When the opening is positioned close to the lower mold side, tilting is desirably conducted so that the lower mold side is on top. When the cavity side opening of discharge hole 40 is positioned in the middle, the casting mold can be tilted to both sides. Polymerization proceeds and viscosity increases in the mixture during tilting. Further, movement of the casting mold during polymerization causes the resin to flow during polymerization, which may sometimes result in optical defects. Thus, tilting to a single side and maintaining the angle for a prescribed period are desirable.

In the gasket shown in FIG. 2, the cavity side opening of the discharge hole has been positioned close to the lower mold side for the above-stated reasons. Thus, tilting can be conducted so that the lower mold side is positioned on top and, for example, the angle can be maintained for about 10 to 15 seconds to conduct debubbling.

Following the debubbling step as needed, the casting mold can be left in a state where the discharge hole is on top and the mixture can be caused to polymerize further. In this casting mold leaving step, discharge hole 40 is positioned on top, the casting mold is maintained so that the mixture does not overflow, the casting mold is left in a calm location for a prescribed period of time in a low-temperature atmosphere, and polymerization is conducted (S7 in FIG. 10). Subsequently, before polymerization has progressed to the end, the polymerized portion in casting inlet hole 20 and the polymerized portion in discharge hole 40 are broken. Thus, the molded lens article part that has polymerized in cavity 4 and the parts that have polymerized within casting hole 20 and discharge hole 40 are severed (S8 in FIG. 10). Next, the casting mold is desirably positioned in a high-temperature atmosphere and polymerization is desirably allowed to further proceed (S9 in FIG. 10). Before leaving in a high-temperature atmosphere, the polymerized portion in the casting hole and the polymerized portion in the discharge hole are broken to facilitate removal of the gasket following leaving in the high-temperature atmosphere.

The above low-temperature atmosphere is a relatively low-temperature atmosphere under which polymerization proceeds through self-generated heat. For example, it may be from −10 to 50° C. During leaving in the low-temperature atmosphere, the mixture self-generates heat through an exothermic polymerization reaction, further promoting polymerization. When polymerization reaches a certain degree, the level of heat generated drops, and the polymerization reaction gradually winds down. When left continuously in this state, polymerization contraction increases as the polymerization reaction progresses. Internal distortion grows and there is a risk of the molded lens article cracking and separating from the mold. Thus, the time of leaving in the low-temperature atmosphere is suitably set to be long enough for polymerization to proceed to a degree permitting severing of the portions polymerizing within casting hole 20 and discharge hole 40 from the portion polymerizing in the cavity, and less than the time required for internal distortion due to polymerization contraction to increase and hinder molding. For example, the leaving time desirably falls within a range of 5 to 20 minutes.

During leaving in the low-temperature atmosphere, particularly prior to conducting the severing operation, it is desirable to rock the gasket as little as possible. This prevents the mixture from flowing in the cavity during polymerization, thus reducing optical defects in the molded lens article.

In polymerization with self-generated heat in a low-temperature atmosphere, curing takes place without complete polymerization and with functional groups remaining, so the final molded article is not of great strength. Thus, during leaving in a low-temperature atmosphere, the polymerized portions in casting hole 20 and discharge hole 40 can be readily broken off by bending casting tube part 24 and constricted part 43. The gasket can be made of elastic resin to permit bending of casting inlet part 7 and discharge outlet part 8. Thus, the severing operation is readily conducted.

After conducting the above-described severing operation, the step of leaving in a high-temperature atmosphere can be conducted by leaving the casting mold in a furnace that has been preheated to a prescribed temperature to prepare a high-temperature atmosphere. Leaving in a high-temperature atmosphere alleviates internal distortion in the molded article and advances the reaction of functional groups that do not react in the polymerization conducted in the above low-temperature atmosphere. Upon completion of polymerization, the temperature is gradually decreased and the casting mold is removed from the furnace. Heating in the high-temperature atmosphere can be conducted for about 15 to 24 hours at from 110 to 150° C., for example. Once the casting mold has been removed from the furnace, the gasket is first removed, after which the first and second molds are removed (S10 in FIG. 10). The molded plastic lens article is then finished (S11 of FIG. 10).

The following plastic lens manufacturing apparatus can be employed to carry out the manufacturing method of the first aspect as described above:

a plastic lens manufacturing apparatus mixing plural polymerizable components and immediately after mixing, casting a mixture into a casting mold, characterized in that said casting mold has an internal cavity, said plastic lens manufacturing apparatus comprises:

a carbon dioxide injection part that provides said cavity of the casting mold with carbon dioxide, a starting material liquid casting part that casts the starting material liquid into the casting mold provided with carbon dioxide, a debubbling part that removes bubbles in said cavity by tilting said casting mold in which the starting material liquid has been cast, a conveying means that holds said casting mold and conveying the casting mold to each part above.

An example of such an apparatus will be described below based on the drawings. However, the present invention is not limited to this mode.

FIG. 5 is an overall drawing of an automatic casting apparatus. FIG. 6 is a detailed drawing of the filling part 82 of the automatic casting apparatus shown in FIG. 5. FIG. 7 is a drawing showing the operation of the nozzle during casting of a mixture into the casting mold.

In the automatic casting apparatus shown in FIG. 5, in the casting mold mounting part 81 shown in FIG. 5, the casting mold, having been heated to a prescribed temperature, is first mounted on the holding members of a conveying pallet. Here, the casting mold is positioned on conveying pallet 70 (a conveying pallet on which the casting mold is mounted) shown in FIG. 4. The casting mold may be mounted manually or automatically.

Next, the conveying pallet is transferred with a conveying means in the form of a free flow conveyor to filling part 82. Filling part 82 comprises three steps. These steps will be described based on FIG. 6.

In filling part 82 of FIG. 6, as shown in FIG. 7, three steps are performed. First is a carbon dioxide injection step 91. Second is a mixture casting step 92 in which a mixture is cast using a casting jig one end of which is connected to a discharge outlet provided in the mixing chamber of a reactive injection mold machine and on the other end of which is mounted a casting nozzle 30. Third is a debubbling step 93 in which the casting mold is tilted to a prescribed angle and maintained for a prescribed period to remove bubbles from within the cavity by means of the buoyancy of the bubbles.

In carbon dioxide injection step 91, when conveying pallet 70 arrives, carbon dioxide injection panel 94 is lowered with a cylinder 101, covering discharge outlet opening 41 of the casting mold. Next, carbon dioxide is introduced into the casting mold with carbon dioxide introducing part 95. The quantity of carbon dioxide introduced is adjusted to the volume of the cavity in the casting mold. The introduction of carbon dioxide is desirably conducted until the casting into the casting mold that is conducted in casting step 92, which is the next step, has been completed.

In casting step 92, after the arrival of conveying pallet 70, the holding members are positioned. Nozzle apical plane part 31 of casting nozzle 30, connected through a tube to a discharge outlet provided in the mixing chamber of the reactive injection mold machine, is connected around casting inlet opening 22 (see FIG. 2), located near the center, to casting inlet apical plane part 21 of the gasket over an operating track such as that shown in FIG. 7, connecting casting hole 20 to nozzle hole 33.

In casting step 92, as shown in FIG. 7(a), casting nozzle 30 is first slowly brought in close from below the front of the casting mold. Next, as shown in FIG. 7(b), casting nozzle 30 is moved so that the upper end of nozzle apical plane part 31 of casting nozzle 30 first contacts casting inlet apical plane part 21 of the gasket. Subsequently, nozzle apical plane part 31 of casting nozzle 30 is gradually brought into contact with casting inlet apical plane part 21 from above. Finally, as shown in FIG. 7(c), the contact is made complete. Gradually bringing nozzle apical plane part 31 of the casting nozzle close to casting inlet apical plane part 21 from above causes mixture leaking from the gap to be gradually cast into the casting hole and causes mixture leaking from the gap to gradually decrease so that in the fully connected state, the mixture is cast into cavity 4 through casting hole 20 without leakage. When cavity 4 of casting mold 3 has filled with mixture and the mixture has reached the prescribed height of discharge outlet part 8, sensor 100 positioned above liquid reservoir part 42 that detects that the surface of the liquid in discharge outlet part 8 has reached a prescribed height is triggered. The above-described casting hole sealing part (casting hole sealing plate 2021; see FIG. 22) is moved with cam 96, casting hole 20 is sealed, casting nozzle 30 returns to its original position, and casting is concluded.

Next, conveying pallet 70 is moved to debubbling step 93. In debubbling step 93, once positioning of the pallet has been completed, the casting mold and conveying pallet 70 are tilted with an air cylinder so that the discharge hole is at the top and maintained at a prescribed tilt angle for a prescribed period to remove bubbles. The angle and time are suitably set based on the item. However, this may not be necessary based on the type of plastic lens being manufactured.

Following the debubbling step, the air cylinder is lowered to return conveying pallet 70 to its original position, after which conveying pallet 70 is moved to the U-turn conveying areas 83 to 85 shown in FIG. 5. In U-turn conveying areas 83 to 85, the direction of advance of conveying pallet 70 is changed, after which conveying pallet 70 is moved to removal waiting area 86. Subsequently, in removal waiting area 86, conveying pallet 70 is left standing for a prescribed period in a low-temperature atmosphere. After the prescribed time has elapsed, conveying pallet 70 is moved to U-turn removal area 87. The direction of advance of conveying pallet 70 is changed in U-turn removal areas 87 to 89. In removal waiting area 86, for example, an escaper is positioned at a prescribed point on the free flow conveyor so that after the prescribed time has elapsed, the time required for the conveyor pallet to reach U-turn removal area 87 can be controlled. For example, in U-turn removal area 88, the casting mold is removed from conveying pallet 70. The casting mold may be removed manually or automatically.

Subsequently, the conveying pallet is transferred, through U-turn removal area 89, to casting mold mounting part 81, a new casting mold is mounted, and mixture is cast. In the above-described steps, the casting mold that has been filled with mixture is desirably gently conveyed to prevent flowing of the mixture.

Subsequently, on the casting mold that has been removed from conveying pallet 70, constricted part 43 of the gasket and casting tube part 24 are bent to sever and break the resin that has filled and cured in the discharge hole and casting hole. Subsequently, the casting mold is placed in a high-temperature atmosphere and left standing for a prescribed period. This placement step is as described above.

In the manufacturing method of the first aspect, the manufacturing method of the second aspect and/or that of the third aspect can be employed. Detailed thereof will be described further below.

[Second Aspect]

The manufacturing method of the second aspect of the present invention is:

a method of manufacturing a plastic lens by casting a plastic lens starting material liquid flowing out of a casting jig opening into a casting mold and curing said starting material liquid to form a molded article, characterized in that said casting mold has an internal cavity and has at diametrically opposed positions a casting hole for casting said starting material liquid into the cavity and a discharge hole for discharging gases in the cavity or the mixture to the exterior of the casting mold, said casting hole has an opening (referred to as "casting inlet opening", hereinafter) for casting the mixture, said starting material liquid is cast into said casting mold through said casting hole in a state where the casting mold is tilted from or perpendicular to a horizontal plane as well as the discharge hole is positioned at a top, and said method comprises a period, from when said casting inlet opening begins to communicate with said casting jig opening to when the communication ends, in which a portion of the starting material liquid flowing out of the casting jig opening flows into the casting hole, and the remaining portion flows downward without flowing into the casting hole. Details of the casting mold, gasket, casting jig and the like suitable for use in the manufacturing method of the second aspect are the same as described above for the first aspect.

The manufacturing method of the second aspect is a method of manufacturing a plastic lens by casting a plastic lens starting material liquid flowing out of a casting jig opening into a casting mold and curing said starting material liquid to form a molded article. The manufacturing method of a plastic lens of the second aspect is suited to the manufacturing of plastic lenses from highly viscous plastic lens starting material liquids having a rapid initial polymerization rate. For example, such a plastic lens starting material liquid may contain plural polymerizable components that start polymerization immediately after mixing and cure within 10 minutes.

Specifically, an example of the highly viscous plastic lens starting material liquid with a rapid initial polymerization rate that is employed in the manufacturing method of the second aspect is one containing above-described components (A) and (B), preferably consisting of above-described components (A) and (B).

In the manufacturing method of the second aspect, with the casting mold tilted from or perpendicular to a horizontal plane as well as the discharge hole positioned at a top, a plastic lens starting material liquid is cast into the casting mold through the casting hole. Casting the starting material liquid from the bottom of the casting mold in this manner is advantageous in that, since the starting material liquid is cast from below the surface of the starting material liquid that has already been cast, air within the casting mold tends not to be entrained during casting and bubbles tend not to form.

The tilt angle of the casting mold can be 70 to 110°, for example. In particular, in the second aspect, the starting material liquid is desirably cast into the casting mold roughly perpendicular to the horizontal plane. When casting highly viscous starting material liquid into the casting mold and the rate of rise of the surface of the casting material liquid varies with the position in the cavity of the casting mold, there is sometimes a problem in that air near the liquid surface with a slow rate of rise is left behind in the cavity. By contrast, when casting is conducted with the casting mold in a state roughly perpendicular to the horizontal plane, the difference in rate of rise of the liquid surface due to position is small, and such problems tend not to occur. In particular, when molding myopia-correcting lenses, the cavity of the casting mold consists of a narrow gap near the center and a wide gap around the rim. Thus, the mixture tends to flow to the rim rather than to the center. Thus, when the tilt angle is low, the liquid surface along the perimeter at the two sides rises more rapidly than the liquid surface near the center, reaching the discharge hole while surrounding the air near the center. Thus, there is sometimes a problem in that the air near the center remains behind in the cavity. By contrast, when the casting mold is positioned roughly perpendicular to the horizontal plane, as is desirable, there is little difference in the rate of rise of the liquid surface between the perimeter and the center. Thus, this is preferred because the problem of air near the center remaining behind tends not to occur.

At the outset of casting of the mixture, particularly as the liquid surface of the mixture is rising through the casting hole, air tends to be entrained. Thus, the casting rate is desirably made low to keep down the rate of rise of the liquid surface of the mixture. However, for resins with rapid initial polymerization rates, changing the rate of flow of the lens starting material flowing out through the casting nozzle ends up changing the rate of polymerization of the mixture as it leaves the nozzle, sometimes resulting in optical defects. Further, when a RIM machine is used to mix polymerizable components, changing the flow rate along the way is sometimes difficult. Accordingly, in the second aspect, provided is a period, from when the casting inlet opening begins to communicate with the casting jig opening to when the communication ends, in which a portion of the starting material liquid flowing out of the casting jig opening flows into the casting hole, and the remaining portion flows downward without flowing into the casting hole. In the present invention, "communication of the casting inlet opening with the casting jig opening" refers to the state where at least a portion of the starting material liquid flowing out of the casting jig opening flows into the casting inlet opening. In the manufacturing method of the present invention, at the start of casting, not all of the starting material liquid flowing out of the casting jig opening is cast into the casting hole; a portion thereof is made to flow into the casting hole, while the remainder is made to flow downward without flowing into the casting hole. Subsequently the quantity of starting material liquid flowing into the casting hole can be increased in steps to adjust the casting flow rate of starting material liquid entering the casting mold without changing the flow rate of the starting material liquid flowing out through the casting nozzle. In this manner, the casting flow rate can be reduced during the initial period when bubbles tend to be entrained, reducing the occurrence of bubbles.

Further, causing a portion of the starting material liquid flowing out through the casting jig opening to flow into the casting hole while causing the remainder to flow downward causes the starting material liquid to strike the plane around the casting inlet opening, pushing away the air on the plane and wetting the plane with the starting material liquid. Thus, the entry of air remaining on the plane into the casting hole is diminished and entrainment of bubbles can be reduced. Further, since the starting material liquid strikes the plane around the casting hole opening and rebounds, striking the area around the end of the casting jig opening, bubbles and partially cured starting material liquid that have adhered near the end of the opening of the casting jig are washed away. These bubbles and this partially cured starting material can thus be prevented from flowing into the cavity. Thus, bubble entrainment and stria generation are reduced.

In the second aspect, a gap can be formed between the casting jig opening and the casting inlet opening during the above-stated period. Through this gap, a portion of the starting material liquid flowing out through the casting jig opening can be made to flow downward. This mode will be described based on the drawings.

FIG. 9 is a drawing descriptive of an example of the flow of the lens starting material liquid casting process. FIG. 9(a) shows the status prior to the start of casting. FIG. 9(b) shows the intermediate status where the casting nozzle has been brought into contact with the casting inlet apical plane part 21 of the casting mold for casting of a mixture. FIGS. 9(c) and (d) show how the gap between the casting nozzle and casting inlet apical plane part 21 of the casting mold gradually narrows, and casting of the mixture begins. FIG. 9(e) shows how the casting nozzle comes into complete contact with casting inlet apical plane part 21 of the casting mold, and how casting of the mixture is conducted. FIG. 9(f) shows how a sensor detects the rise of the liquid surface, and how the casting hole is sealed with a casting hole sealing part linked to the sensor. FIG. 9(g) shows how debubbling is conducted by tilting the casting mold with the discharge hole positioned at the top. And FIG. 9(h) shows how the casting mold is left after debubbling.

First, as shown in FIG. 9(a), a plastic lens starting material liquid is caused to flow out through nozzle apical opening 32 of casting nozzle 30. When the flow is stopped, particularly when employing a starting material liquid with a rapid polymerization rate, polymerization proceeds rapidly, the tube and casting nozzle become clogged, and there is a risk of already polymerized components in the tube and casting nozzle entering the casting mold. Thus, in the present invention, it is desirable for the starting material liquid to flow continuously out through the casting nozzle during the manufacturing process. When employing multiple casting molds to continuously manufacture lenses, the tubes employed to cast the starting material liquid can be replaced after a prescribed period.

As shown in FIG. 9(a), while starting material liquid is being made to flow out through nozzle apical opening 32 of casting nozzle 30, casting nozzle 30 is slowly drawn near to casting inlet opening 22 below the front of the casting mold. As shown in FIG. 9(b), the casting nozzle is initially moved so that the upper end of nozzle apical plane part 31 of casting nozzle 30 contacts the upper end of casting inlet apical plane part 21 of the casting mold. Subsequently, with the upper end of nozzle apical plane part 31 in contact with casting inlet apical plane part 21, casting nozzle 30 is rotated to draw the lower end side of nozzle apical plane part 31 near to the casting inlet apical plane part, gradually narrowing the gap between nozzle apical plane part 31 and casting inlet apical plane part 21. At that time, the starting material liquid flowing out of the casting jig opening is made to flow down through the gap, a portion of the starting material liquid begins to flow into the casting hole, and the starting material liquid eventually reaches the cavity (FIGS. 9(c) and (d)). Finally, as shown in FIG. 9(e), nozzle apical plane part 31 connects with casting inlet apical plane part 21, and casting is conducted without the above-described gap.

It is desirable that the gap is present at least up until the starting material liquid begins to flow into the cavity. The starting material liquid flows into the cavity from casting inlet opening 22 via casting tube part 24 (see FIG. 2). When the starting material liquid is passing through casting tube part 24 and the rate of rise is extremely rapid, the inner wall surface of casting tube part 24 is not wetted and there is a risk of bubbles forming in this pathway. Further, due to the characteristics of a RIM machine and the starting material liquid, it is difficult to control the rate of flow through the casting nozzle. However, creating a gap as set forth above and causing a portion of the starting material liquid to flow downward makes it possible to maintain constant the flow rate through the casting nozzle by adjusting the size of the gap, and thus regulate the amount of liquid flowing into the casting tube part. Further, creating a gap to cause the starting material liquid to flow downward makes it possible to cause bubbles produced when the starting material liquid adheres to casting inlet apical plane part 21 to flow downward. Still further, narrowing the gap makes it possible to cause the starting material liquid to rebound from casting inlet apical plane part 21, making it possible to achieve the effect of washing away bubbles and partially cured starting material liquid adhering to nozzle apical plane part 31.

The above-described gap can be closed by bringing the apical part of the casting jig into contact with the casting inlet apical part. In the present invention, for example, the gap can be closed by contacting an end face of the casting jig apical end with a plane (apical plane part of casting inlet) formed entirely around the casting inlet opening of the casting mold. In this case, as set forth above, the outer shape of the end face of the casting jig apical part is desirably made smaller than the outer shape of the casting inlet apical plane part.

Casting inlet apical plane part 21 is desirably a flat plane inclined relative to the axis of the casting hole. The nozzle apical plane part 31 (end face of the casting jig apical part) of casting nozzle 30 is also desirably inclined relative to the axis of the nozzle hole and formed so that, when brought into contact with the apical plane part of casting inlet, the axial direction of the casting hole of the casting mold intersects the axial direction of the casting jig. In particular, as shown in FIG. 17, nozzle apical plane part 31 is preferably formed so that the axial direction of the casting hole intersects almost perpendicularly the axial direction of the casting jig. Thus, the starting material liquid can be smoothly cast into the casting mold.

The spacing of the gap provided between the casting jig opening and the casting inlet opening is desirably adjusted by contacting the front end of the end face of the casting jig apical part with the casting inlet apical plane part and rotating the casting jig using the contacted portions as an axis. Moving the casting jig about an axis in the form of the contacted portions permits the stable adjustment of the spacing of the gap.

The starting material liquid that is discharged through casting nozzle 30 flows into cavity 4 through casting hole 20. Subsequently, the starting material liquid fills cavity 4, reaching liquid reservoir part 42 through discharge hole 40. When the liquid surface of the mixture reaches a prescribed height within discharge outlet part 8, as shown in FIG. 9(f), a sensor 100 positioned above discharge outlet part 8 is triggered, casting tube part 24 of casting inlet part 7 is nipped in the groove of the casting hole sealing part, casting hole 20 is sealed, and casting stops. Casting jig opening is also desirably separated from casting inlet opening immediately after sealing of casting hole 20 so that the outflow of the starting material liquid from casting nozzle 30 does not stop. As set forth above, sensor 100 detects the height of the liquid surface within discharge outlet part 8, thereby stopping the rise of the liquid surface at a prescribed height and stopping casting before the liquid surface reaches discharge outlet opening 41. Thus, the mixture does not overflow from discharge outlet opening 41. Since the casting mold is preferably tilted to conduct debubbling in a subsequent step, it is desirable to adjust the height that is detected with the sensor to prevent overflowing of the mixture after tilting. Further, since casting hole 20 is sealed, even when casting nozzle 30 is separated from casting inlet part 7, no mixture overflows to the exterior of the casting mold. Further, as set forth above, it is also possible to provide a thin-walled part in a portion of casting tube part 24 and to seal the thin-walled part with the casting hole sealing part. Liquid surface detecting sensors suitable for use in the present invention are as described above.

FIG. 18 is another example of the flow of the lens starting material liquid casting process. FIG. 9 shows an example where the spacing of the gap between nozzle apical plane part 31 and casting inlet apical plane part 21 is adjusted by bringing the top end of nozzle apical plane part 31 into contact with the top end of casting inlet apical plane part 21 and then rotating the casting nozzle. In the example of FIG. 18, a spacing of the gap is adjusted in a state where the gap is present entirely around the nozzle apical opening 32 and casting inlet opening 22 between casting nozzle apical plane part 31 and casting inlet apical plane part 21, that is, the gap is adjusted by bring casting nozzle 30 in close to casting inlet apical plane part 21 of the casting mold while maintaining the gap on an entire circumference. FIG. 18(a) shows the state before the starting of casting. FIG. 18(b) shows an intermediate state where casting nozzle 30 has been brought in proximity to casting inlet apical plane part 21 of the casting mold to cast the starting material liquid. FIGS. 18(c) and (d) show a state where casting of the starting material liquid has begun with the gap between nozzle apical opening 32 and casting inlet opening 22 of the casting mold being gradually narrowed. FIG. 18(e) shows a state where nozzle apical plane part 31 of casting nozzle 30 has been contacted with casting inlet apical plane part 21 of the casting mold, the gap has been closed, and casting of the starting material liquid has begun. FIG. 18(f) shows a state where the sensor has detected the rise in the liquid surface and the casting hole has been sealed with the casting hole sealing part linked to the sensor. FIG. 18(g) shows a state where the casting mold has been tilted with the discharge hole on a top to conduct debubbling. And FIG. 18(h) shows a state where the casting mold has been left standing after completion of debubbling. The description below will focus on the differences with the lens starting material liquid casting process shown in FIG. 9; the description of portions identical to those in FIG. 9 will be omitted.

First, in FIG. 18(a), plastic lens starting material liquid is caused to flow out of nozzle apical opening 32 of casting nozzle 30 in the same manner as in FIG. 9(a). While the starting material liquid is flowing out of nozzle apical opening 32 of casting nozzle 30 as shown in FIG. 18(a), nozzle apical plane part 31 of casting nozzle 30 is positioned in parallel with casting inlet apical plane part 21, and this parallel state is maintained while causing nozzle apical plane part 31 to approach casting inlet apical plane part 21, as shown in FIG. 18(b). At this time, there is a gap present entirely around nozzle apical opening 32 and casting inlet opening 22 between nozzle apical plane part 31 and casting inlet apical plane part 21. The starting material liquid flowing out through nozzle apical opening 32 flows down through this gap (FIG. 18(b)). As the gap is gradually narrowed, the starting material liquid strikes casting inlet apical plane part 21. At that time, casting inlet apical plane part 21 is wetted with starting material liquid and bubbles adhering to casting inlet apical plane part 21 are washed away. Further, as the gap present entirely around nozzle apical opening 32 and casting inlet opening 22 is gradually narrowed, the starting material liquid resides between nozzle apical plane part 31 of casting nozzle 30 and casting inlet apical plane part 21 and a portion of the starting material liquid begins to flow into the casting hole (FIG. 18(c)), with the starting material liquid eventually reaching cavity 4 (FIG. 18(d)). At this time, the starting material liquid strikes casting inlet apical plane part 21 and rebounding starting material liquid strikes nozzle apical plane part 31 of casting nozzle 30, causing adhering bubbles and partially cured starting material liquid to drop off and flow downward. Finally, as shown in FIG. 18(e), nozzle apical plane part 31 contacts casting inlet apical plane part 21 and casting is conducted with the gap having been closed.

When the gap is narrowed while being maintained entirely around nozzle apical opening 32 and casting inlet opening 22 in the space between nozzle apical plane part 31 and casting inlet apical plane part 21 in this manner, it becomes possible for the starting material liquid to flow out through the gap in all directions. Thus, the starting material liquid strikes over the wide range of nozzle apical plane part 31 and casting inlet apical plane part 21, more efficiently washing away adhering bubbles and partially cured starting material liquid than in the example shown in FIG. 9. In this respect, the example shown in FIG. 18 is superior to that shown in FIG. 9.

The spacing of the gap provided between nozzle apical plane part 31 and casting inlet apical plane part 21 is desirably adjusted by moving in parallel one or both of nozzle apical plane part 31 or casting inlet apical plane part 21 while maintaining them roughly parallel. When this is done, the spacing of the gap is kept constant over the entire perimeter and the gap can be narrowed while being maintained over the entire perimeter. The spacing of the gap is desirably adjusted with a controlled drive in the form of a motor or the like.

The steps (FIGS. 18(f) to (h)) following filling of the cavity with lens starting material are identical to those shown in FIG. 9 (FIGS. 9(f) to (h)) and the description thereof is omitted here.

The manufacturing method of the first aspect can be employed in the manufacturing method of the second aspect. The details are as described above. The manufacturing method of the third aspect can also be employed in the manufacturing method of the second aspect. The details are given below.

[Third Aspect]

The manufacturing method of the third aspect of the present invention is:

a method of manufacturing a plastic lens comprising casting of a plastic lens starting material liquid into a casting mold held with a holding member and curing said starting material liquid to form a molded article, characterized in that said casting mold has an internal cavity and has at diametrically opposed positions a casting inlet part comprising a casting hole for casting the mixture into the cavity and a discharge outlet part comprising a discharge hole for discharging gases in the cavity or the mixture to the exterior of the casting mold, said holding member has a holding part for casting inlet part for holding said casting inlet part and a casting hole sealing part for sealing the casting hole by nipping said casting inlet part, holding of casting mold with said holding member is carried out by holding said casting inlet part with said holding part for casting inlet part in a state where the casting mold is positioned almost perpendicular to a horizontal plane as well as the discharge hole is positioned at a top, and casting of said starting material liquid is carried out by casting said starting material liquid through said casting hole and completed by sealing said casting hole with said casting hole sealing part.

In the manufacturing method of a plastic lens of the third aspect, a plastic lens starting material liquid is cast through the casting hole, that is, from below the casting mold, into a casting mold that is roughly perpendicular to the horizontal plane while being held with the holding member with the discharge hole on a top. When the starting material liquid is cast from below the casting mold in this manner, the starting material liquid is cast from below the liquid surface of the previously cast starting material liquid. Thus, air in the casting mold tends not to be entrained and bubbles tend not to form during casting.

When casting highly viscous starting material liquid into the casting mold and the rate of rise of the liquid surface of the mixture varies with position in the cavity, there is sometimes a problem in that air near portions of the liquid surface rising more slowly tends to remain within the cavity. By contrast, in the manufacturing method of the third aspect, since casting is conducted with the casting mold roughly perpendicular to the horizontal plane, there is little difference between the rates of rise of the liquid surface at different positions, and this problem tends not to occur. Particularly when molding myopia-correcting lenses, the gap of the cavity in the casting mold is narrow near the center and wide along the perimeter. Thus, the mixture tends to flow toward the perimeter rather than into the center. Thus, when the angle of incline is low, the liquid surfaces along the perimeter on both sides rise more rapidly than the liquid surface near the center. They surround air near the center as they reach the discharge hole, sometimes creating a problem in that the air near the center remains in the cavity. By contrast, when the casting mold is positioned nearly perpendicular to the horizontal plane as is done in the present invention, the difference between the rate of rise of the liquid surface along the perimeter and near the center is small. Thus, the problem of air near the center remaining tends not to occur.

When the starting material liquid is cast from below the casting mold through the casting hole, following completion of casting, the cast starting material liquid ends up flowing down from the casting hole and overflowing to the exterior. Accordingly, in the present invention, the downflow of starting material liquid is prevented by sealing the casting hole following the conclusion of casting. In this manner, outflow of the lens starting material liquid can be prevented without changing the orientation of the casting mold following the conclusion of casting. In this manner, according to the present invention, plastic lenses can be manufactured with less entrainment of bubbles and fewer optical defects. In particular, in the manufacturing method of the third aspect, the following results can be achieved by casting the starting material liquid while holding the casting mold with a holding member having a holding part for casting inlet part for holding the casting inlet part and a casting hole sealing part for sealing the casting hole by nipping the casting inlet part.

As set forth above, the plastic lens starting material liquid is cast from below the casting mold and the casting hole is sealed to end the casting. Thus, once casting has ended, the cast starting material liquid does not flow downward outside the casting mold and bubbles are suppressed, permitting the manufacturing of plastic lenses with fewer optical defects. When conducting the sealing operation with a mechanical means, the sealing means and the casting inlet part must be correctly aligned. Further, to achieve smooth casting of starting material liquid through the casting nozzle, the casting inlet part and the casting nozzle must be correctly aligned. In particular, when conveying a large number of gaskets into a casting apparatus and sequentially casting the starting material liquid, the casting inlet part and the like must be correctly positioned for each casting mold to be cast.

Further, when the casting inlet part is made of a readily deforming material such as resin, there is a risk that the casting inlet part will deform when the sealing means contacts the casting inlet part and when the casting nozzle pushes against the apical part of the casting inlet part, hindering casting of the starting material liquid and sealing of the casting hole.

Accordingly, in the manufacturing method of the third aspect, the starting material liquid is cast and the casting hole is sealed while holding the casting inlet part with the holding part for casting inlet part of the holding member. Thus, the casting inlet part and casting hole sealing part, and the casting inlet part apical part and casting nozzle, are readily and correctly aligned, the starting material liquid is smoothly introduced into the casting mold, and the casting hole can be reliably sealed, permitting the manufacturing of plastic lenses with fewer bubbles and optical defects.

The casting mold suitable for use in the manufacturing method of the third aspect can be a casting mold having a mold (first mold) for forming one side of the lens and a mold (second mold) for forming the other side thereof that are positioned opposite at a prescribed interval, wherein a circular gasket is positioned around said two molds, and a cavity is formed with said molds and gasket, and said gasket is provided with said casting hole and said discharge hole. Details thereof are as described above.

The holding member suitable for use in the manufacturing method of the third aspect desirably has a thickness retaining means holding the casting mold by nipping the first mold and second mold from both outer sides. The thickness retaining means nips the first and second molds from both outer sides to hold the casting mold, permitting the maintenance of a certain spacing between the two molds and making it possible to accurately control the thickness of the plastic lens obtained.

The holding part for casting inlet part provided on the holding member can hold the casting mold, in contact with the casting inlet part of the casting mold at any position. In particular, when the casting inlet part is made of a readily deforming substance, the holding part for the casting inlet part desirably contacts the casting inlet part at two or more positions to hold the casting mold.

As set forth above, when the holding part for casting inlet part contacts with at least two or more vertical positions of the casting inlet part, the casting hole sealing part preferably nips the casting inlet part at a portion between the positions contacting with the holding part for casting inlet part to seal the casting hole. Thus, when the casting inlet part is made of a readily deforming substance, it is possible to avoid deformation of the casting inlet part during the sealing operation, which could impede sealing.

The holding part for the casting inlet part may comprise a member having a groove (holding part groove). The casting mold can be held with at least a portion of the casting inlet part in contact with this groove. In that case, for example, the casting mold can be readily held by providing a flange part on the casting inlet part.

The casting hole sealing part may comprise a member having a groove (sealing part groove). This member can be moved to press the casting inlet part into the sealing part groove to seal the casting hole. In that case, when the casting inlet part is pressed into the sealing part groove with the sealing part groove opening out in the same direction as the holding part groove, there is a risk that the casting inlet part will miss the holding part and deform, hindering the sealing operation. Thus, the sealing part groove desirably nips the casting inlet part to seal the casting hole in a state where the sealing part groove opens in a different direction from the opening direction of the holding part groove.

A specific mode of the holding member suitable for use in the manufacturing method of the third aspect will be described below with reference to the drawings. The holding member employed in the manufacturing method of the third aspect may also be employed in the manufacturing methods of the first and second aspects. However, the present invention is not limited to these modes.

FIG. 19(a) is a front view of holding member 201. FIG. 19(b) is a top view of the same. FIG. 19(c) is a bottom view of the same. FIG. 19(d) is a right lateral view of the same. FIG. 19(e) is a left lateral view of the same. FIG. 19(f) is a rear view of the same. FIG. 20(a) is an enlarged view of the holding plate for casting inlet part in the fixing part for casting inlet part shown in FIG. 19(e). FIG. 20(b) is a drawing showing the casting mold mounted in FIG. 20(a). FIG. 21 is an enlarged view of the casting hole sealing plate in the fixing part for casting inlet part shown in FIG. 19(e). FIGS. 22(a), (b), and (c) are drawings showing the movement of the casting hole sealing plate. FIG. 23(a) is a detailed drawing of the thickness retaining part on the second mold side shown in FIG. 19(b). FIG. 23(b) is a view along section line V-V. FIG. 24 is a detailed drawing of the thickness retaining part on the first mold side shown in FIG. 19(b). FIG. 25 is a drawing showing the method of detaching the casting mold. FIGS. 26(1) and (2) are views of the gasket positioning jig positioned on the casting apparatus. FIG. 3 is a drawing of the holding member of FIG. 19 mounted on the conveying pallet. FIG. 5 is an overall view of the automatic casting apparatus.

Holding member 201 shown in FIG. 19 is comprised of conveying pallet connecting part 204 for positioning holding member 201 and connecting with conveying pallet 60 shown in FIG. 3; fixing part 202 of casting inlet part shown in FIG. 19(e), comprising a holding part for casting inlet part for holding the casting inlet part of the casting mold and a casting hole sealing plate that seals the casting hole of the casting mold and ends casting; casting mold thickness retaining part 205, shown in FIG. 19(b), disposing the first mold and the second mold at a prescribed spacing and having a mechanism for controlling the thickness of the molded article obtained; and holding member plate 203, shown in FIG. 19(f), for integrating conveying pallet connecting member 204, fixing part 202 for casting inlet part, and casting mold thickness retaining part 205.

As shown in FIG. 19(e), fixing part 202 for casting inlet part is comprised of holding plate 2023 for casting inlet part having vertical and horizontal positioning functions for casting mold casting inlet part 7 shown in FIG. 1(a); casting hole sealing plate 2021 having a front-back positioning function for the casting mold casting hole and a casting hole sealing function after the completion of casting; translation guide for plate 2022 for moving casting hole sealing plate 2021 front and back in a straight line; and ball flanger 2024 for adjusting the position of the casting hole sealing plate.

Holding plate 2023 for casting inlet part is comprised of upper fixing part 2025 for casting inlet part and lower fixing part 2026 for casting inlet part, shown in FIG. 20(a), for fixing casting mold casting inlet part 7 (see FIG. 1) by engaging with flange-shaped vertical-positioning part 27 (see FIG. 2) of casting mold 3; and fixing bridge part 2028 for holding member, linked to upper fixing part 2025 for casting inlet part and lower fixing part 2026 for casting inlet part and held with a mechanism provided on the casting apparatus to position holding member 201.

On holding plate 2023 for casting inlet part, there is opening 2027 of fixing part for casting inlet part located in fixing bridge part 2028 for holding member, that guides the casting mold casting inlet part. And groove parts 2041 and 2042 are formed on upper fixing part 2025 for casting inlet part and lower fixing part 2026 for casting inlet part, respectively, for nipping the casting inlet part that is guided with opening 2027 of fixing part for casting inlet part.

In the mode shown in FIG. 20(b), the flange-shaped vertical-positioning part 26 (see FIG. 2) of gasket 1 enters into contact from above upper fixing part 2025 for casting inlet part and the upper part of casting inlet apical plane part 21 (see FIG. 2) enters into contact from below lower fixing part 2026 for casting inlet part. Upper fixing part 2025 and lower fixing part 2026 for casting inlet part secure casting inlet part 7 (see FIG. 1) comprising casting inlet apical part 25 in a manner precluding horizontal movement, as shown in FIG. 20(b), through the insertion of horizontal-positioning part 27 of gasket 1 into groove members 2041 and 2042. In this manner, horizontal and vertical positioning can be conducted simultaneously. For example, in the present invention, the outer diameter of horizontal-positioning part 27 of gasket 1 comprised of elastic resin can be made identical to, or somewhat larger than, the width of groove parts 2041 and 2042 to permit the use of the elastic force of the resin to hold casting inlet part 7 of the gasket in position as set forth above.

The width and shape of opening 2027 of fixing part for casting inlet part, groove part 2041 of upper fixing part 2025 for casting inlet part, and groove part 2042 of lower fixing part 2026 for casting inlet part, and the distance between upper fixing part 2025 and lower fixing part 2026 for casting inlet part, depend on the outer shape of horizontal-positioning part 27 of the gasket that is installed and the length of the casting inlet part; they can be suitably set on that basis.

Casting hole sealing plate 2021 on fixing part 202 for casting inlet part shown in FIG. 19(e) will be described below based on FIG. 21. As shown in FIG. 21, casting inlet hole sealing plate 2021 comprises positioning hole (open position) 2031, positioning hole (front and back fixed position) 2032, positioning hole (sealing position) 2033, front-back fixing part 2030 for gasket, casting hole sealing part 2029, and roller guide 2034. The number of positioning holes on casting hole sealing plate 2021 is not limited to those given above, and may be freely selected. Two or more rows of positioning holes may also be provided instead of one.

Front-back fixing part 2030 for gasket is provided at the front end of casting hole sealing plate 2021, and casting hole sealing part 2029 is provided to the inside thereof. Front-back fixing part 2030 for gasket is comprised of a groove roughly identical in size to the outer diameter (the outer diameter of the thin-walled part when a thin-walled part is provided in the casting inlet part, as described further below) of the casting mold casting inlet part that is inserted therein. Gasket casting hole sealing part 2029 is comprised of a groove that is narrower than the groove of front-back fixing part 2030 for gasket. The respective grooves of front-back fixing part 2030 for gasket and gasket casting hole sealing part 2029 are connected. The connecting parts of the grooves are formed so that the spacing of the grooves gradually narrows to facilitate entry at the sealing position of gasket casting inlet part 7 (see FIG. 1) into the groove of gasket casting hole sealing part 2029. The width of the groove of gasket casting hole sealing part 2029 can be set to dimensions such that when the casting mold casting inlet part has inserted into the groove, it is gripped with the groove to seal the internal casting hole. In the mode shown in FIG. 21, it suffices to make the thickness of the tube wall at the sealing position (when forming thin-walled part 23 (see FIG. 2), the thickness of the tube wall at that spot) less than or equal to twice the thickness of the tube wall.

The operation of sealing plate 2021 will be described below based on FIG. 22.

Casting hole sealing plate 2021 can move front and back in a straight line by sliding along translation guide for plate 2022. In the course of this linear front-back movement, the stopping position is controlled by insertion into positioning holes 2031, 2032, and 2033 with ball flanger 2024 (see FIG. 19(*e*)). However, this is not by way of limitation; this mechanism may be replaced by any mechanism capable of controlling the position of the plate.

Casting hole sealing plate 2021 may be located at any of three positions based on the positions of the positioning holes in which ball flanger 2024 is inserted. When the ball flanger 2024 of FIG. 19(*e*) has been inserted into positioning hole 2031, the casting mold is open, as shown in FIG. 22(*a*); when inserted into positioning hole 2032, the casting mold is fixed, as shown in FIG. 22(*b*); and when inserted into positioning hole 2033, the casting mold casting hole is sealed, as shown in FIG. 22(*c*).

When the casting mold has been mounted while casting hole sealing plate 2021 is held in a state where ball flanger 2024 is inserted in positioning hole 2031 (FIG. 22(*a*)), holding plate 2021 for casting inlet part is moved. When casting hole sealing plate 2021 is held in a state where ball flanger 2024 is inserted in positioning hole 2032 (FIG. 22(*b*)), casting mold 3 is positioned with holding plate 2023 for casting inlet part. Thus, in addition to the horizontal and vertical directions, front-back positioning is also conducted, positioning thus being conducted in all directions.

The distance between ball flanger 2024 and casting hole sealing plate 2021 can be set so that ball flanger 2024 readily enters and exits positioning holes 2031 to 2033 of casting hole sealing plate 2021 and, once inserted, is held securely. For example, when the two are separated by a great distance, ball flanger 2024 makes almost no contact with positioning holes 2031 to 2033 and positioning is difficult. When they are extremely close, there is considerable friction between ball flanger 2024 and casting hole sealing plate 2021. When ball flanger 2024 enters a positioning hole, casting hole sealing plate 2021 cannot readily move, impeding operation.

Casting hole sealing part 2029 and front-back fixing part 2030 for gasket, which constitute the apical part of casting hole sealing plate 2021, can insert between upper fixing part 2025 and lower fixing part 2026 for casting inlet part, shown in FIG. 20. Front-back fixing part 2030 for gasket can secure the casting inlet part (thin-walled part when a thin-walled part is provided) of gasket 1. By fixing vertically the casting inlet part in position and nipping the portion between them by means of the casting hole sealing part in this manner, it is possible to avoid impeding sealing due to deformation of the casting inlet part during the sealing operation.

Roller guide 2034 is a part that receives pushing rollers 2035 provided in the casting apparatus. As shown in FIG. 22(*c*), roller guide 2034 can be pushed with pushing rollers 2035 to move casting hole sealing plate 2021 that has been positioned in the state of positioning hole 2032 to the state of positioning hole 2033, permitting automatic sealing of the casting hole.

In the mode shown in FIG. 22, movement from the state of positioning hole 2031 to that of positioning hole 2032 is conducted manually. However, this movement can also be driven with a driving means identical to that set forth above.

Further, so long as holding plate 2023 for casting inlet part and casting hole sealing plate 2021 have the above-stated functions, their overall shape and method of control may vary. A configuration providing a driving means for the casting hole sealing part outside the holding member and moving the casting hole sealing part by applying external force in this manner is advantageous in that the structure of the holding member is simplified.

Casting mold thickness retaining part 205 shown in FIG. 19(*b*) is a part having a mechanism for applying a necessary force from both outsides of the molds when the first mold and the second mold are opposed across a prescribed gap, and is comprised of a first mold side thickness retaining part 2051 for assistance in securing from the first mold side, and a second mold side thickness retaining part 2052 for assistance in securing from the second mold side.

The case where the first mold is a convex mold (referred to hereinafter as the "lower mold") having a molding surface on the convex side for forming the rear (concave) surface of a plastic lens, and the second mold is a concave mold (referred to hereinafter as the "upper mold") having a molding surface on the concave side for forming the front (convex) surface of a plastic lens will be described below for the retaining of the thickness of the casting mold with a thickness retaining mechanism having a holding member. However, the present invention is not limited to this mode.

The thickness retaining part 2051 on the second (upper) mold side will be described below based on FIG. 23.

Second mold side thickness retaining part 2051, a part comprising a spring mechanism, for example, for controlling the thickness of the molded article obtained when the two molds are disposed opposite each other at a prescribed gap, is provided in order to press second mold 2B, incorporated into the casting mold 3 shown in FIG. 2, from the outside inward. As shown in FIG. 23(*a*), second mold side thickness retaining part 2051 is comprised of second mold holding pad support shaft 2059, holding member guide key 2060 provided on second mold holding pad support shaft 2059, pad support member 2061 capable of moving along second mold holding pad support shaft 2059 and the holding member guide key, holding member return spring 2058 incorporated therein, second mold holding pad 2053 having a portion coming into contact with and pushing the outer surface of the mold, second mold holding pad plate 2054 linking pad support member 2061 and second mold holding pad 2053, braking part 2070 fixing the position of pad support member 2061 on second mold holding pad support shaft 2059, and stopper 2055 provided on the end of second mold holding pad support shaft 2059 and restricting the range of movement of pad support member 2061.

Second mold holding pad 2053 may be made of polyacetal. Some other resin, such as polypropylene, may also be employed. For example, a metal may also be employed. The use of a flexible resin is advantageous in that the mold tends not to be scratched, positional shifting tends not to occur, and the application of uniform force is facilitated. The shape of second mold holding pad 2053 is not specifically limited other than it be one that can apply a uniform force to the second mold and is capable of fixing the second mold. For example, the front end of second mold holding pad 2053 is desirably made tubular in shape with a depression in the middle so that even when the mold has a curved surface, contact is made in a circular manner and uniform force is readily applied.

Holding member guide key 2060 is mounted axially along upper mold holding pad support shaft 2059. FIG. 23(b) shows a view along section line V-V of FIG. 23(a). In the mode shown in FIG. 23(b), the base of a cylindrical second mold holding pad support shaft 2059 is notched along the axis direction, and holding member guide key 2060 of rectangular parallelepiped shape is embedded in the notched portion. In this case, the cross section normal to the axis on the base side of second mold holding pad support shaft 2059 may be made noncircular as shown in FIG. 23(b).

Pad support member 2061 is in the shape of a box with one side open. Holes permitting the insertion of second mold holding pad support shaft 2059 are provided in a pair of opposing surfaces. Second mold holding pad support shaft 2059 is then inserted into the two holes. The above-described hole positioned on the front end side of second mold holding pad support shaft 2059 is made round and somewhat larger than the sectional shape of second mold holding pad support shaft 2059. The above-described hole positioned on the base side of second mold holding pad support shaft 2059, as shown in FIG. 23(b), has a key-shaped hole (referred to hereinafter as a "keyhole") somewhat larger in cross-sectional shape than the portion of second mold holding pad support shaft 2059 in which holding member guide key 2060 is present. Within pad support member 2061, holding member return spring 2058 is held wound around second mold holding pad support shaft 2059. When pad support member 2061 is pushed in, one end of holding member return spring 2058 contacts holding member guide key 2060 and is restricted in movement. Since the other end is pushed down with the inner surface of pad support member 2061, holding member return spring 2058 is compressed, permitting the application of force in an upward direction on pad support member 2061.

Second mold holding pad plate 2054 is comprised of a platelike member of roughly rectangular shape. On one end is mounted second mold holding pad 2053, and on the other end there is a hole somewhat larger than the cross-sectional shape of second mold holding pad support shaft 2059. When second mold holding pad support shaft 2059 is inserted therein, it connects with the front end of pad support member 2061.

Braking part 2070 is comprised of support plate 2071, brake lever 2057, and brake spring 2056. One end of support plate 2071 is connected to second mold holding pad plate 2054. On the other end, there is a hole somewhat larger in sectional shape than second mold holding pad support shaft 2059, into which second mold holding pad support shaft 2059 is inserted. In brake lever 2057 there is a hole somewhat larger in sectional shape than second mold holding pad support shaft 2059. Second mold holding pad support shaft 2059 inserts into this hole, with one end in contact with support plate 2071. This point serves as a fulcrum and is supported in a movable manner. Brake spring 2056 is held between support plate 2071 and brake lever 2057 and wound around second mold holding pad support shaft 2059. By means of this configuration, when brake lever 2057 has been pulled, brake part 2070 can move axially relative to second mold holding pad support shaft 2059, and when brake lever 2057 is released, the inner surface of a hole provided in brake lever 2057 contacts second mold holding pad support shaft 2059, fixing the position thereof.

When second mold holding pad plate 2054 has not been pushed in, holding member guide key 2060 does not reach the keyhole provided in pad support member 2061. Thus, pad support member 2061, second mold holding pad plate 2054, and second mold holding pad 2053 can rotate 360° about second mold holding pad support shaft 2059. For example, FIG. 25(a) shows 90° rotation. As set forth above, when holding member guide key 2060 does not reach pad support member 2061, rotation is facilitated. Thus, the rotating parts can be rotated 90° as shown in FIG. 25(a) to readily detach casting mold 3. The dotted line portion in FIG. 23(b) indicates pad support member 2061 when rotated 90°.

When the rotational position of pad support member 2061 is matched with the position permitting insertion of holding member guide key 2060 into the keyhole present in pad support member 2061 and upper mold holding pad plate 2054 is pressed down with the brake spring in a drawn state, the rotation of pad support member 2061, brake part 2070, second mold holding pad plate 2054, and second mold holding pad 2053 is precluded. Thus, second mold holding pad 2053 can be depressed to a prescribed position in the position of FIG. 25(b), which is a constantly fixed position. Here, brake part 2070 can be fixed at a position at which previously pulled brake lever 2057 is released. The dotted line portion in FIG. 23 indicates the state where pad support member 2061 has been depressed.

When second mold holding pad plate 2054 is pushed in, that is, when holding member guide key 2060 is inserted into the keyhole of pad support member 2061 and tension is applied, the pulling of brake lever 2057 releases the tension in holding member return spring 2058, holding member guide key 2060 is removed from the keyhole present on pad holding member 2061, and second mold holding pad plate 2054 moves away from the casting mold. At this time, the presence of stopper 2055 prevents pad support member 2061, braking part 2070, second mold holding pad plate 2054, and second mold holding pad 2053 from moving off of second mold holding pad support shaft 2059 due to the released tension and handling. The rotation of second mold holding pad support shaft 2059 can be prevented by securing second mold holding pad support shaft 2059 to holding member plate 203 with screws or the like. So long as second mold side thickness retaining part 2051 functions in the above-described manner, there is no limitation to the above-described structure. For example, a complex structure employing multiple springs may be employed. As a further example, a mechanism employing air pressure without springs may be employed.

First (lower) mold side thickness retaining part 2052 will be described below based on FIG. 24.

First mold side thickness retaining part 2052 shown in FIG. 24 is a part the object of which is to apply tension from the lower mold side to the upper mold side to control the thickness of a molded article obtained by imparting a spring function, for example, and disposing the two molds opposite each other at a prescribed gap. As shown in FIG. 5, first mold side thickness retaining part 2052 is comprised of gasket reference plate 2062, first mold holding member guide block 2063, first mold holding spring 2064, and first mold holding pad 2065.

Gasket reference plate 2062 is a plate with smooth surfaces that contacts the second mold 2B side circumference (edge) of tubular member 5 of gasket 1 shown in FIG. 11. The distance from the circumferential edge to casting inlet 7 is of fixed design. Thus, here, the distance from holding member plate 203 (see FIG. 19(*f*)) of casting inlet part 7 has been roughly set.

First mold holding pad 2065 is cylindrical in shape. One end is open, with a cylindrical hollow portion in the interior. A flange is formed at the opening.

First mold holding member guide block 2063 is cylindrical in shape. In one of the openings is a hole somewhat larger than the outer shape of the first mold holding pad but smaller than the flange portion. The first mold holding pad inserts into the hole of first mold holding member guide block 2063. With a first mold holding spring present within, the lower mold holding member guide block is mounted on the gasket reference plate. By means of this configuration, the first mold holding pad is capable of axial movement relative to the first mold holding member guide block and tension is constantly applied in the upper mold side direction of casting mold 3 by means of the force of a built-in first mold holding spring 2064. First mold holding pad 2065 may also be manufactured from polyacetal in the same manner as first mold holding pad 2053. It may also be of another resin, such as polypropylene. As a further example, metal may be employed. The use of a flexible resin is advantageous in that the mold tends not to be scratched, positional shifting tends not to occur, and the application of uniform force is facilitated. Further, the shape of first mold holding pad 2053 is not limited so long as tension is applied from the lower mold side to the upper mold side and the first mold can be fixed.

In the present mode, the first mold is fixed. Thus, the front end of the first mold holding pad is made flat. However, when fixing the second mold, the front end may be made tubular like the second mold holding pad, with a depression in the center.

When casting mold 3 is installed on holding member 201 (see FIG. 19), first mold holding pad 2065 is pushed to the holding plate 3 side with pressure from second mold side thickness retaining part 2051, first mold holding spring 2064 is further compressed, and even greater tension is applied. However, so long as first side thickness retaining part 2052 functions in the above stated manner, there is no specific limitation. For example, a structure employing air pressure may be employed.

In the above-described mode, the various mechanisms have been described separately for second mold side holding part 2051 and first mold side holding part 2052. However, for example, these mechanisms may be reversed. Further, in the above-described mode, the second mold side holding part 2051 was imparted with a tension maintaining mechanism and the first mold side holding part 2052 was imparted with a tension imparting mechanism. However, for example, both sides may be provided with tension imparting mechanisms. Further, the tension imparting mechanism is not limited to springs.

Further, in the above-described mode, the lower mold was positioned on the second mold side thickness retaining part 2051 side and the upper mold was positioned on the first mold side thickness retaining part 2052 side. However, for example, the upper mold can be positioned on second mold side thickness retaining part 2051 and the lower mold on first mold side thickness retaining part 2052.

By means of the thickness retaining mechanism of the holding part and holding the casting mold from the outer sides of both the first mold and second mold, the mold spacing can be kept constant and the thickness of the plastic lens obtained can be accurately controlled. Further, the above-described thickness retaining mechanism may also function to hold the casting mold.

When the mold can be adequately held with the gasket alone, this thickness retaining mechanism can be omitted. Further, instead of omitting the thickness retaining mechanism from the casting mold holding member, it can be gripped with spring members such as are conventionally employed. When the thickness retaining mechanism is omitted, another mechanism holding the casting mold can be provided in the casting mold holding member.

In the present invention, the process of manufacturing plastic lenses can be conducted with the above-described holding member mounted on a conveying pallet.

Conveying pallet connecting part 204 shown in FIG. 19(*e*) can be connected to holding member connecting part 62 of pallet 60' shown in FIG. 27 and holding members 201 can be mounted on conveying pallet 60 as shown in FIG. 3. Further, during connection, for example, conveying pallet connecting part 204 (see FIG. 19) can be configured to permit adjustment of the front-back, horizontal and vertical position of the holding members relative to the conveying pallet. Pallet 60' may have portions fixing one or multiple holding members 201, and may also have a portion (conveying means connecting part 61) connecting to the conveying means of an automatic casting system, described further below. Once the casting mold has been mounted to the holding member as shown in FIG. 4 (conveying pallet 70), conveying pallet 60 may be conveyed to apparatuses conducting various manufacturing steps with the conveying means of the above-mentioned automatic casting system. In the waiting area 80 for mounting of casting molds of FIG. 5, upper mold side thickness retaining part 2051 stands by as shown in FIG. 25(*a*) and casting hole sealing plate 2021 stands by as shown in FIG. 22(*a*).

When conveying pallet 60 has been transported to casting mold mounting part 81, casting mold 3 is mounted on conveying pallet 60, achieving the state of conveying pallet 70 shown in FIG. 4. The mounting of casting mold 3 may be conducted in the following manner, for example.

First, second mold side thickness retaining part 2051 is rotated −90° to the state shown in FIG. 25(*a*). Horizontal positioning part 27 and vertical-positioning part 26 of casting inlet part 7 of casting mold 3 are then inserted through the fixing part opening 2027 for gasket of holding plate 2023 for casting inlet part of holding member 201 and secured to achieve the state shown in FIG. 20(*b*). Next, second mold side thickness retaining part 2051 is rotated −90° to achieve the state shown in FIG. 25(*b*), and first mold holding pad 2053 of second mold side thickness retaining part 2051 is pressed, achieving a state where tension is applied to both the upper mold and lower mold disposed on casting mold 3.

Next, casting hole sealing plate 2021 is moved with translation guide 2022 for plate to conduct front-back positioning and fixed at the location of positioning hole 2032. That is, there is a shift from the state of FIG. 22(*a*) to that of FIG. 22(*b*). The above operation permits the mounting of casting mold 3 on holding member 201.

Next, conveying pallet 70 is moved to filling part 82. At filling part 82, the position of casting inlet part 7 shown in FIG. 1 is fully determined with casting hole fixing support jig 921 and holding member fixing stopper 922 shown in FIG. 26(1), with which the casting apparatus is equipped.

The structures of casting hole fixing support jig 921 and holding member fixing stopper 922 will be described below based on FIG. 26(1).

FIG. 26(1)(*a*) is a top view of a casting hole fixing support jig 921. FIG. 26(1)(*b*) is a drawing showing the apical part of casting hole fixing support jig 921. FIG. 26(1)(*c*) is a top view of casting hole fixing support jig 921 with holding member fixing stopper 922 mounted. FIG. 26(1)(*d*) is a partial enlargement of the casting mold fixed with casting hole fixing support jig 921. In FIG. 26(1)(d), casting hole fixing support jig 921 (the hatched portion) shows a sectional view along section line VI-VI in FIG. 26(1)(c).

The front end of casting hole fixing support jig 921 has a roughly semicircular groove fitting together with the gasket casting inlet part, and is fabricated with a downwardly inclined plane to enable supporting of the rear surface of casting inlet apical plane part 21 (see FIG. 2). The top of the apical part of holding member fixing support jig 921 shown in FIG. 26(1)(b) contacts groove part 2042 of lower fixing part 2026 for casting inlet part shown in FIG. 20(a), thereby permitting the positioning and fixing of holding plate 2023 for casting inlet part.

Further, holding member fixing stopper 922 is comprised of a pair of members for gripping from the left and right, holding, and positioning holding member fixing bridge part 2028 (see FIG. 20(a)) of holding plate 2023 for casting inlet part. The each front end thereof is provided with a groove engaging holding member fixing bridge part 2028.

Holding member fixing stopper 922 is connected to air chuck 923, permitting change in left-right spacing. Air chuck 923 is connected to an air cylinder 924, permitting movement to the front and rear. Casting hole fixing support jig 921 is connected to air chuck 923.

The above-described configuration permits holding jig fixing stopper 922 and casting hole fixing support jig 921 to move to the front and rear and permits holding member fixing stopper 922 to alter its left-right spacing.

The operation of casting hole fixing support jig 921 and holding member fixing stopper 922 will be described below with reference to FIG. 26(2).

First, when the casting mold is transported to filling part 82 with conveying pallet 70 (see FIG. 4), casting hole fixing support jig 921 and holding member fixing stopper 922 are moved forward with air cylinder 924 until the front end of casting hole fixing support jig 921 reaches a prescribed position for supporting the rear surface of casting inlet apical plane part 21. At that time, holding member fixing stopper 922 is put in a state with wide gaps to left and right with air chuck 923 so as not to come into contact with holding plate 2023 for casting inlet part (FIGS. 26(2)(a) and (b)). Subsequently, holding member fixing stopper 922 narrows the left and right gaps by means of air chuck 923, gripping and holding from left and right holding member fixing bridge part 2028 (see FIG. 20(a)) by means of groove parts 2041 and 2042. As shown in FIG. 20(a), tapers are formed in these grooves. Thus, as the gap with holding member fixing stopper 922 narrows, holding member fixing bridge part 2028 moves to a prescribed position and holding plate 2023 for casting inlet part is positioned and secured at a prescribed location (FIG. 26(2)(c)). In this state, the downwardly inclined plane of casting hole fixing support jig 921 comes into contact with the rear surface of casting inlet apical plane part 21. With holding plate 2023 for casting inlet part secured in this manner, the casting nozzle can approach the casting inlet and conduct casting, described further below.

By having casting hole fixing support jig 921 support, from the rear in this manner, casting inlet apical plane part 21 comprised of elastic resin, for example, deformation of casting inlet apical plane part 21 with the pressure of contact with the casting jig during casting can be prevented.

Further, having support member fixing stopper 922 nip holding plate 2023 for casting inlet part permits the positioning and holding of the casting inlet part. Further, in the course of sealing the casting hole with casting hole sealing plate 2021 shown in FIG. 21, displacement of the position of casting inlet part due to pressure applied on the casting inlet part can be prevented.

Once casting inlet part 7 of casting mold 3 has been completely positioned, the apical part of the casting jig contacts casting inlet opening 22 (see FIG. 2) and casting begins. A liquid surface detecting sensor provided above the discharge outlet part can be used to detect when a prescribed quantity of starting material liquid has been cast. When the signal of this sensor is detected, rollers positioned in the casting apparatus protrude, and via roller guides 2034, casting hole sealing plate 2021 is moved to positioning hole 2033. In this manner, casting hole 20 of casting mold 3 is sealed with casting hole sealing part 2029, and there is no liquid leakage even when the casting jig separates from casting inlet opening 22. The liquid surface detecting sensors are as described above.

With the completion of casting, after casting mold 3, mounted on the holding member, passes through U-turn conveying areas 83 to 85, removal waiting area 86, and U-turn removal area 87, it is removed from the holding member in U-turn removal area 88, for example. Casting mold 3 can be removed in the following manner.

The position of casting hole sealing plate 2021 is restored from the state shown in FIG. 22(c) to that shown in FIG. 22(a) and casting inlet part 7 of casting mold 3 is released. Next, brake lever 2057 of upper mold side thickness retaining part 2051 is pushed up, the tension is released, the state changes from that of FIG. 25(b) to that of FIG. 25(a), and casting mold 3 is removed from holding member 201. The casting mold can be removed either manually or automatically.

Subsequently, the conveying pallet passes through U-turn removal area 89, is conveyed to casting mold mounting part 81, a new casting mold is mounted, and mixture is cast. This series of steps can then be repeated to continuously manufacture plastic lenses. In the steps described above, the casting mold filled with mixture is desirably gently conveyed to prevent the mixture from flowing.

The plastic lens starting material liquid suitable for use in the manufacturing method of the third aspect will be described below.

According to the method of manufacturing a plastic lens of the third aspect, generation of bubbles during casting of the starting material liquid can be suppressed to reduce optical defects. Thus, this method is suitable for manufacturing a plastic lens from a plastic lens starting material liquid having a high viscosity and a high initial polymerization rate, difficult to remove bubbles generated during casting. Example of such a plastic lens starting material liquid is the one comprising plural porimerizable components that start polymerization immediately after mixing and cure within 10 minutes.

Specific example of the plastic lens starting material liquid having a high viscosity and a high initial polymerization rate suitable for use in the manufacturing method of the third aspect is the one comprising, preferably consisting of components (A) and (B) described above.

The manufacturing method of the third aspect may comprise the manufacturing method of the first aspect and/or that of the second aspect. As the casting mold, gasket, casting jig, manufacturing process and the like suitable for use in the manufacturing method of the third aspect, those described above for the manufacturing methods of the first and second aspects can be employed.

Plastic lenses obtained by the manufacturing method of the present invention described above can be employed as lenses such as an eyewear lens, optical lens and the like. It is particularly preferable to employ the plastic lens obtained by the manufacturing method of the present invention as an eyewear lens.

EXAMPLES

The present invention will be further described based on Examples, but the present invention is not limited to Examples. The plastic lenses obtained in Examples and Comparative Examples were evaluated according to the following evaluation methods.
[Evaluation methods]
(1) Temperature of the casting mold This denotes the temperature at the center of the mold immediately prior to casting a mixed solution into the casting mold.
(2) Solution temperatures during mixing and after filling The temperature of component (B) immediately prior to mixing is lower than that of component (A). Therefore, although the temperature momentarily drops when mixing, the temperature is thought to rise quickly due to the heat of the polymerization reaction. In the case of the present Example, after mixing component (B) at room temperature (25° C.) and heated component (A) in a RIM machine and measuring the temperature of the mixed solution exiting from the discharge outlet immediately thereafter, the temperature of the mixed solution was found to be about 55° C. when the temperature of component (A) just before mixing was about 50° C.

The temperature of the solution as it exited the discharge outlet and was cast into the casting mold to fill the same was also continuously raised due to reaction heat. Measurement of the transition of the liquid temperature after exiting the discharge outlet revealed a temperature increase of about 20° C. 20 seconds later, reaching a maximum peak (about 100° C.) about two minutes later, and then gradually dropping to about 70 to 80° C. five minutes later.
(3) Bubble generation The appearance inspections of manufactured plastic lenses were conducted to check the number of bubbles generated. A passed product rate of 95 percent or more was denoted as A, a passed product rate of 90 percent or more as B, a passed product rate of 80 percent or more as C, and less than 80 percent as D. Here, the term "passed product" is used to mean that absolutely no bubbles were observed in the plastic lens manufactured, or that some bubbling was observed that could not be determined at the visual inspection level.
(4) Optical defects The presence or absence of appearance waves and striae were checked by zircon projection of manufactured plastic lenses. The case where 98 percent or more of the product passed the zircon projection product examination was denoted as A, the case where 95 percent or more passed as B, and the case where less than 95 percent passed as C. Here, the term "the passed product" is used to mean that no appearance flaws or striae were generated within a 30 mm radius of the geometric intermediate center of the lens.
(5) Appearance flaws The term "appearance flaws" is used to mean a state where a pattern is generated on the lens surface, like a flow mark due to casting of the mixture of components (A) and (B) above into the casting mold.
(6) Stria The term "stria" is used to mean a mark due to temperature nonuniformity or polymerization nonuniformity during casting of the mixture of components (A) and (B) into the casting mold. A stria is generally known to appear not just during casting, but also due to thermal history during polymerization.
[Manufacturing Conditions of Evaluation Samples]
Discharge rate of RIM machine: 200 to 400 g/min
Average molecular weight of component (A): about 600 to 700
Mixing ratio of components (A) and (B): 4:1
Temperature of liquid prior to mixing of each component
　Component (A): about 50° C.
　Component (B): room temperature, about 25° C.
Time required to fill cavity: abut 20 seconds
Lenses manufactured: Center thickness=about 7 mm
　Diameter=76 mm
　Weight of lenses manufactured: about 40 g
Tube exchange cycle: 8 min
Casting method: Casting with automatic casting apparatus Example 1

To 100 weight parts of isocyanate terminal prepolymer with an isocyanate group content of 13 percent comprised of polytetramethylene glycol with an average molecular weight of 400 and 4,4'-methylenebis(cyclohexyl isocyanate) were added in advance 0.024 weight part of monobutoxyethyl acid phosphate and 0.036 weight part of di(butoxyethyl)acid phosphate, and the mixture was uniformly dissolved and degassed [Component (A)]. 25.5 weight part quantity of a mixture of 3,5-diethyl-2,4-toluene diamine and 3,5-diethyl-2,6-toluene diamine was employed as component (B).

The temperature of the liquid immediately after mixing of components (A) and (B) was made 55° C., the temperature immediately prior to casting into the casting mold was made 52° C., the casting mold was positioned vertically, and carbon dioxide was introduced into the casting mold at a discharge rate of 10 L/min for about 5 seconds immediately prior to casting. Then, in the casting step, a tube equipped with a jig was connected to a discharge outlet of a RIM machine, and a mixture of components (A) and (B) was cast through the jig with an automatic casting apparatus. Once casting had concluded, the casting mold was tilted roughly 30 degrees for about 20 seconds with the discharge outlet on a top to remove bubbles in the vicinity of the discharge outlet. Subsequently, the casting mold was conveyed on the conveyor of an automatic casting apparatus for about 5 minutes to remove the casting mold from the conveying pallet in a removal area. Next, the casting inlet part and the discharge outlet part of the gasket were both bent to sever the polymerized portion within the cavity from the portions that had polymerized in the casting hole and in the discharge hole. Within 15 minutes of the conclusion of casting, the casting mold in which this severing operation was conducted was placed in an electric furnace that had been preheated to 120° C. and thermal polymerization was conducted for 15 hours. Subsequently, the casting mold was removed from the electric furnace, the gasket was removed, the first and second molds were removed, and a molded plastic lens article was obtained. Next, the plastic lens that had been obtained was washed and the generation of bubbles and optical defects were determined by the above-described evaluation methods. The results are shown in Table 1.

Example 2

With the exception that the casting mold was heated so that the temperature immediately prior to casting into the casting mold was made 65° C., the same components (A) and (B)

were employed and the same operations were conducted as in Example 1. Table 1 gives the results of evaluation of the generation of bubbles and optical defects of the plastic lenses thus obtained.

Example 3

With the exception that the discharge rate of carbon dioxide was 15 L/min., the same components (A) and (B) were employed and the same operations were conducted as in Example 1. Table 1 gives the results of evaluation of the generation of bubbles and optical defects of the plastic lenses thus obtained.

Example 4

With the exception that carbon dioxide was discharged for 10 seconds, the same components (A) and (B) were employed and the same operations were conducted as in Example 1. Table 1 gives the results of evaluation of the generation of bubbles and optical defects of the plastic lenses thus obtained.

Comparative Example 1

With the exception that carbon dioxide was not discharged immediately prior to casting, the same components (A) and (B) were employed and the same operations were conducted as in Example 1. Table 1 gives the results of evaluation of the generation of bubbles and optical defects of the plastic lenses thus obtained.

TABLE 1

| | Temperature of casting mold immediately prior to casting (° C.) | Angle of casting mold placed | Injection rate of carbon dioxide (L/min.) | Injection time of carbon dioxide (Seconds) | Bubbles | Optical defects |
|---|---|---|---|---|---|---|
| Ex. 1 | 50° C. | 90° | 10 | 5 | B | A |
| Ex. 2 | 65° C. | 90° | 10 | 5 | A | B |
| Ex. 3 | 50° C. | 90° | 15 | 5 | A | A |
| Ex. 4 | 50° C. | 90° | 10 | 10 | A | A |
| Comp. Ex. 1 | 50° C. | 90° | 0 | 0 | D | A |

As shown in Table 1, in the plastic lenses manufactured by the manufacturing method (first aspect) of the present invention, bubbles generated as well as optical defects were few. In contrast, in the plastic lens of Comparative Example 1, that was manufactured without discharge of carbon dioxide into the casting mold prior to casting, generation of bubbles was significant.

To 100 mass parts of isocyanate terminal prepolymer with an isocyanate group content of 13 percent comprised of polytetramethylene glycol with an average molecular weight of 400 and 4,4'-methylenebis(cyclohexyl isocyanate) were added in advance 0.024 mass part of monobutoxyethyl acid phosphate and 0.036 mass part of di(butoxyethyl)acid phosphate, and the mixture was uniformly dissolved and degassed [Component (A)]. 25.5 mass part quantity of a mixture of 3,5-diethyl-2,4-toluene diamine and 3,5-diethyl-2,6-toluene diamine was employed as component (B).

The temperature of the liquid immediately after mixing of components (A) and (B) was made 55° C., the temperature immediately prior to casting into the casting mold was made 52° C., the casting mold was tilted vertically, and carbon dioxide was introduced into the casting mold at a discharge rate of 20 L/min for about 10 seconds immediately prior to casting. Then, in the casting step, a tube equipped with a jig was connected to a discharge outlet of a RIM machine, and a mixture of components (A) and (B) was cast through the jig with an automatic casting apparatus. The casting nozzle employed was round and had an inner diameter of 5.0 mm and an outer diameter of 6.0 mm. The apical part of the casting nozzle was inclined 45°. The casting mold shown in FIG. 2 was employed. The outer shape of the casting inlet apical plane part of the casting mold was square, measuring 15 mm on a side. The casting hole was round with an internal diameter of 4.0 mm. The casting inlet apical plane part was inclined 45°. Further, contact of the nozzle apical plane part with the casting inlet apical plane part was conducted by the method shown in FIG. 18 (a method in which the gap was gradually closed while keeping the nozzle apical plane part and the casting inlet apical plane part parallel). From a state at the start of the operation in which the nozzle apical plane part and the casting inlet apical plane part were positioned 4 mm apart, the distance between nozzle apical plane part and the casting inlet apical plane part was gradually reduced over 5 seconds to bring them into contact. Once casting had concluded, the casting mold was tilted roughly 30 degrees for about 20 seconds with the discharge outlet on a top to remove bubbles in the vicinity of the discharge outlet. Subsequently, the casting mold was conveyed on the conveyor of an automatic casting apparatus for about 5 minutes to remove the casting mold from the conveying pallet in a removal area. Next, the casting inlet part and the discharge outlet part of the gasket were both bent to sever the polymerized portion within the cavity from the portions that had polymerized in the casting hole and in the discharge hole. Within 15 minutes of the conclusion of casting, the casting mold in which this severing operation was conducted was placed in an electric furnace that had been preheated to 120° C. and thermal polymerization was conducted for 15 hours. Subsequently, the casting mold was removed from the electric furnace, the gasket was removed, the first and second molds were removed, and a molded plastic lens article was obtained. Next, the plastic lens that had been obtained was washed and the generation of bubbles and optical defects were determined by the above-described evaluation methods. As a result, the evaluation scores for bubble generation and optical defects were both "A".

INDUSTRIAL APPLICABILITY

According to the present invention, plastic lenses with reduced bubble defects and optical defects can be manufactured. The manufacturing method of the present invention is suitable as a manufacturing method of an eyewear lens.

BRIEF DESCRIPTION OF DRAWINGS

[FIG. 15] It is a sectional view along section line I-I (on the casting hole side) of the gasket shown in FIG. 1.

FIG. 16(a) is a lateral view of the nozzle, FIG. 16(b) is a front view of the nozzle, FIG. 16(c) is a top view of the nozzle, and FIG. 16(d) is a sectional view along section line II-II.

FIG. 20(a) is an enlarged view of the holding plate for casting inlet part in the fixing part for casting inlet part shown in FIG. 19(e). FIG. 20(b) is a drawing showing the casting mold mounted in FIG. 20(a).

[FIG. 23] FIG. 23(a) is a detailed drawing of the thickness retaining part on the second mold side shown in FIG. 19(b). FIG. 23(b) is a view along section line V-V.

[FIG. 26(1)] It shows the structures of casting hole fixing support jig 921 and holding member fixing stopper 922.

[FIG. 26(2)] It shows the operation of casting hole fixing support jig 921 and holding member fixing stopper 922.

[FIG. 27] It shows the pallet prior to connecting with holding member.

Figure 1:
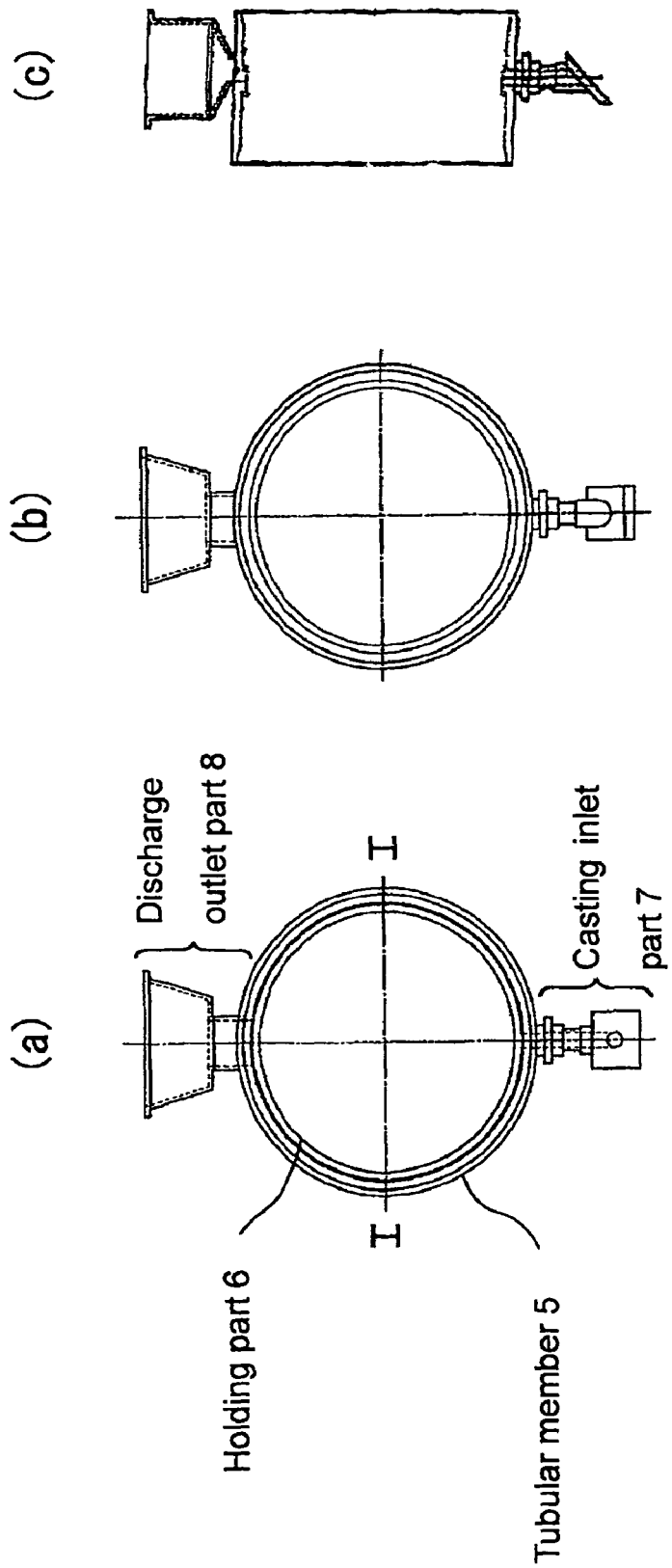
[FIG. 1] It is a top view of a gasket for molding plastic lens, (a) is a front view, (b) is a rear view, and (c) is a lateral view.
Figure 2:
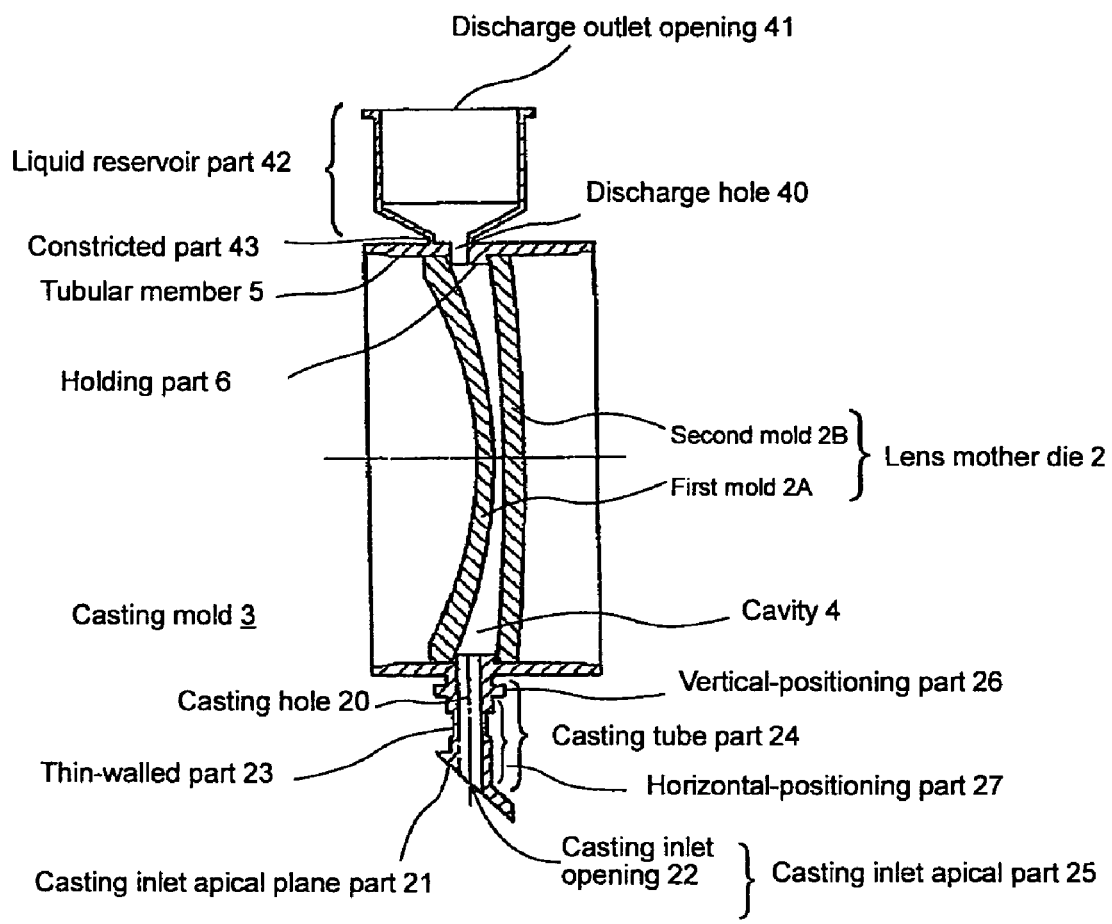
[FIG. 2] It is a sectional view showing a lens mother die installed in the gasket shown in FIG. 1.
Figure 3:
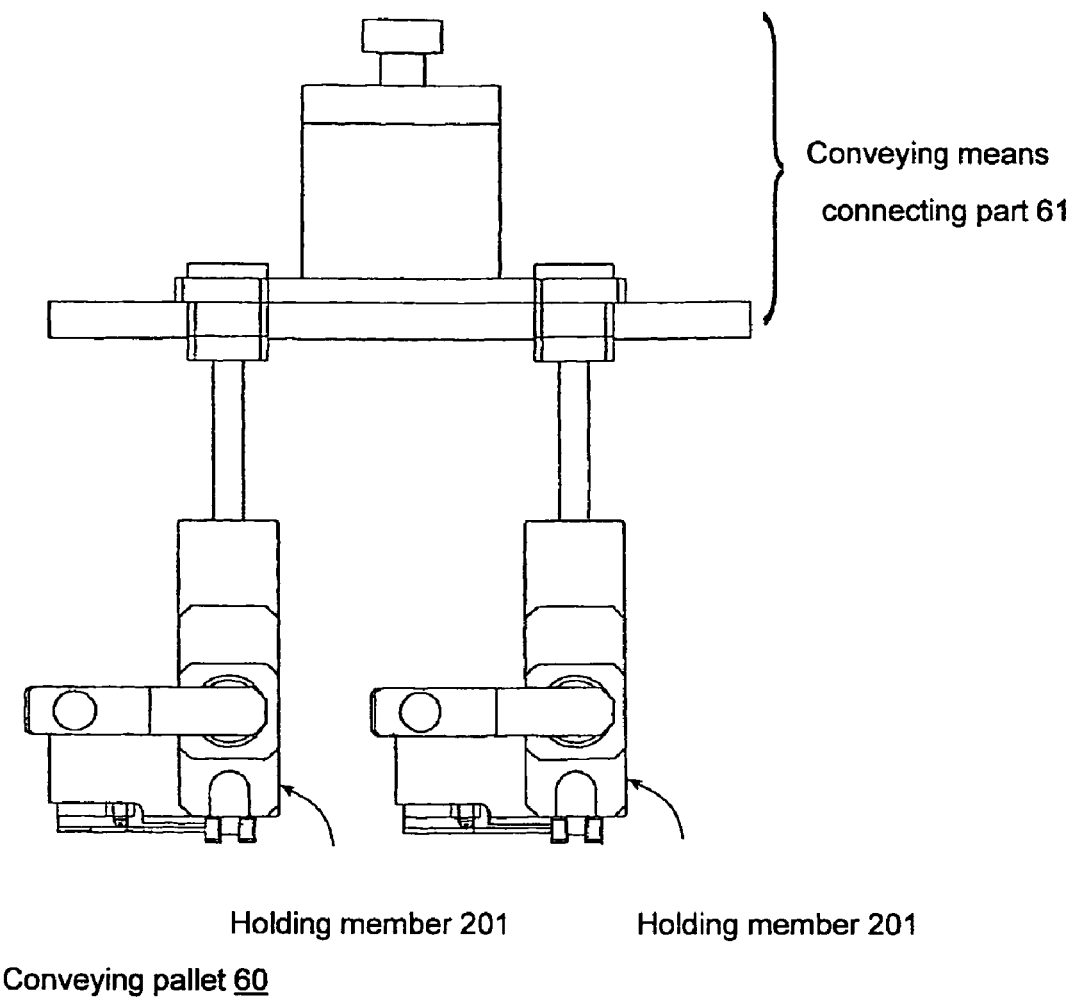
[FIG. 3] It is a drawing of a conveying pallet, upon which a holding member is mounted.
Figure 4:
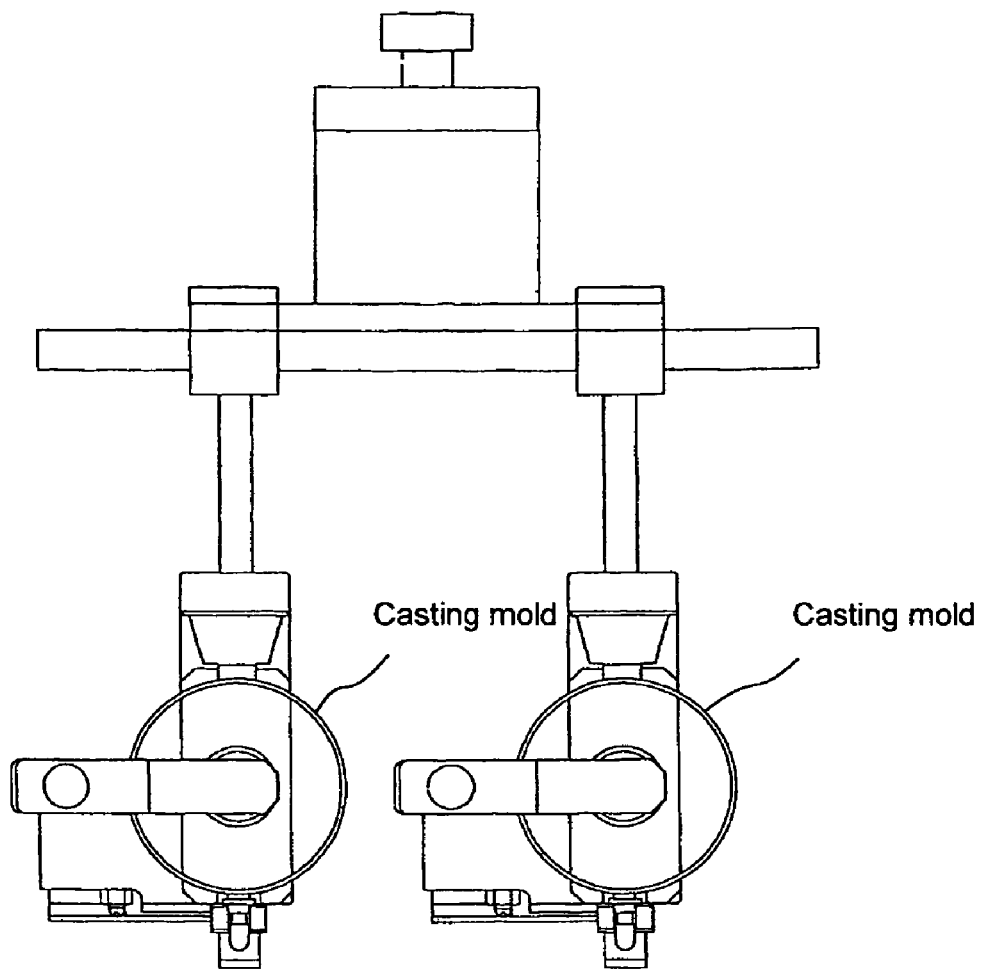
[FIG. 4] It shows the conveying pallet shown in FIG. 3, upon which the casting mold is mounted.
Figure 5:
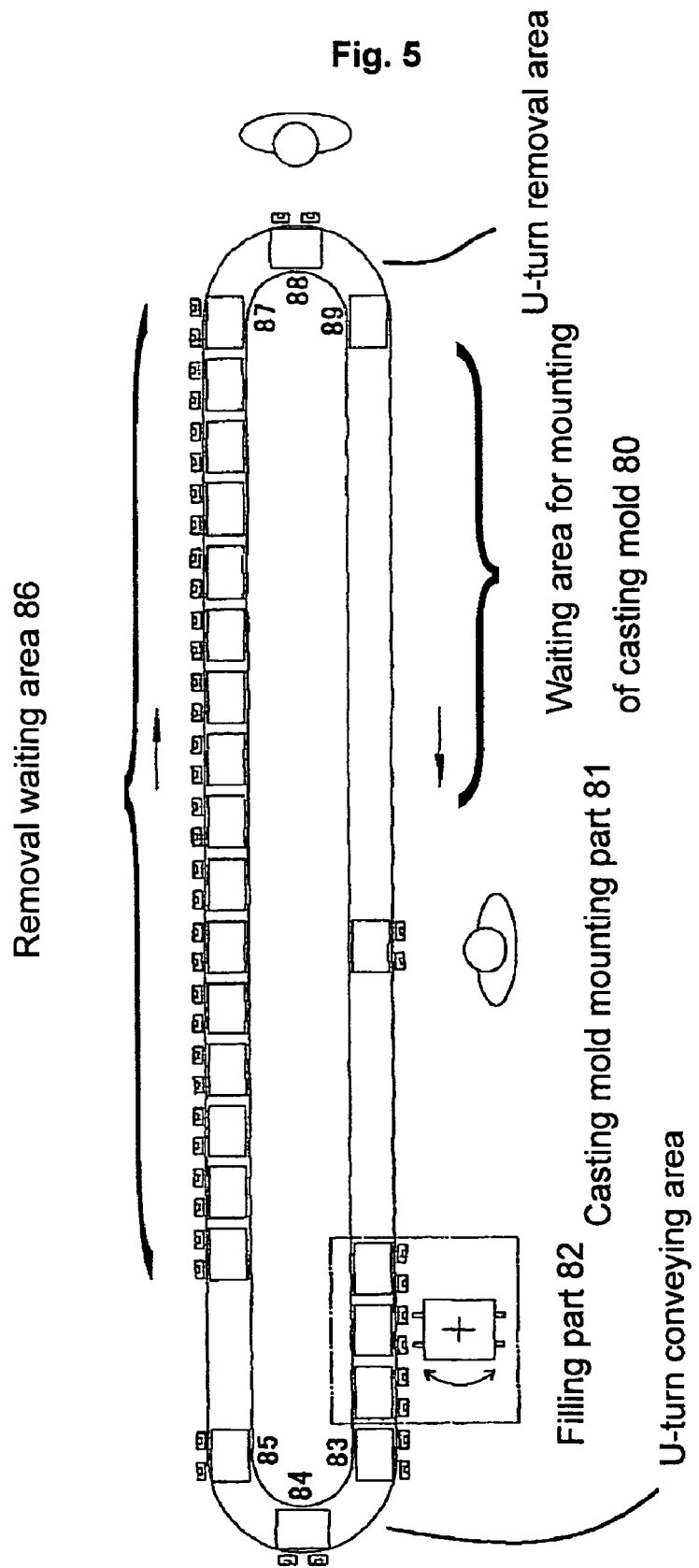
[FIG. 5] It is an overall drawing of an automatic casting apparatus.
Figure 6:
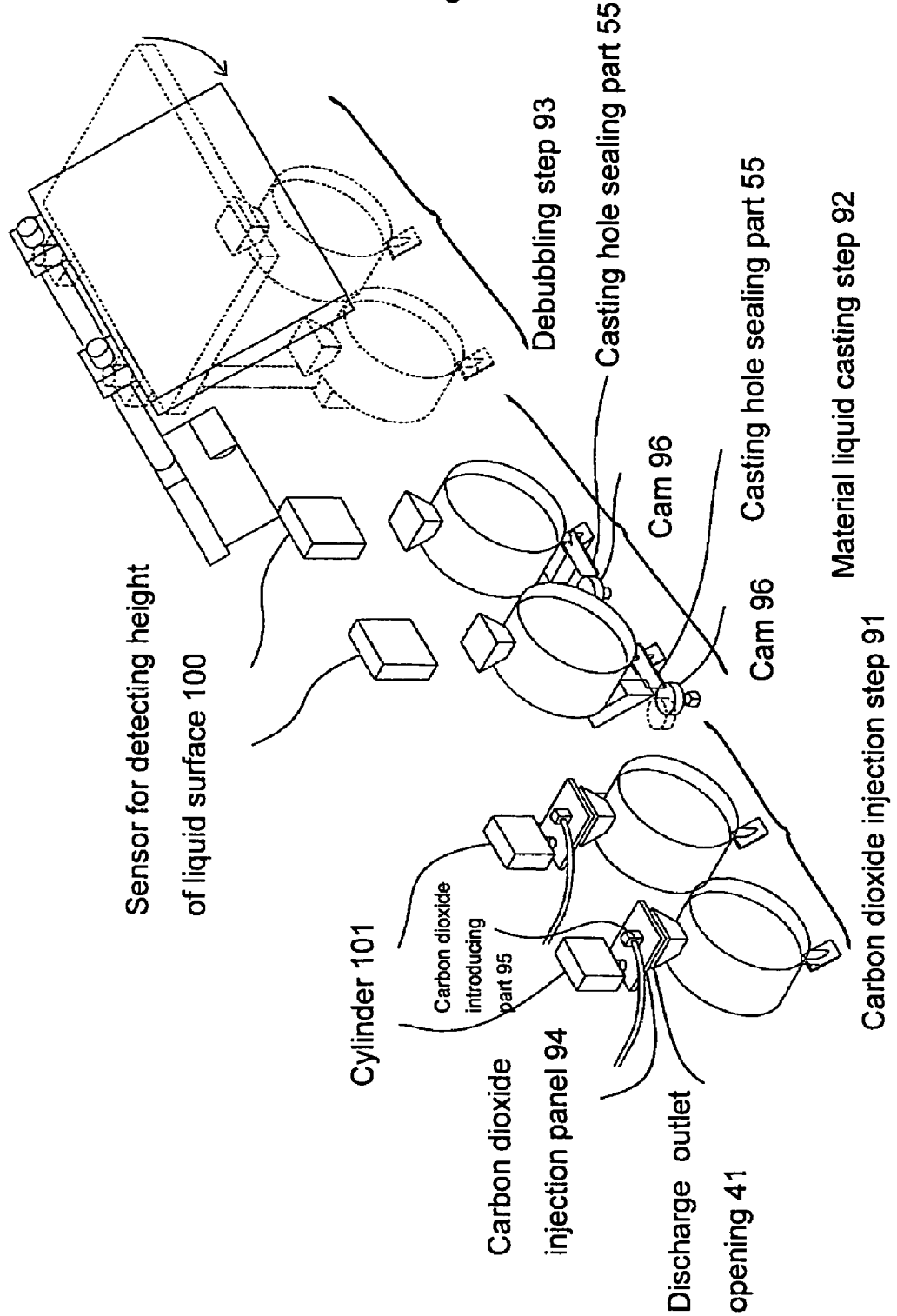
[FIG. 6] It is a detailed drawing of the filling part of the automatic casting apparatus shown in FIG. 5.
Figure 7:
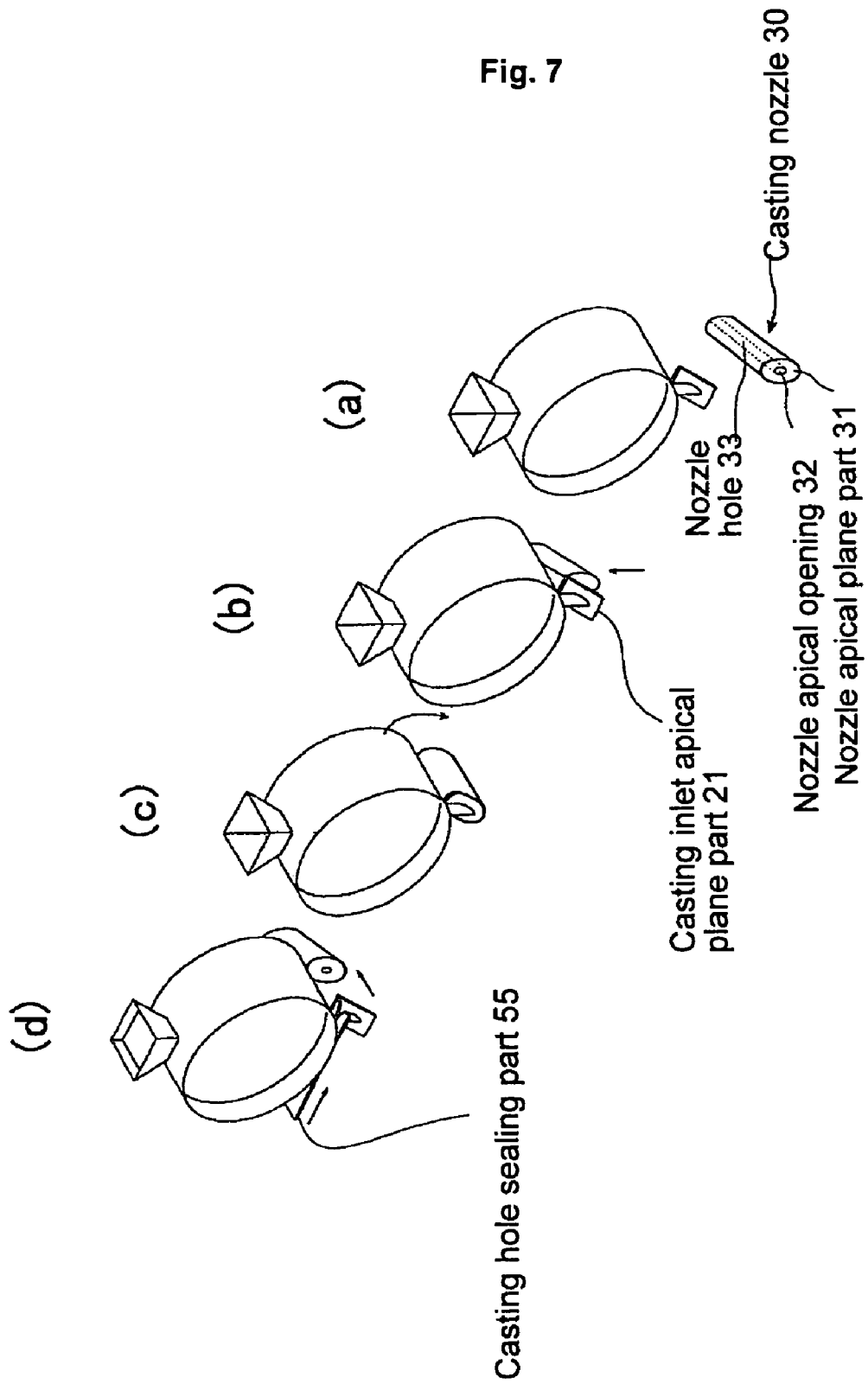
[FIG. 7] It is a drawing showing the operation of the nozzle during casting of a mixture into the casting mold.
Figure 8:
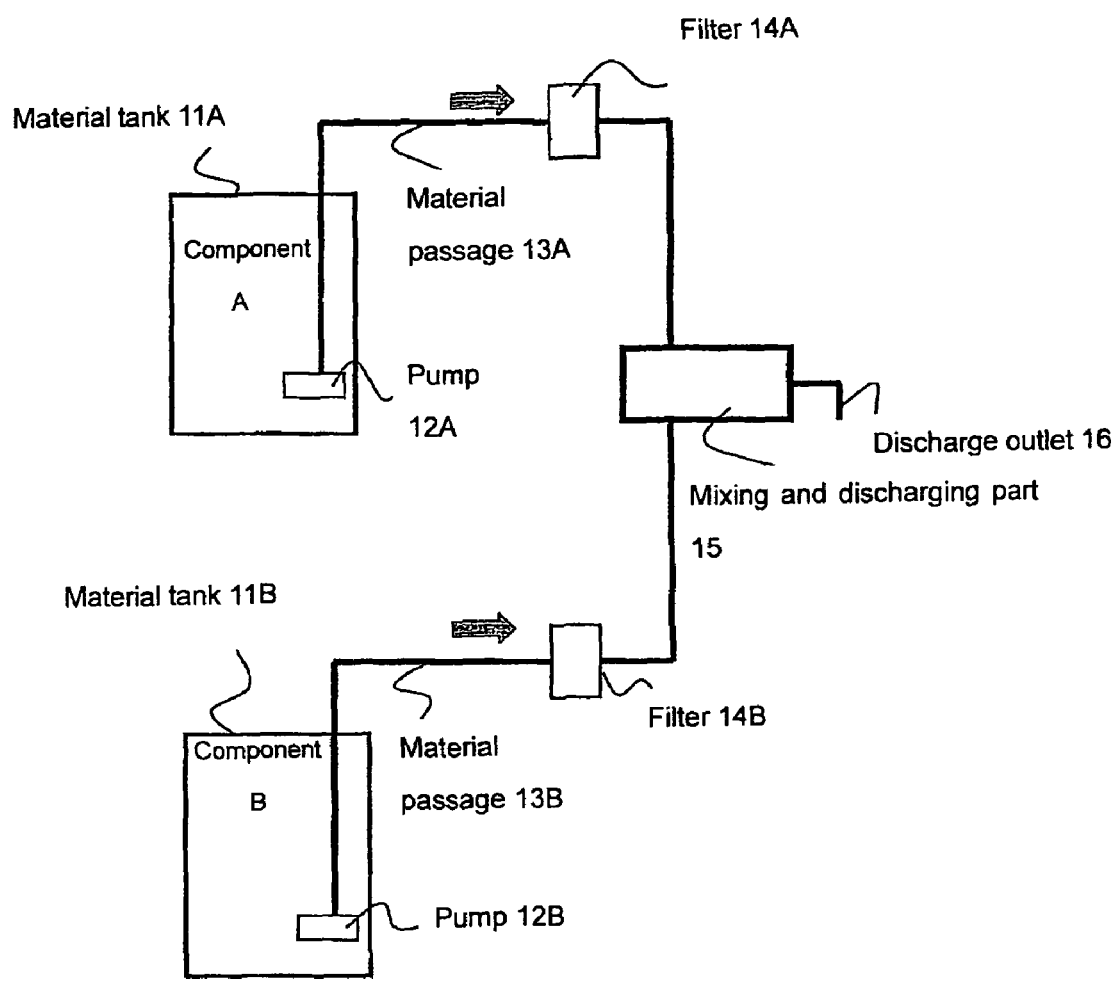
[FIG. 8] It is a descriptive drawing of the structure of a RIM machine.
Figure 9:
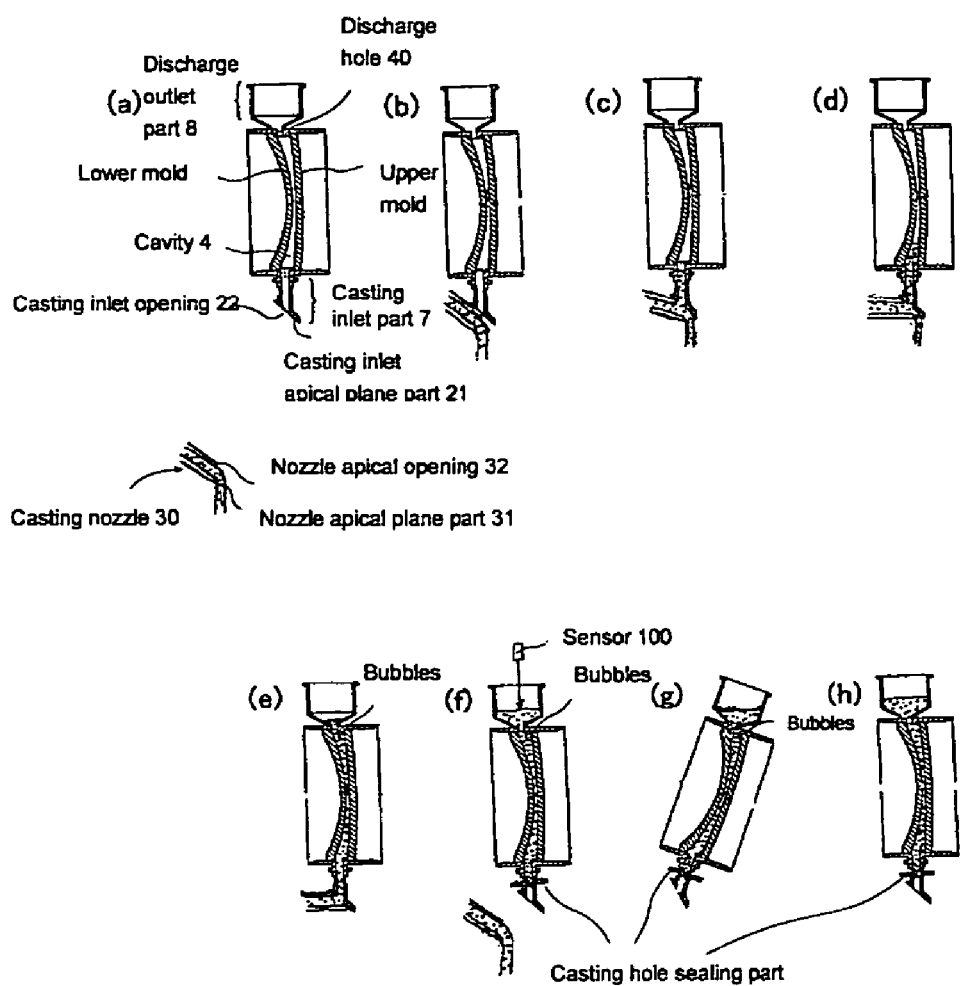
[FIG. 9] It is an example of the flow of the lens starting material casting process.
Figure 10:
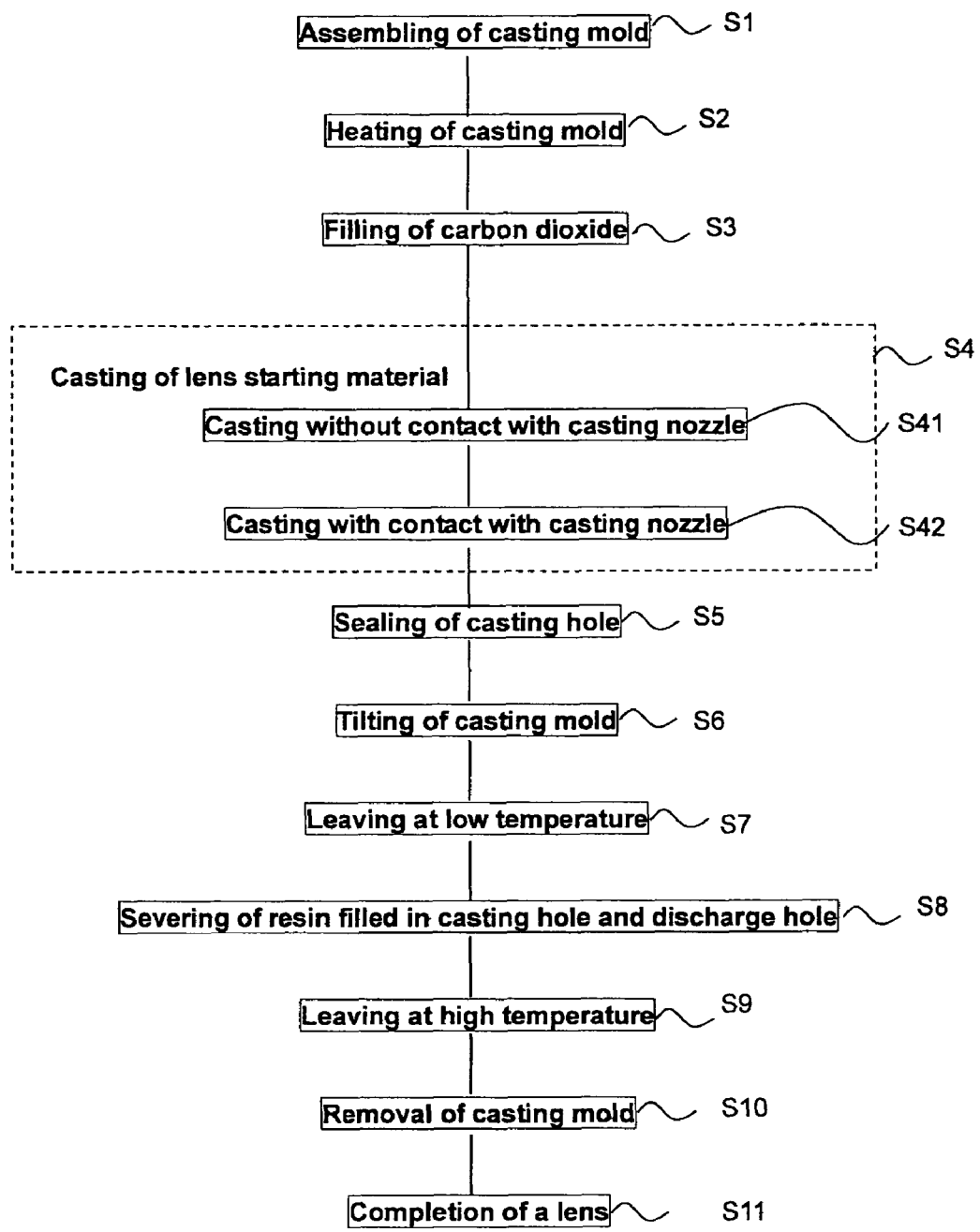
[FIG. 10] It is an overall flowchart of the lens manufacturing process.
Figure 11:
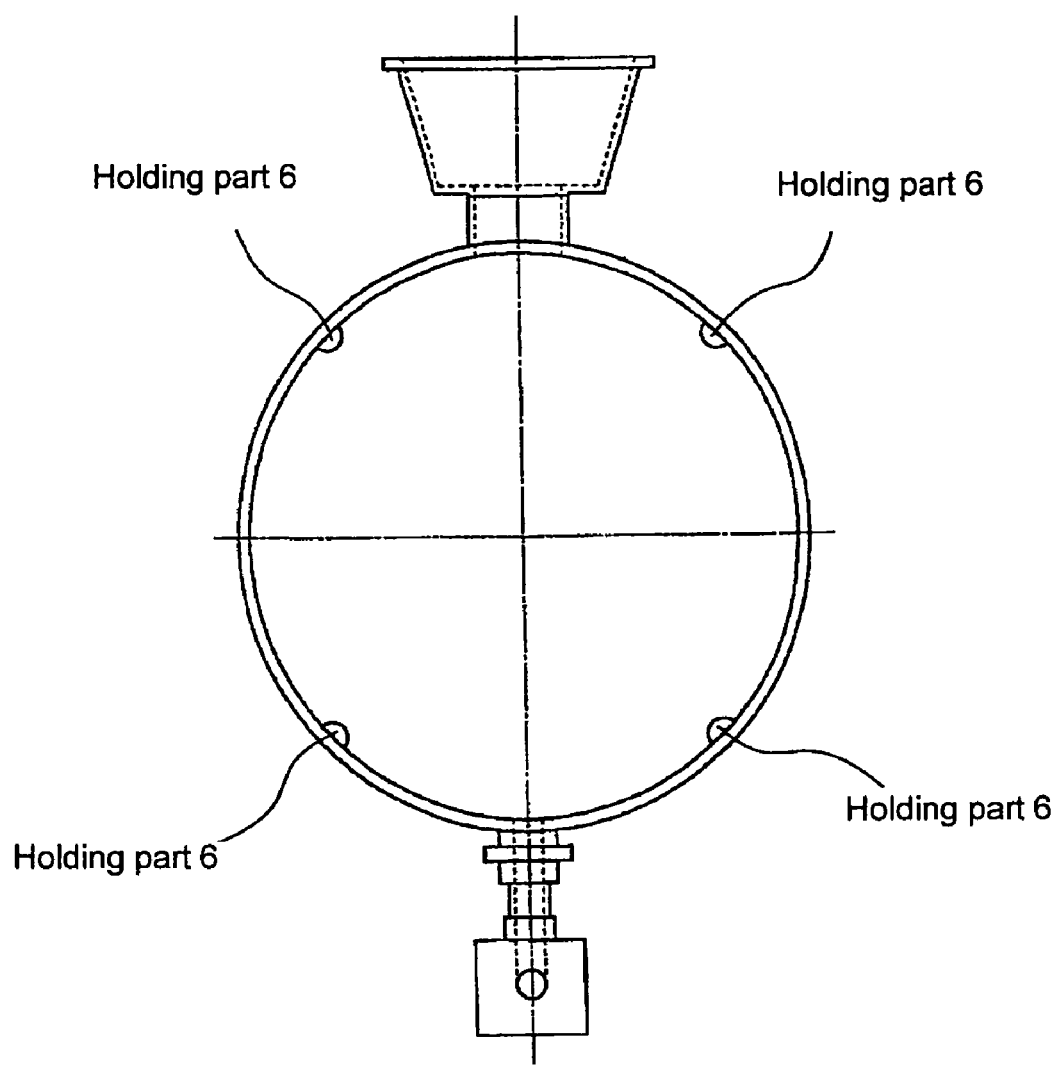
[FIG. 11] It is an example of a gasket for molding plastic lens having a holding part.
Figure 12:
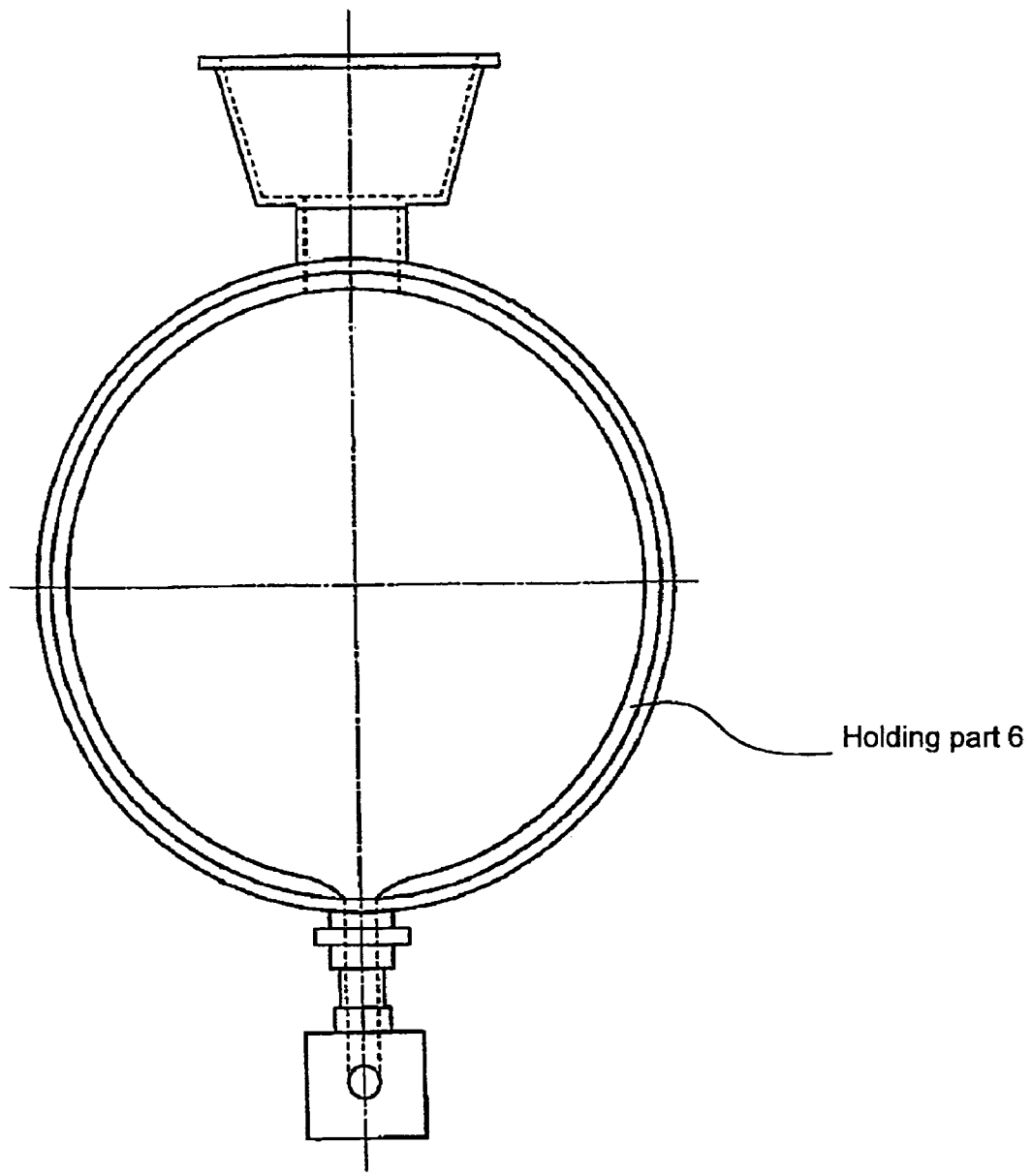
[FIG. 12] It is an example of a gasket for molding plastic lens having a holding part.
Figure 13:
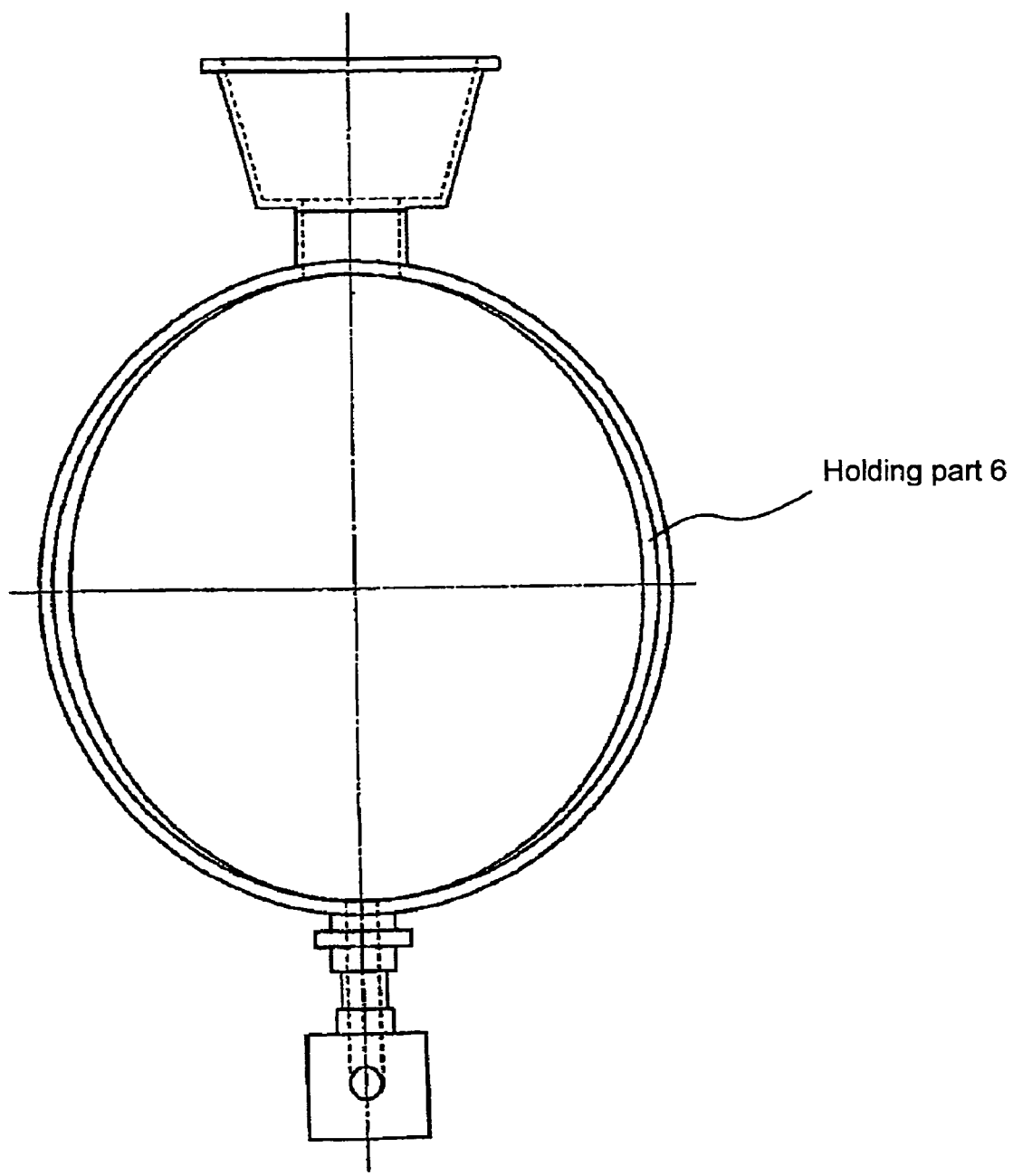
[FIG. 13] It is an example of a gasket for molding plastic lens having a holding part.
Figure 14:
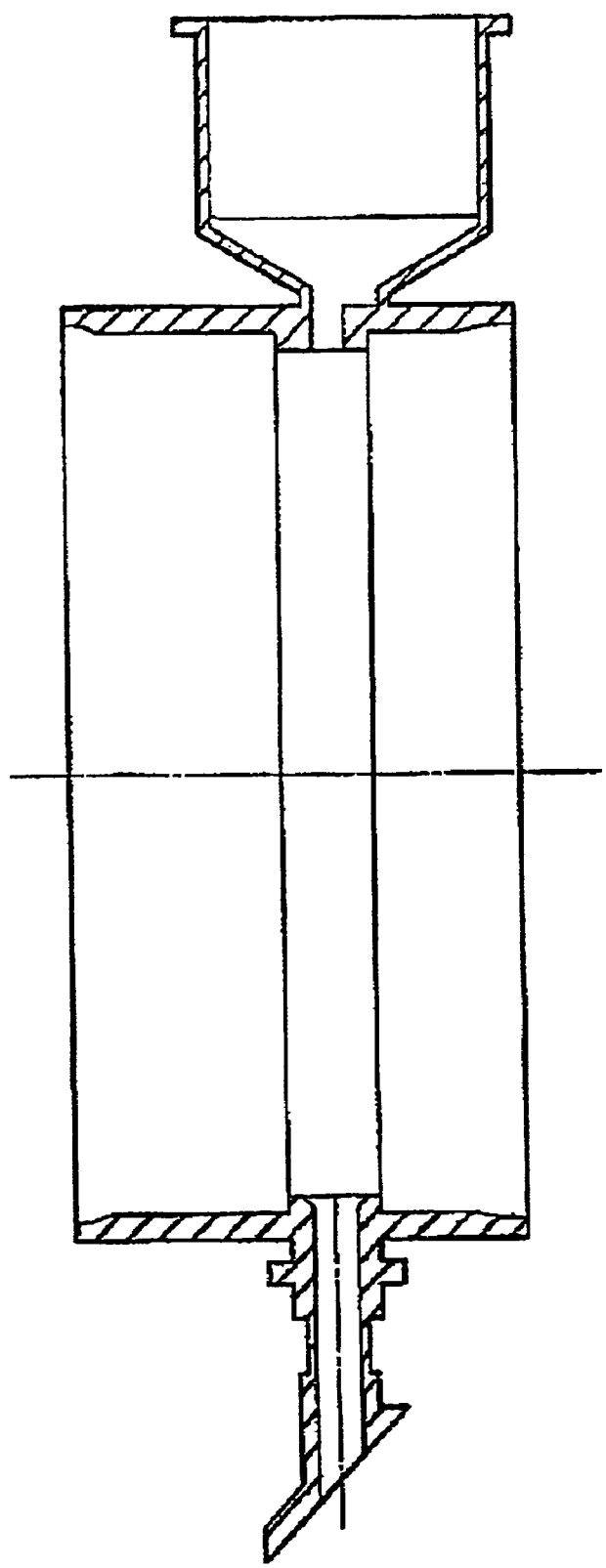
[FIG. 14] It is a sectional view of a gasket for molding plastic lens of which the portion connecting casting hole and cavity is in the form of a tapered opening.
Figure 16:
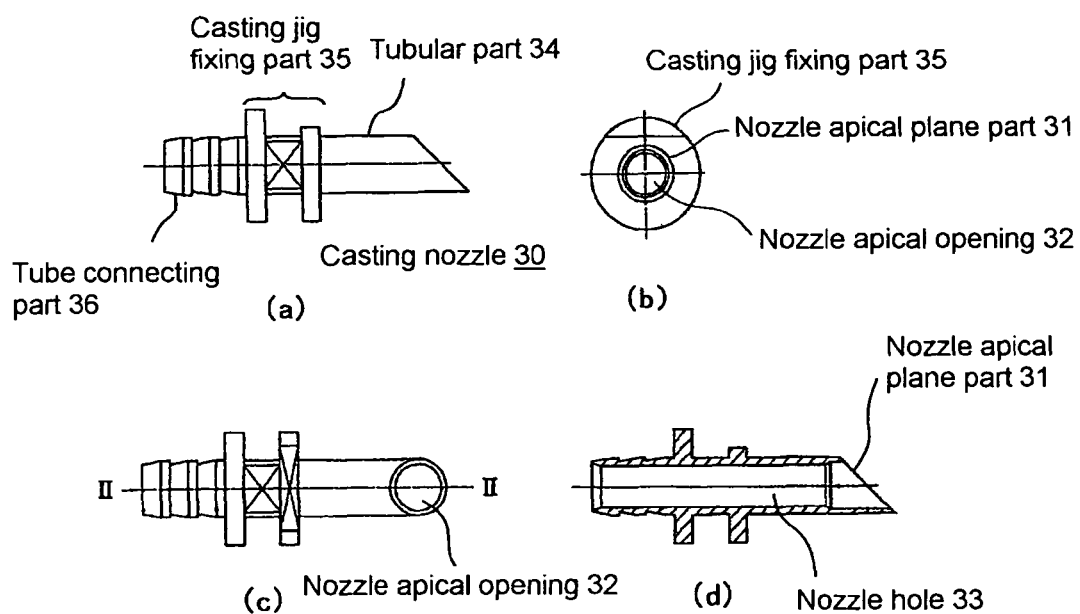
[FIG. 16] It is an example of a nozzle employed in the present invention.
Figure 17:
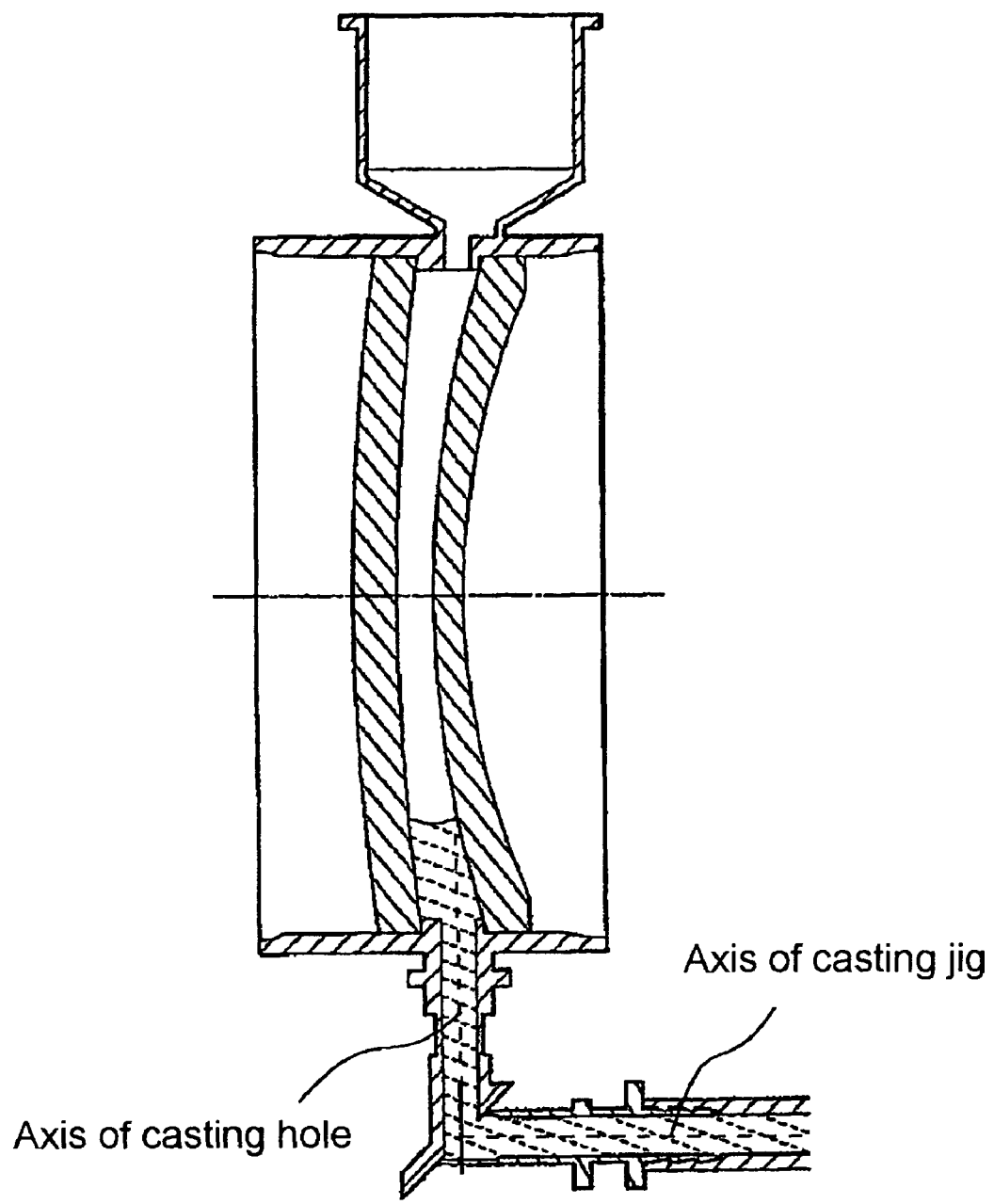
[FIG. 17] It is a descriptive drawing of a nozzle apical plane part formed so that the axial direction of the casting hole intersects almost perpendicularly the axial direction of the casting jig.
Figure 18:
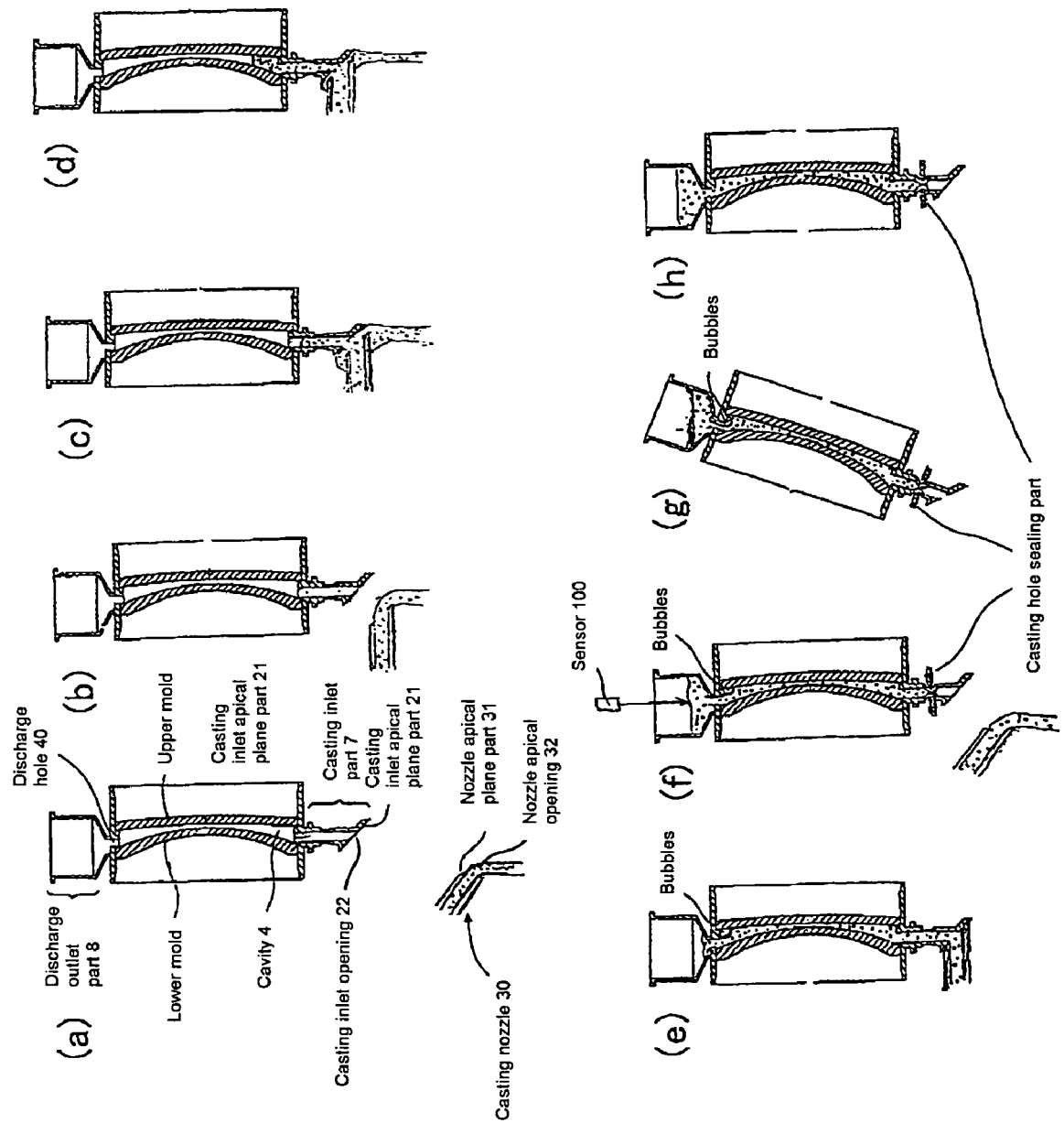
[FIG. 18] It is an example of the flow of the lens starting material casting process.
Figure 19:
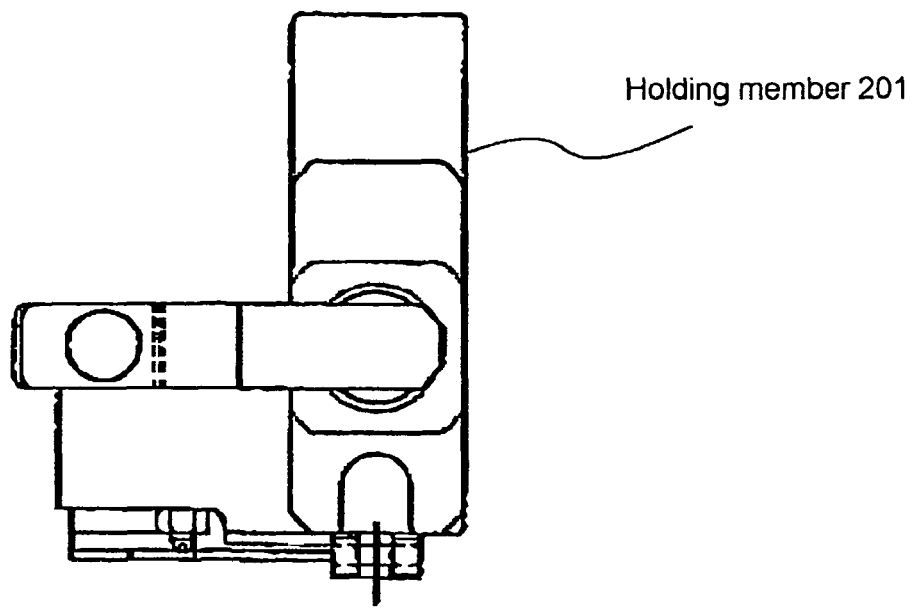
[FIG. 19(a)] It is a front view of holding member 201.
[FIG. 19(b)] It is a top view of holding member 201.
[FIG. 19(c)] it is a bottom view of holding member 201.
[FIG. 19(d)] It is a right lateral view of holding member 201.
[FIG. 19(e)] It is a left lateral view of holding member 201.
[FIG. 19(f)] It is a rear view of holding member 201.
Figure 19:
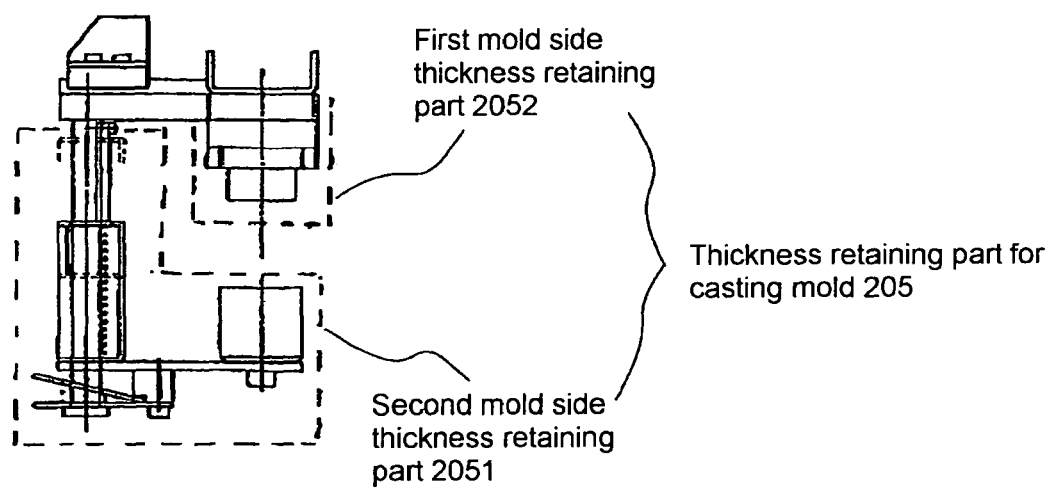
Figure 19:
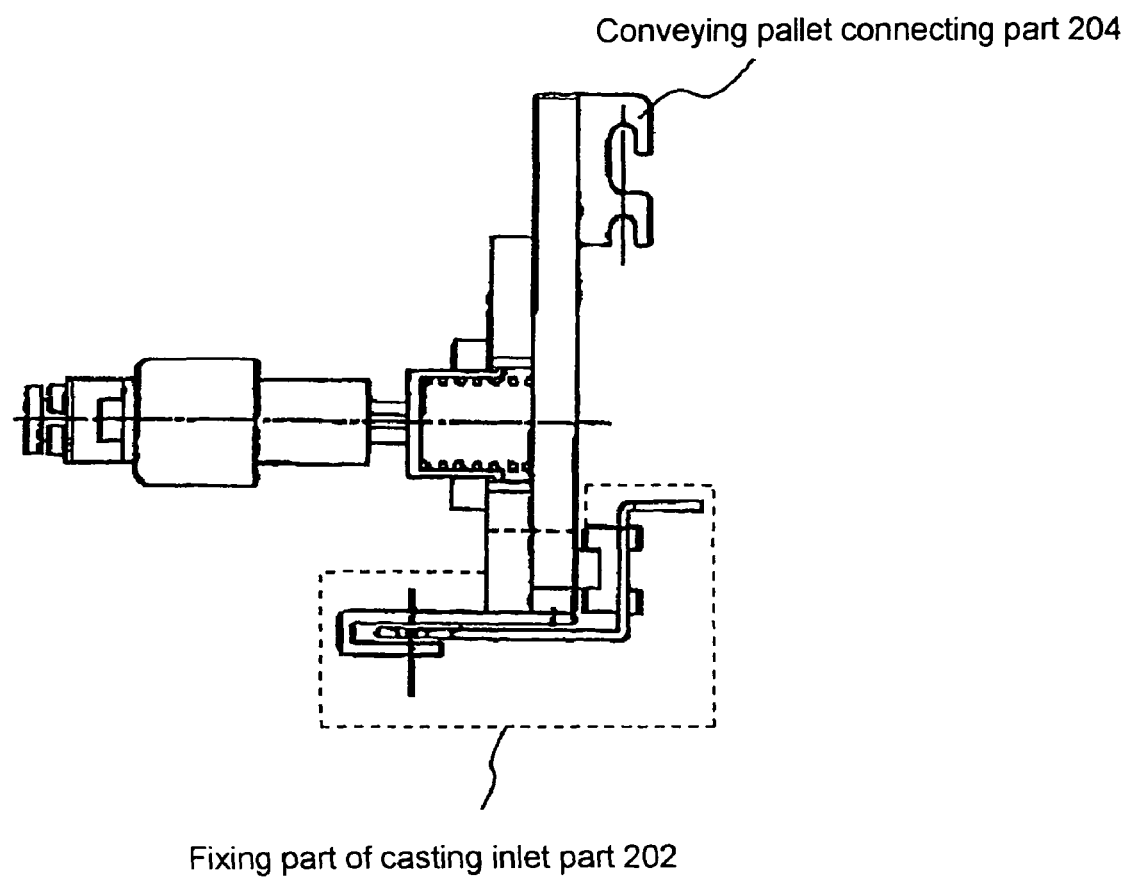
Figure 19:
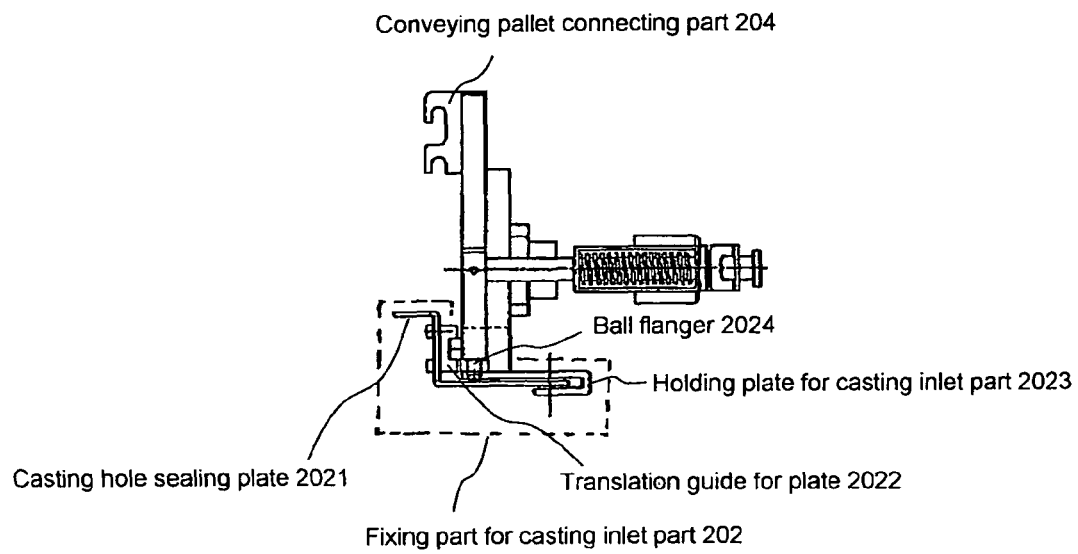
Figure 19:
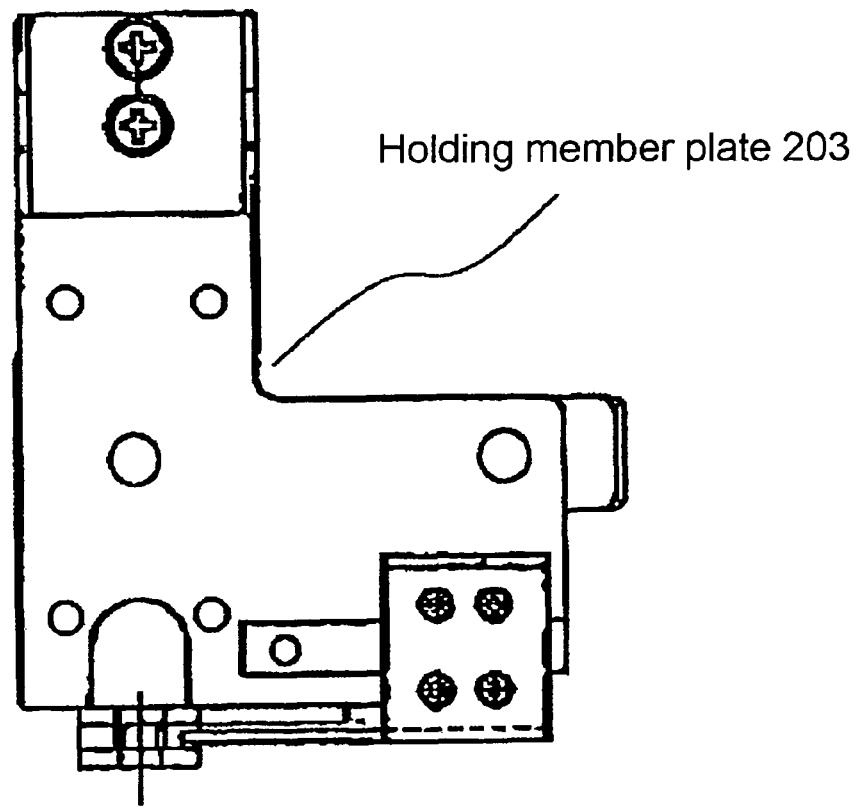
Figure 20:
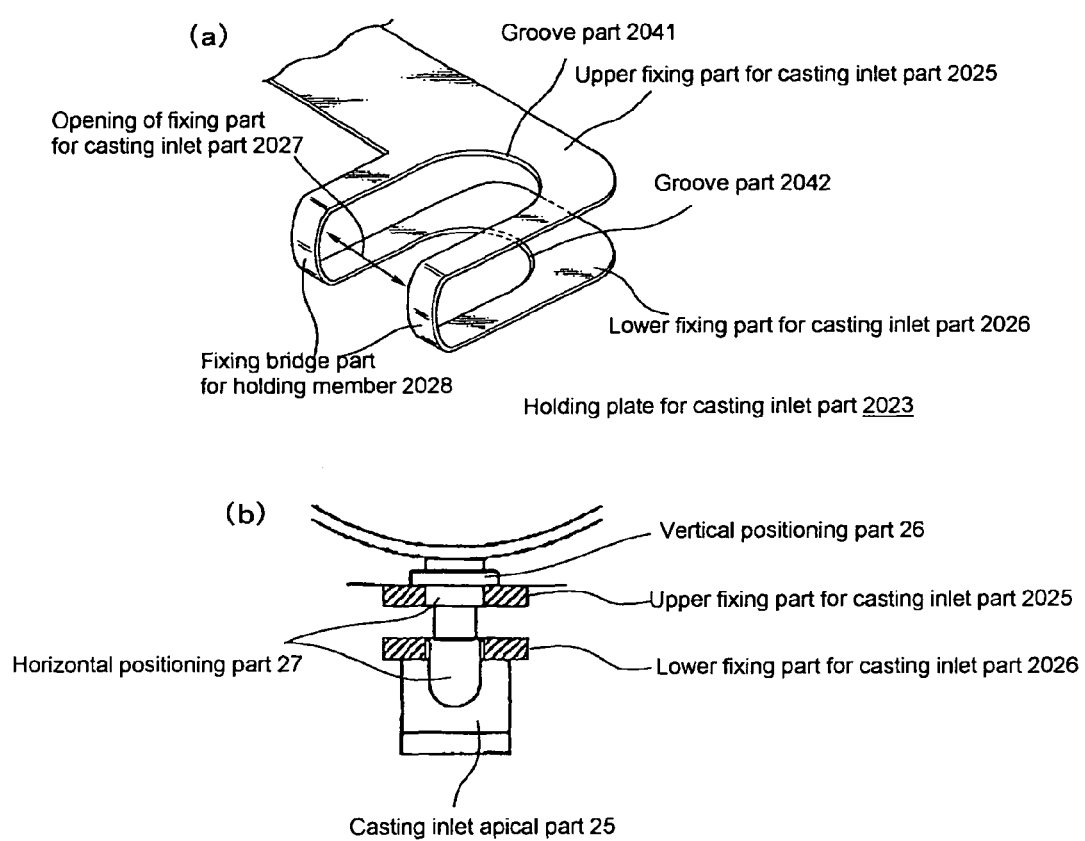
[FIG. 20]
Figure 21:
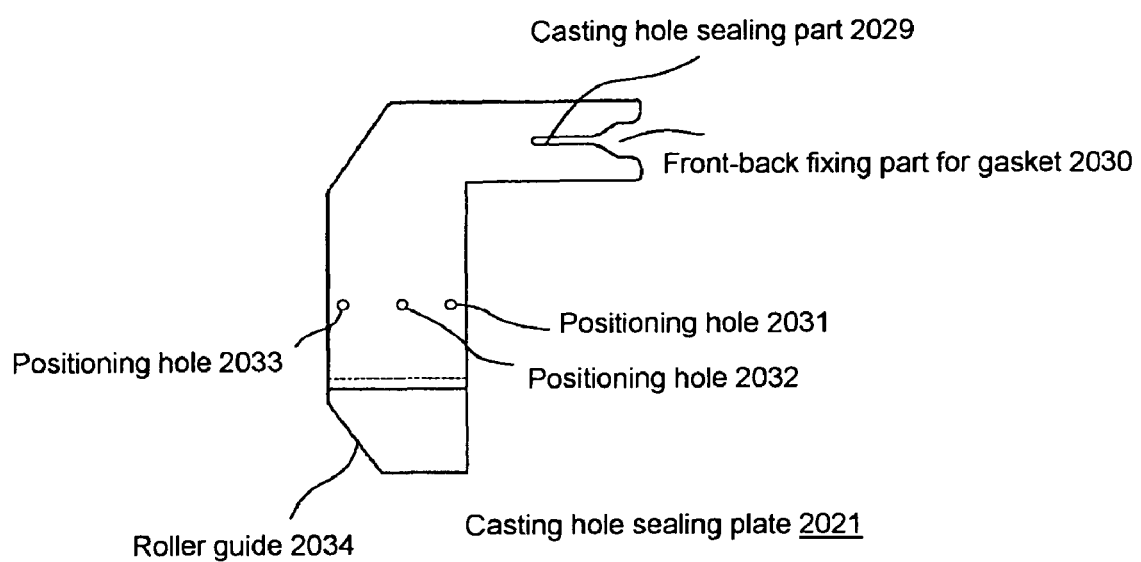
[FIG. 21] It is an enlarged view of the casting hole sealing plate in the fixing part for casting inlet part shown in FIG. 19(e).
Figure 22:
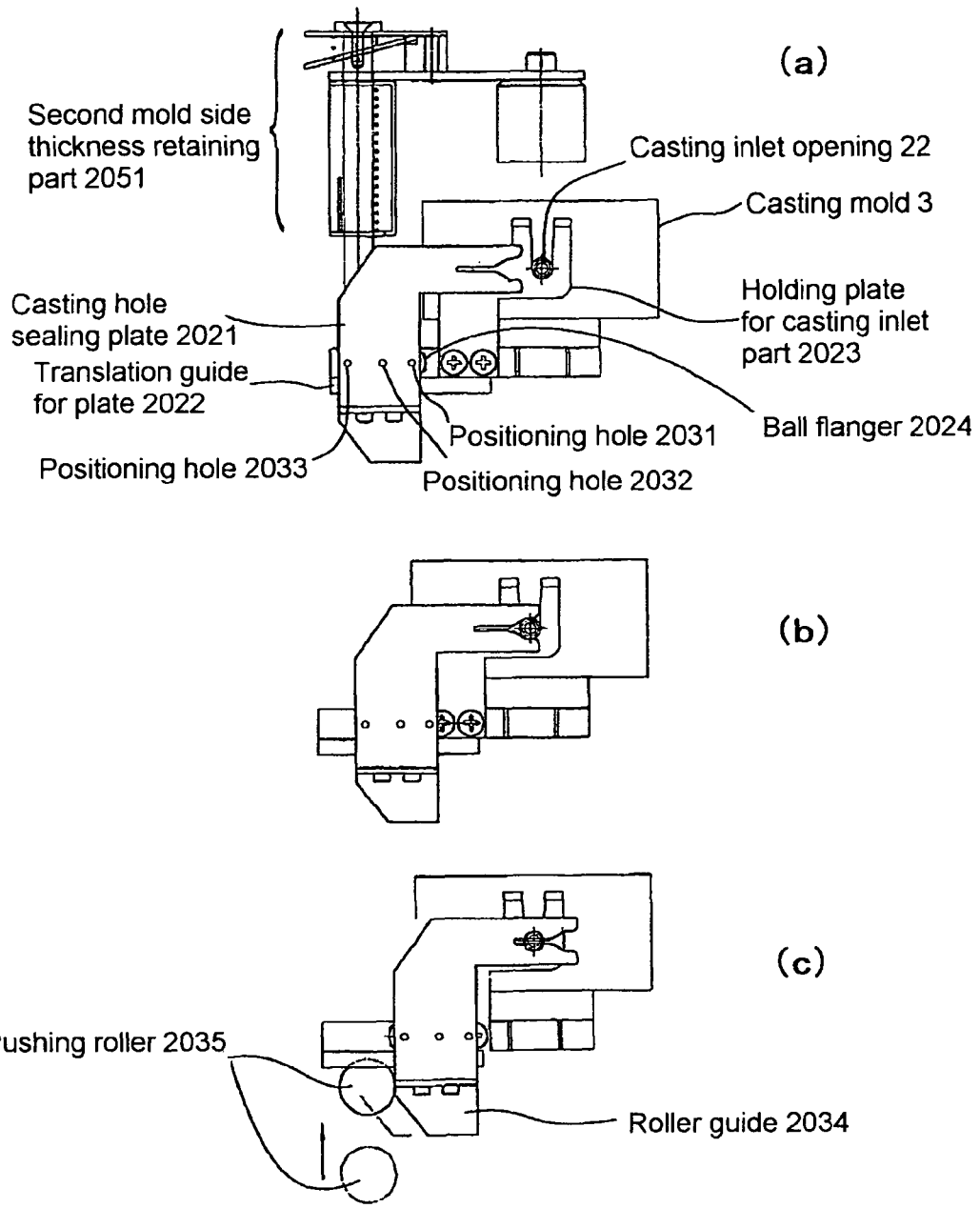
[FIG. 22] They are drawings showing the movement of the casting hole sealing plate.
Figure 24:
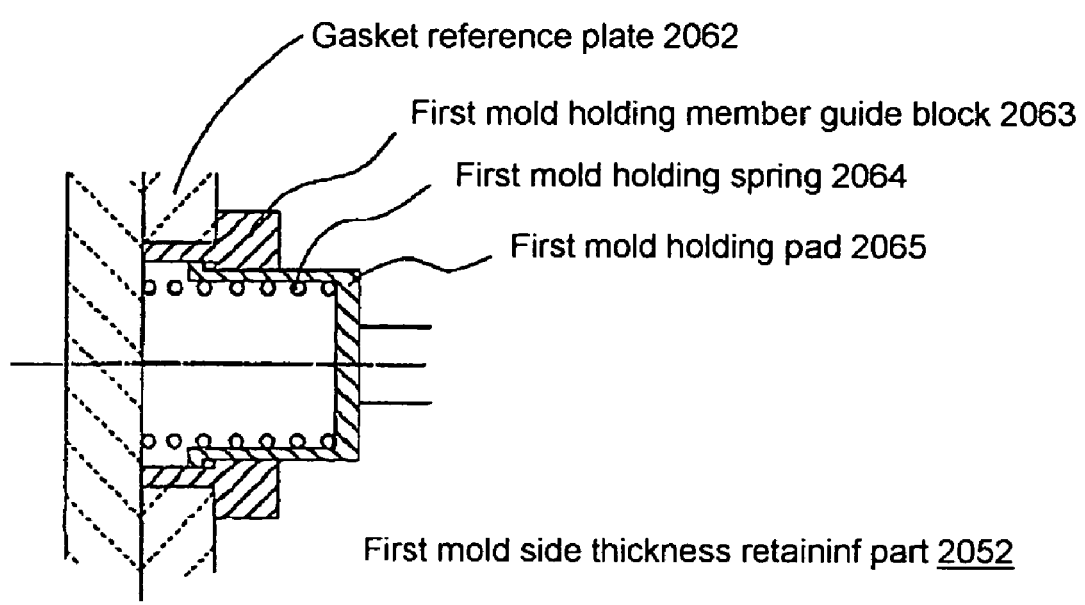
[FIG. 24] It is a detailed drawing of the thickness retaining part on the first mold side shown in FIG. 19(b).
Figure 25:
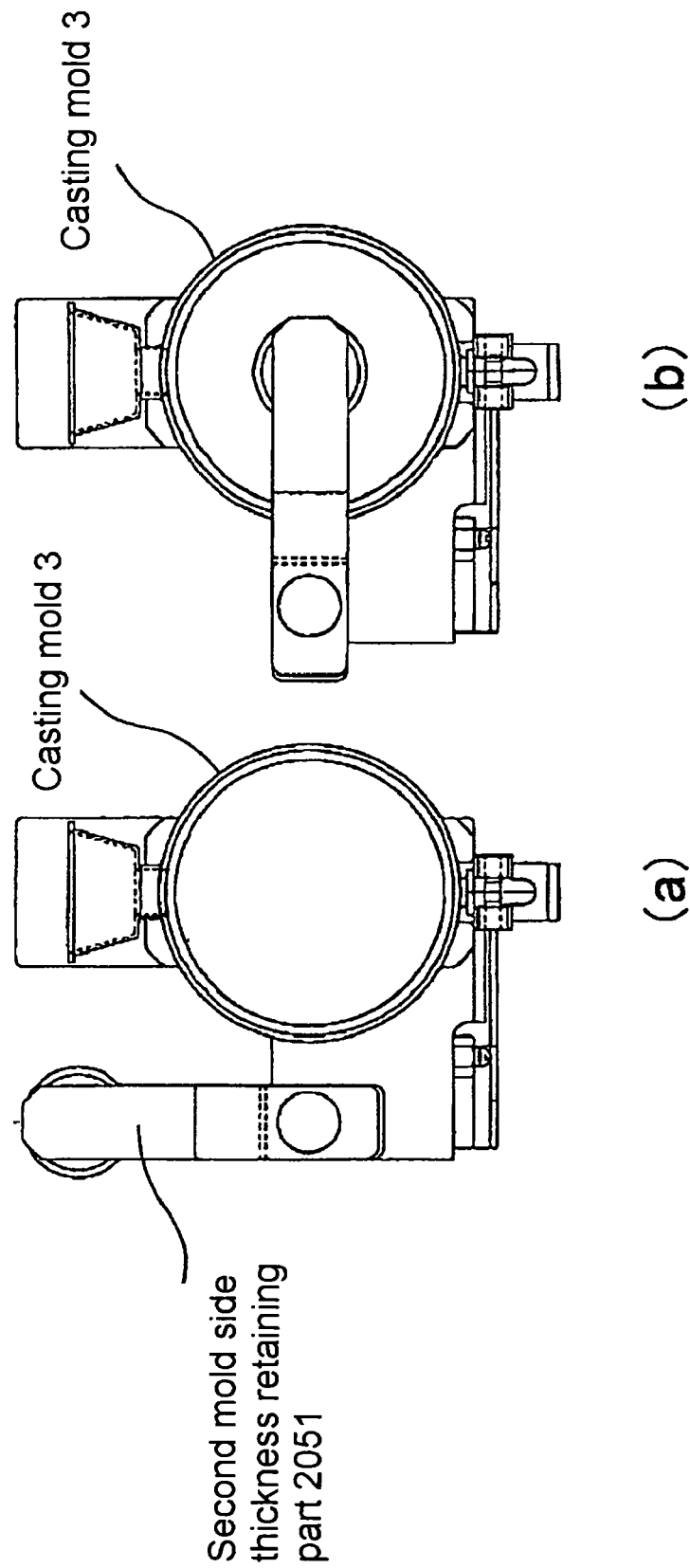
[FIG. 25] It is a drawing showing the method of detaching the casting mold.

The invention claimed is:

1. A method of manufacturing a plastic lens by casting a liquid plastic lens starting material comprising:
   continuously providing said liquid material to a casting jig having a casting jig opening for exuding said liquid material;
   moving said casting jig towards a casting mold having a casting hole with a casting inlet opening as said liquid material is being exuded from said casting jig opening;
   flowing said exuded liquid material out of said casting jig opening into said casting mold through said casting inlet opening; and
   curing said liquid starting material to form a molded article,
   wherein said casting mold has an internal cavity and has at diametrically opposed positions a casting hole for casting said liquid material into the cavity and a discharge hole for discharging gases in the cavity or excess liquid material in the cavity to the exterior of the casting mold,
   wherein said moving step comprises moving said jig to a position below said casting mold in the direction of gravity for communicating between said casting jig opening and said casting inlet opening,
   wherein said casting step comprises casting said liquid material into said casting mold by exuding said liquid material from said casting jig opening upwards against gravity and through said casting hole in a state where the casting mold is tilted from or perpendicular to a horizontal plane as well as the discharge hole is positioned at a top of said casting mold in a direction of gravity,
   wherein said flowing step further comprises, during a period, from when said casting inlet opening begins to communicate with said casting jig opening to when the communication ends, flowing a portion of the liquid material from the casting jig opening into the casting hole, and flowing the remaining portion downward in a direction of gravity without flowing into the casting hole.

2. The method of manufacturing according to claim 1, wherein said casting mold has a mold for forming one side of the lens and a mold for forming the other side thereof that are positioned opposite at a prescribed interval, a circular gasket is positioned around said two molds, and a cavity is formed with said molds and gasket, and
   said gasket is provided with said casting hole and said discharge hole.

3. The method of manufacturing a plastic lens according to claim 1, wherein a gap is formed between said casting jig opening and said casting inlet opening during the said period, and through the gap, a portion of the liquid starting material flowing out through the casting jig opening flows downward.

4. The method of manufacturing a plastic lens according to claim 3, wherein said gap is present at least up until said liquid starting material begins to flow into the cavity.

5. The method of manufacturing a plastic lens according to claim 3, wherein casting of said liquid starting material is carried out while gradually narrowing said gap.

6. The method of manufacturing a plastic lens according to claim 3, wherein casting of said liquid starting material is carried out in a state where said gap is closed, from a certain time in casting of said liquid starting material to the completion of the casting.

7. The method of manufacturing a plastic lens according to claim 3, wherein
   casting jig apical end part of said casting jig is made tubular,
   a casting inlet apical plane part is formed entirely around said casting inlet opening, and
   said gap is closed by contacting an end face of said casting jig apical end part with said casting inlet apical plane part.

8. The method of manufacturing a plastic lens according to claim 7, wherein an outer shape of said casting inlet apical plane part is larger than an outer shape of the end face of said casting jig apical end part.

9. The method of manufacturing a plastic lens according to claim 7, wherein
said casting inlet apical plane part is inclined relative to an axis of the casting hole,
the end face of said casting jig apical end part is formed so that, when brought into contact with the casting inlet apical plane part, the axial direction of said casting hole intersects the axial direction of said casting jig.

10. The method of manufacturing a plastic lens according to claim 7, wherein a spacing of said gap is adjusted in a state where said gap is present entirely around said casting jig opening and said casting inlet opening between the end face of said casting jig apical end part and casting inlet apical plane part.

11. The method of manufacturing a plastic lens according to claim 1, wherein the size of said casting inlet opening is almost identical to or smaller than that of said casting jig opening.

12. The method of manufacturing a plastic lens according to claim 1, further comprising sealing said casting hole following completion of casting the liquid starting material into the casting mold.

13. The method of manufacturing a plastic lens according to claim 12, further comprising separating said casting jig opening from said casting inlet opening immediately after sealing of said casting hole.

14. The method of manufacturing a plastic lens according to claim 1, wherein said liquid starting material comprises plural polymerizable components as well as said polymerizable components that start polymerization immediately after mixing and cure within 10 minutes.

15. The method of manufacturing a plastic lens according to claim 1, wherein said liquid starting material comprises the following components (A) and (B):
Component (A): isocyanate terminal prepolymer in the form of a reaction product of an aliphatic diisocyanate having an intramolecular cyclic structure and a diol having an average molecular weight of 300-2,500,
Component (B): one or more aromatic diamines denoted by the following general formula (I), wherein, in the general formula (I), $R_1$, $R_2$ and $R_3$ are each independently any of a methyl, ethyl or thiomethyl group

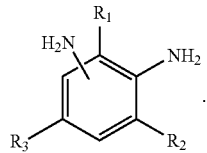

General formula (I)

16. The method of manufacturing according to claim 1, further comprising causing at least some of the remainder portion flowing downwards to strike a surface of said casting inlet opening.

17. The method of manufacturing according to claim 16, further comprising causing the remainder portion flowing downwards and striking a surface of said casting inlet opening to rebound and strike an area around an end of the casting jig opening.

18. The method of manufacturing according to claim 2, wherein said circular gasket has no liquid material receiving structure on an outside surface proximate said casting hole.

19. The method of manufacturing according to claim 7, wherein said end face of said casting jig apical end part and said casting inlet apical plane part are correspondingly inclined so as to be sealingly mateable.

20. The method of manufacturing according to claim 7, wherein said casting jig moving step includes rotating said casting jig to narrow a gap between said end face of said casting jig apical end part and said casting inlet apical plane part.

21. The method of manufacturing according to claim 7, wherein said end face of said casting jig apical end part is inclined relative to an axis of the casting jig.

22. The method of manufacturing according to claim 21, wherein said end face of said casting jig apical end part and said casting inlet apical plane part are correspondingly inclined so as to be sealingly mateable.

* * * * *